(12) United States Patent
Ozeki et al.

(10) Patent No.: US 10,442,151 B2
(45) Date of Patent: Oct. 15, 2019

(54) GLASS SUBSTRATE AND METHOD FOR MANUFACTURING THE SAME, COVER GLASS AND METHOD FOR MANUFACTURING THE SAME, PERSONAL DIGITAL ASSISTANT, AND DISPLAY DEVICE

(71) Applicant: AGC Inc., Chiyoda-ku (JP)

(72) Inventors: Masao Ozeki, Tokyo (JP); Masahiko Tada, Tokyo (JP); Makoto Sano, Tokyo (JP); Osami Taito, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 301 days.

(21) Appl. No.: 15/172,490

(22) Filed: Jun. 3, 2016

(65) Prior Publication Data

US 2016/0357294 A1 Dec. 8, 2016

(30) Foreign Application Priority Data

Jun. 5, 2015 (JP) .................................. 2015-115138

(51) Int. Cl.
| | |
|---|---|
| B32B 3/02 | (2006.01) |
| G06F 3/043 | (2006.01) |
| G06F 3/044 | (2006.01) |
| C03C 15/00 | (2006.01) |
| B32B 17/06 | (2006.01) |
| H04M 1/02 | (2006.01) |

(52) U.S. Cl.
CPC ............... *B32B 3/02* (2013.01); *B32B 17/06* (2013.01); *C03C 15/00* (2013.01); *B32B 2307/412* (2013.01); *B32B 2457/208* (2013.01); *G06F 3/044* (2013.01); *G06F 3/0433* (2013.01); *G06F 2203/04103* (2013.01); *H04M 1/0266* (2013.01); *H04M 2250/12* (2013.01)

(58) Field of Classification Search
None
See application file for complete search history.

(56) References Cited

U.S. PATENT DOCUMENTS

| | | | | |
|---|---|---|---|---|
| 9,298,324 | B1* | 3/2016 | Rowe | ........................ G06F 3/044 |
| 9,436,223 | B2* | 9/2016 | Youn | ...................... G06F 1/1637 |
| 2006/0046078 | A1* | 3/2006 | Richter | ............... C03C 17/3411 |
| | | | | 428/447 |
| 2011/0003619 | A1* | 1/2011 | Fujii | ........................ C03C 3/083 |
| | | | | 455/566 |

(Continued)

FOREIGN PATENT DOCUMENTS

| | | |
|---|---|---|
| JP | 2013-1599 | 1/2013 |
| JP | 2013-137383 | 7/2013 |

OTHER PUBLICATIONS

English machine translation of Japnese patent publication JP2013001599A.*

*Primary Examiner* — Nicholas J Lee
(74) *Attorney, Agent, or Firm* — Oblon, McClelland, Maier & Neustadt, L.L.P.

(57) ABSTRACT

In a glass substrate for extracting therefrom a plurality of cover glasses to protect a protection object, plural concave portions are provided in a front surface or back surface of the glass substrate. The glass substrate includes plural thin portions formed by providing the plural concave portions and a thick portion connecting to the thin portion, and a haze value of the thin portion is 8% or less.

58 Claims, 39 Drawing Sheets

(56) References Cited

U.S. PATENT DOCUMENTS

| | | | |
|---|---|---|---|
| 2012/0027399 A1* | 2/2012 | Yeates | C03C 21/002 396/535 |
| 2014/0085551 A1* | 3/2014 | Koo | G06F 3/041 349/12 |
| 2014/0233161 A1* | 8/2014 | Liu | C03C 15/00 361/679.01 |

* cited by examiner

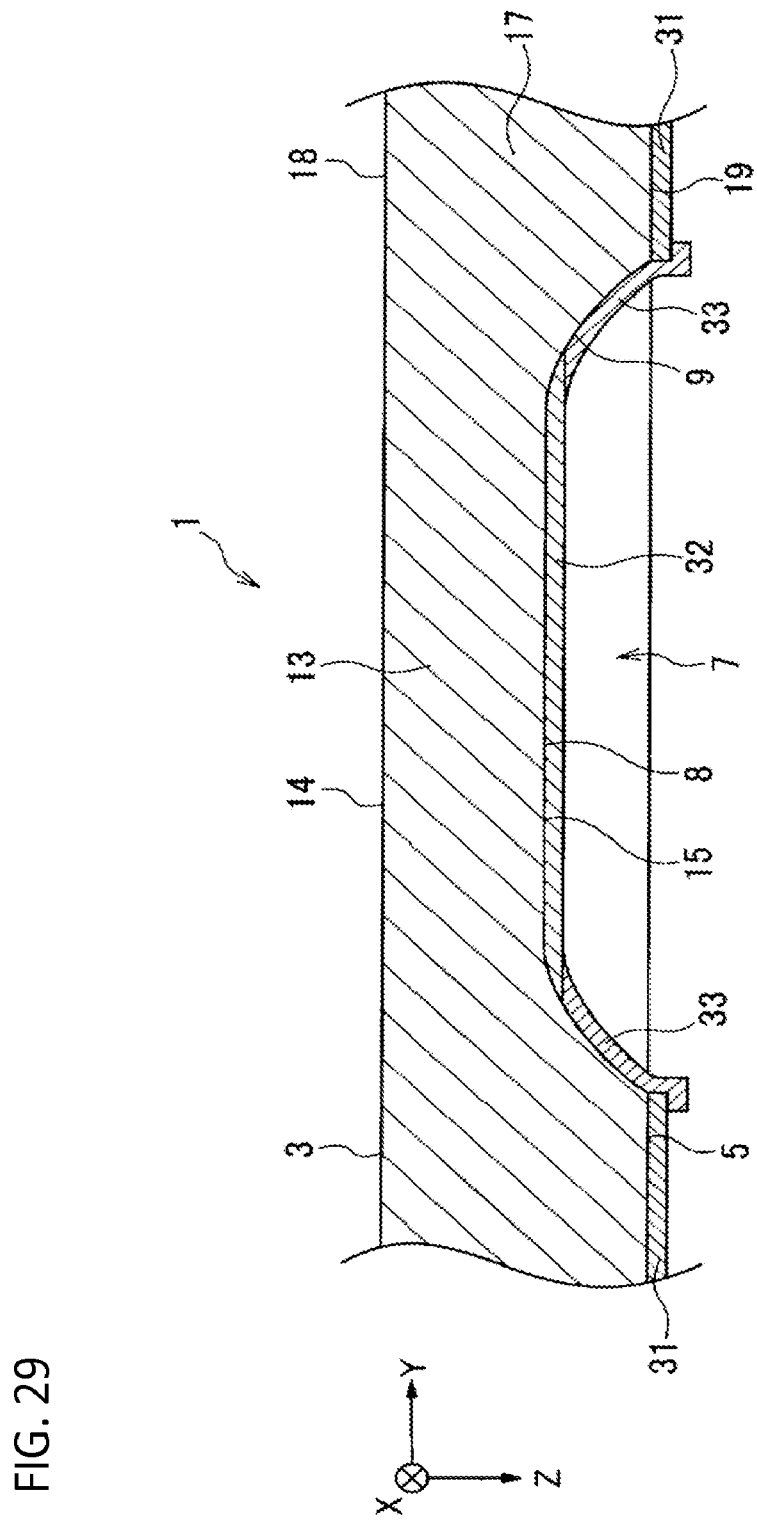

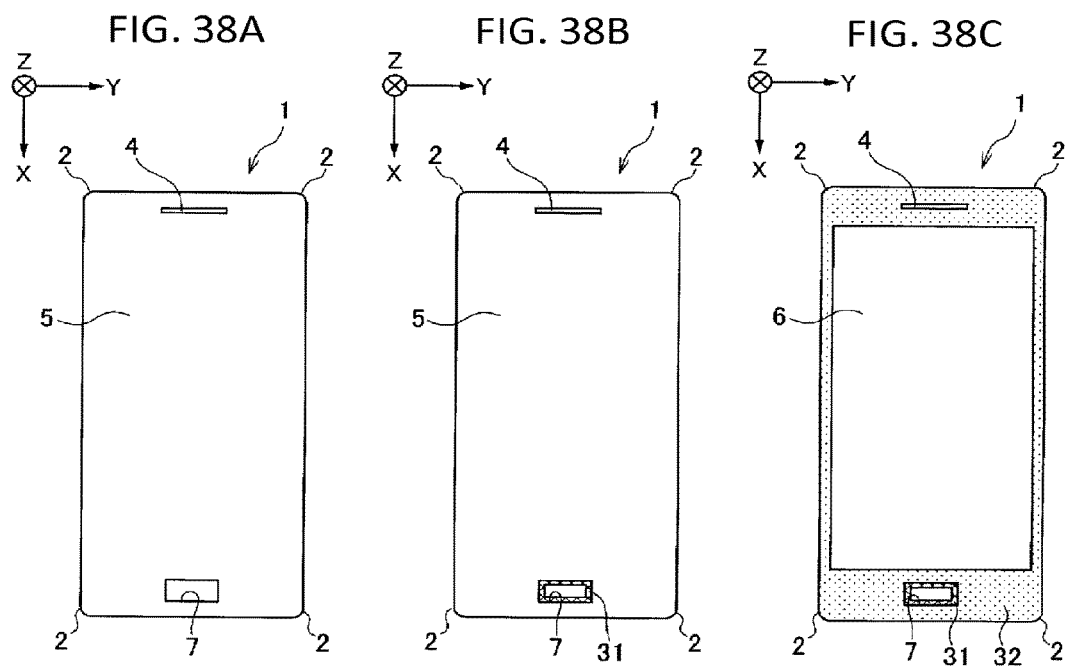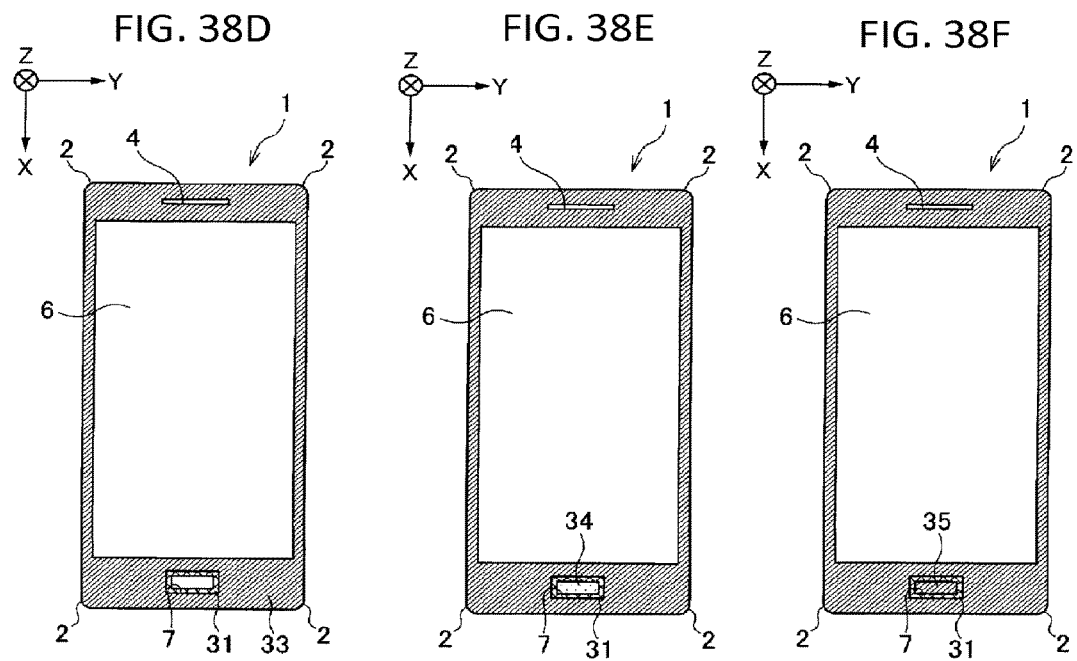

GLASS SUBSTRATE AND METHOD FOR MANUFACTURING THE SAME, COVER GLASS AND METHOD FOR MANUFACTURING THE SAME, PERSONAL DIGITAL ASSISTANT, AND DISPLAY DEVICE

CROSS-REFERENCE TO RELATED APPLICATIONS

This application claims priority from Japanese Patent Application No. 2015-115138 filed on Jun. 5, 2015, the entire subject matter of which is incorporated herein by reference. Further the entire subject matter of Japanese Patent Application No. 2016-104656 filed on May 25, 2016 is incorporated herein by reference.

BACKGROUND OF THE INVENTION

Technical Field

The present invention relates to a glass substrate and a method for manufacturing the same, a cover glass and a method for manufacturing the same, a personal digital assistant, and a display device.

Background Art

Recently, as an advanced security measure for electronic apparatuses, a method of using a fingerprint for personal authentication has been actively used. Examples of the fingerprint authentication method include an optical type sensor, a heat-sensitive type sensor, a pressure-sensitive type sensor, a capacitance type sensor and an ultrasonic type sensor. From the viewpoint of sensitivity and power consumption, a capacitance type sensor and an ultrasonic type sensor are considered to be excellent.

For example, when a detection object approaches or contacts a portion of a capacitance sensor, the capacitance sensor detects a change in the local capacitance of the portion. In a general capacitance sensor, the distance between an electrode arranged in the sensor and a detection object is measured based on the capacitance. In addition, an object to be detected can be detected three-dimensionally by using ultrasonic waves in the ultrasonic type sensor. In this type, the object to be detected can be detected through a foreign matter such as liquid, and this type is expected as a biometric sensor improved in security. A system with a fingerprint authentication function using such a sensor is small and lightweight and has low power consumption. Therefore, this system is mounted on a personal digital assistant (PDA) such as a smartphone, a mobile phone, or a tablet personal computer. Usually, in order to protect a fingerprint authentication sensor (hereinafter this maybe simply referred to as a sensor), a cover glass is arranged above the sensor.

In Patent Document 1, as a cover glass for a mobile device, a concave portion is formed in the main surface of the cover glass for realizing recognition of letters or figures by users. Here, when the haze value of the concave portion is 10% or more, the visibility of the concave portion is increased. In addition, the surface roughness Ra of the concave portion is made larger than the surface roughness Ra of the flat portion of the main surface. With that, owing to the difference in the feel between the concave portion and the flat portion of the main surface, the tactile in recognizing the concave portion is thereby enhanced.

Patent Document 2 discloses a method of manufacturing a cover glass for mobile devices. In the manufacturing method, a glass sheet is etched after a resist mask has been arranged thereon, and plural cover glasses for portable devices are thus extracted.

Patent Document 1: JP-A-2013-137383
Patent Document 2: JP-A-2013-1599

SUMMARY OF THE INVENTION

In the case where a cover glass is arranged above the sensor, in particular a capacitance sensor, the cover glass is preferably thin for the purpose of securing the sensitivity of the sensor. Here, examples of the case where a part of a cover glass is thinned by providing a concave portion therein include the cover glass of Patent Document 1. Patent Document 1 is silent at all about the arrangement of various devices such as a sensor and the like in the concave portion. However, even if a capacitance sensor is arranged in the concave portion in the cover glass for a mobile device of Patent Document 1, it may cause some inconvenience since the haze value and surface roughness Ra of the concave portion are large. Specifically, since the surface of the concave portion is rough, the distance between the sensor electrode and the detection object varies and the capacitance to be detected becomes also uneven. In this case, there is a probability that the sensor sensitivity lowers and the sensor could not exhibit the desired function. Further, since the haze value and surface roughness Ra of the concave portion are large, the concave portion is noticeable and loses unity with the flat portion of the main surface, therefore causing disfigurement of the cover glass as a whole. In addition, in the case where a display panel is arranged in the concave portion, when it is attached with an adhesive, the surface roughness on the concave portion may be large and a void may be formed, and the visibility of images may be deteriorated.

In the manufacturing method of Patent Document 2, a resist mask that reflects the outward form of plural cover glasses must be prepared, and the mask preparation step is troublesome. In addition, the cutting step of obtaining plural cover glasses from a sheet glass requires etching, and therefore the time for the cutting step is prolonged and the step causes cost increase for etchant disposal.

An object of the present invention is to provide a cover glass capable of exhibiting a desired sensing capability when a sensor is incorporated thereinto and exhibiting excellent visibility of images when a display device is incorporated thereinto, a personal digital assistant and display device having the cover glass, a glass substrate for extracting plural cover glasses therefrom, and a simple method for manufacturing the cover glass and the glass substrate.

The above object can be achieved by the following constitution(s).

(1) A glass substrate for extracting therefrom a plurality of cover glasses to protect a protection object, wherein:

plural concave portions are provided in a front surface of the glass substrate or a back surface of the glass substrate, the glass substrate includes plural thin portions formed by providing the plural concave portions and a thick portion connecting to the thin portion, and a haze value of the thin portion is 8% or less.

(2) The glass substrate according to (1), wherein an arithmetic mean roughness of a front surface of the thin portion is 50 nm or less.

(3) The glass substrate according to (1) or (2), wherein the plural concave portions are provided by etching.

(4) The glass substrate according to any one of (1) to (3), wherein a layer containing fluorine or chlorine is included in the outermost surface of the plural concave portions.

(5) The glass substrate according to any one of (1) to (4), wherein the plural concave portions are provided at predetermined intervals.

(6) The glass substrate according to any one of (1) to (5), wherein the plural concave portions are provided on only either one of the front surface of the glass substrate or the back surface of the glass substrate.

(7) The glass substrate according to any one of (1) to (6), wherein a bottom of the concave portion is in a shape protruding toward a central part thereof.

(8) The glass substrate according to any one of (1) to (7), wherein a side surface of the concave portion is in a curved shape smoothly connecting to a bottom of the concave portion.

(9) The glass substrate according to (8), wherein a radius of curvature of the side surface is not less than a depth of the bottom.

(10) The glass substrate according to (8), wherein a radius of curvature of the side surface is less than a depth of the bottom.

(11) The glass substrate according to any one of (8) to (10), wherein a radius of curvature of the side surface increases from a center part of the concave portion toward a peripheral part of the concave portion.

(12) The glass substrate according to any one of (8) to (10), wherein a radius of curvature of the side surface decreases from a center part of the concave portion toward a peripheral part of the concave portion.

(13) The glass substrate according to any one of (8) to (12), wherein a radius of curvature of the side surface is 0.1 mm or more and 2 mm or less.

(14) The glass substrate according to any one of (1) to (13), wherein a connecting part between a side surface of the concave portion and the front surface of the glass substrate or the back surface of the glass substrate is in a smoothly continuing curved shape.

(15) The glass substrate according to any one of (1) to (14), wherein a mark for positioning in extracting the plural cover glasses exists in a peripheral part of the front surface or back surface of the glass substrate.

(16) The glass substrate according to any one of (1) to (14), wherein plural marks for positioning in extracting the plural cover glasses exist in a peripheral part of the front surface or back surface of the glass substrate.

(17) The glass substrate according to any one of (1) to (16), wherein the front surface or back surface of the glass substrate has a concentration of a potassium ion higher than that in a center part of the thick portion in a thickness direction in a section view thereof.

(18) The glass substrate according to any one of (1) to (17), wherein a depth of a compressive stress layer in the concave portion is higher than a depth of a compressive stress layer in the thick portion.

(19) The glass substrate according to any one of (1) to (17), wherein a depth of a compressive stress layer in the thick portion is higher than a depth of a compressive stress layer in the concave portion.

(20) The glass substrate according to any one of (1) to (19), wherein at least one of an anti-glare treated layer, an anti-reflection layer, an anti-fingerprint layer and an anti-fogging layer is contained on the thick portion of the front surface or back surface of the glass substrate.

(21) The glass substrate according to (20), wherein the anti-glare treated layer is included in at least a part of a position that faces the concave portion.

(22) The glass substrate according to (20), wherein the anti-glare treated layer is included in at least a part of a peripheral part of a position that faces the concave portion.

(23) The glass substrate according to any one of (20) to (22), wherein a layer containing fluorine or chlorine is included in the outermost surface of the anti-glare treated layer.

(24) The glass substrate according to any one of (20) to (23), wherein the anti-glare treated layer has a composition different from that in a center part of the thick portion in a thickness direction of the glass substrate in a section view thereof.

(25) A cover glass to protect a protection object, wherein:
at least one concave portion is provided in a front surface or back surface of the cover glass,
the cover glass includes a thin portion formed by providing the concave portion and a thick portion connecting to the thin portion, and
a haze value of the thin portion is 8% or less.

(26) The cover glass according to (25), wherein an arithmetic mean roughness of a front surface of the thin portion is 50 nm or less.

(27) The cover glass according to (25) or (26), wherein the concave portion is provided by etching.

(28) The cover glass according to any one of (25) to (27), wherein a layer containing fluorine or chlorine is included in the outermost surface of the concave portion.

(29) The cover glass according to any one of (25) to (28), wherein a bottom of the concave portion is in a shape protruding outside the concave portion toward a central part thereof.

(30) The cover glass according to any one of (25) to (29), wherein the outermost surface of the front surface or back surface has a concentration of a potassium ion higher than that in a center part of the thick portion in a thickness direction in a section view thereof.

(31) The cover glass according to any one of (25) to (29), wherein the front surface or back surface is a polished surface.

(32) The cover glass according to (31), wherein the polished surface is formed in a chemically strengthened layer.

(33) The cover glass according to any one of (25) to (32), wherein a depth of a compressive stress layer in the concave portion is higher than a depth of a compressive stress layer in the thick portion

(34) The cover glass according to any one of (25) to (32), wherein a depth of a compressive stress layer in the thick portion is higher than a depth of a compressive stress layer in the concave portion.

(35) The cover glass according to any one of (25) to (34), wherein an anti-glare treated layer is included in at least a part of a surface of the cover glass.

(36) The cover glass according to (35), wherein the anti-glare treated layer is included in at least a part of a position that faces the concave portion.

(37) The cover glass according to (35), wherein the anti-glare treated layer is included in at least a part of a peripheral part of a position that faces the concave portion.

(38) The cover glass according to any one of (35) to (37), wherein a layer containing fluorine or chlorine is included in the outermost surface of the anti-glare treated layer.

(39) The cover glass according to any one of (35) to (37), wherein the anti-glare treated layer has a composition different from that in a center part of the thick portion in a thickness direction of the glass substrate in a section view thereof.

(40) The cover glass according to any one of (25) to (39), wherein an anti-fingerprint layer is included in at least a part of the front surface of the cover glass.

(41) The cover glass according to (40), wherein the anti-fingerprint layer is included only in the thick portion.

(42) The cover glass according to (40), wherein the anti-fingerprint layer is included only in the thin portion.

(43) The cover glass according to (40), wherein the anti-fingerprint layer covers a whole surface of the front surface of the cover glass.

(44) The cover glass according to any one of (25) to (43), wherein a side surface of the concave portion is in a curved shape smoothly connecting to a bottom of the concave portion.

(45) The cover glass according to (44), wherein a radius of curvature of the side surface is not less than a depth of the bottom.

(46) The cover glass according to (44), wherein a radius of curvature of the side surface is less than a depth of the bottom.

(47) The cover glass according to any one of (44) to (46), wherein a radius of curvature of the side surface increases from a center part of the concave portion toward a peripheral part of the concave portion.

(48) The cover glass according to any one of (44) to (46), wherein a radius of curvature of the side surface decreases from a center part of the concave portion toward a peripheral part of the concave portion.

(49) The cover glass according to any one of (44) to (46), wherein a radius of curvature of the side surface is 0.1 mm or more and 2 mm or less.

(50) The cover glass according to any one of (25) to (49), wherein a connecting part between a side surface of the concave portion and the front surface or back surface of the cover glass is in a smoothly continuing curved shape.

(51) The cover glass according to any one of (25) to (50), wherein a printing layer is included on the back surface of the cover glass.

(52) The cover glass according to any one of (25) to (51), wherein:
the concave portion exists in the back surface of the cover glass, and
a printing layer is included in the concave portion.

(53) The cover glass according to any one of (25) to (52), wherein the protection object is a personal digital assistant.

(54) A personal digital assistant, comprising the cover glass according to any one of (25) to (53).

(55) The personal digital assistant according to (54), wherein
the concave portion is provided on the front surface of the cover glass, and
a sensor is arranged in a position that faces the concave portion in the back surface of the cover glass.

(56) The personal digital assistant according to (55), wherein a dimension of the sensor is larger than a dimension of the concave portion.

(57) The personal digital assistant according to (54), wherein
the concave portion is provided on the back surface of the cover glass, and
a sensor is arranged in the concave portion.

(58) The personal digital assistant according to (57), wherein a back surface of the sensor is accorded with the back surface of the cover glass in a thickness direction in a section view thereof.

(59) The personal digital assistant according to (54), wherein:
the concave portion is provided in the front surface of the cover glass, and
a capacitance sensor is arranged in a position that faces the concave portion in the back surface of the cover glass.

(60) The personal digital assistant according to (59), wherein a dimension of the capacitance sensor is larger than a dimension of the concave portion.

(61) The personal digital assistant according to (54), wherein:
the concave portion is provided in the back surface of the cover glass, and
a capacitance sensor is arranged in the concave portion.

(62) The personal digital assistant according to (54), wherein
the concave portion is provided in the front surface of the cover glass, and
an ultrasonic sensor is arranged in a position that faces the concave portion in the back surface of the cover glass.

(63) The personal digital assistant according to (62), wherein a dimension of the ultrasonic sensor is larger than a dimension of the concave portion.

(64) The personal digital assistant according to (54), wherein
the concave portion is provided in the back surface of the cover glass, and
an ultrasonic wave sensor is arranged in the concave portion.

(65) The personal digital assistant according to (59) or (61), wherein the capacitance sensor is a fingerprint authentication sensor.

(66) The cover glass according to any one of (25) to (52), wherein the protection object is a display panel.

(67) The cover glass according to (66), wherein the protection object includes a sensor.

(68) A display device, comprising the cover glass according to any one of (25) to (52) and (66).

(69) A display device, comprising the cover glass according to any one of (25) to (52) and (66), a sensor, and a display panel arranged between the cover glass and the sensor.

(70) The display device according to (69), wherein
the concave portion is included in the front surface of the cover glass, and
the display panel is arranged in a position that faces the concave portion in the back surface of the cover glass.

(71) The display device according to (69), wherein
the concave portion is included in the back surface of the cover glass, and
a display panel is arranged in the concave portion.

(72) A method for manufacturing a glass substrate for extracting therefrom plural cover glasses to protect a protection object, the method comprising a concave portion forming step of providing plural concave portions in one surface of a front surface of a glass member or a back surface of the glass member, wherein:
in the concave portion forming step, a first mask member having plural concave portion forming holes for forming the plural concave portions is arranged in the one surface, and in the other surface, a second mask member is arranged, and the glass member having the masks arranged is subjected to an etching treatment to thereby form the concave portion.

(73) The method for manufacturing a glass substrate according to (72), wherein the etching treatment is carried out while relatively moving the glass member and an etchant in a direction parallel to the front surface of the glass member or the back surface of the glass member.

(74) The method for manufacturing a glass substrate according to (73), wherein the etching treatment is carried out by swinging the glass member.

(75) The method for manufacturing a glass substrate according to (73) or 74, wherein the etching treatment is carried out by forming a flow of the etchant.

(76) A method for manufacturing a glass substrate for extracting therefrom plural cover glasses to protect a protection object, the method comprising a concave portion forming step of providing plural concave portions in one surface of a front surface of a glass member or a back surface of the glass member, wherein:

in the concave portion forming step, a mark for positioning is arranged in the one surface, and the glass member is subjected to a grinding treatment by using the mark.

(77) A method for manufacturing a cover glass, comprising extracting plural cover glasses from the glass substrate according to any one of (1) to (24) so as to each contain at least one concave portion therein.

(78) The method for manufacturing a cover glass according to (77), wherein the plural cover glasses are extracted after the glass substrate has been chemically strengthened.

(79) The method for manufacturing a cover glass according to (77), wherein each cover glass is chemically strengthened after the plural cover glasses have been extracted.

(80) The method for manufacturing a cover glass according to any one of (77) to (79), wherein the front surface of the cover glass and the back surface of the cover glass are polished.

(81) The method for manufacturing a cover glass according to (80), wherein the cover glass is polished after the cover glass has been chemically strengthened.

(82) The method for manufacturing a cover glass according to any one of (77) to (81), wherein printing is made on a back surface of the cover glass.

(83) The method for manufacturing a cover glass according to (82), wherein:

a concave portion is provided in the back surface of the cover glass by providing the concave portion in the back surface of the glass substrate, and the printing is carried out individually on the concave portion of the back surface of the cover glass and on a part of the back surface of the cover glass where the concave portion is not formed.

(84) The method for manufacturing a cover glass according to (83), wherein:

a side surface of the concave portion is in a curved shape smoothly connecting to a bottom of the concave portion, and the side surface is printed by a pad printing method.

According to the present invention, the haze value of the thin portion is 8% or less, and therefore both the flatness of the thin portion and the good surface appearance of the cover glass can be satisfied. Specifically, the haze value of the thin portion is 8% or less and the flatness of the thin portion is good, and therefore, even when a sensor is arranged at the position corresponding to the concave portion, a desired sensitivity can be realized.

BRIEF DESCRIPTION OF THE DRAWINGS

FIG. 29 is a cross-sectional view of a cover glass provided with a printing layer.

FIG. 38A to FIG. 38F are plan views for explaining a process of forming a printing layer on the cover glass of Example 6, where the cover glass is seen from the back surface side thereof.

DETAILED DESCRIPTION OF THE INVENTION

Embodiments of the present invention are described below, but the present invention is not limited to the following embodiments. Not overstepping the scope of the present invention, various modifications and substitutions may be given to the following embodiments.

(Cover Glass)

The cover glass of this embodiment may be used for protecting any protection object. In the following description, the protection object to be protected by the cover glass is a personal digital assistant such as a smartphone or the like, but the present invention may be directed to any other protection object. For example, it may be applied to display devices combined with display panels such as liquid-crystal display panels or EL panels. In particular, it is excellent as the method for effectively manufacturing large-sized cover glasses for in-car displays.

Figure 1:
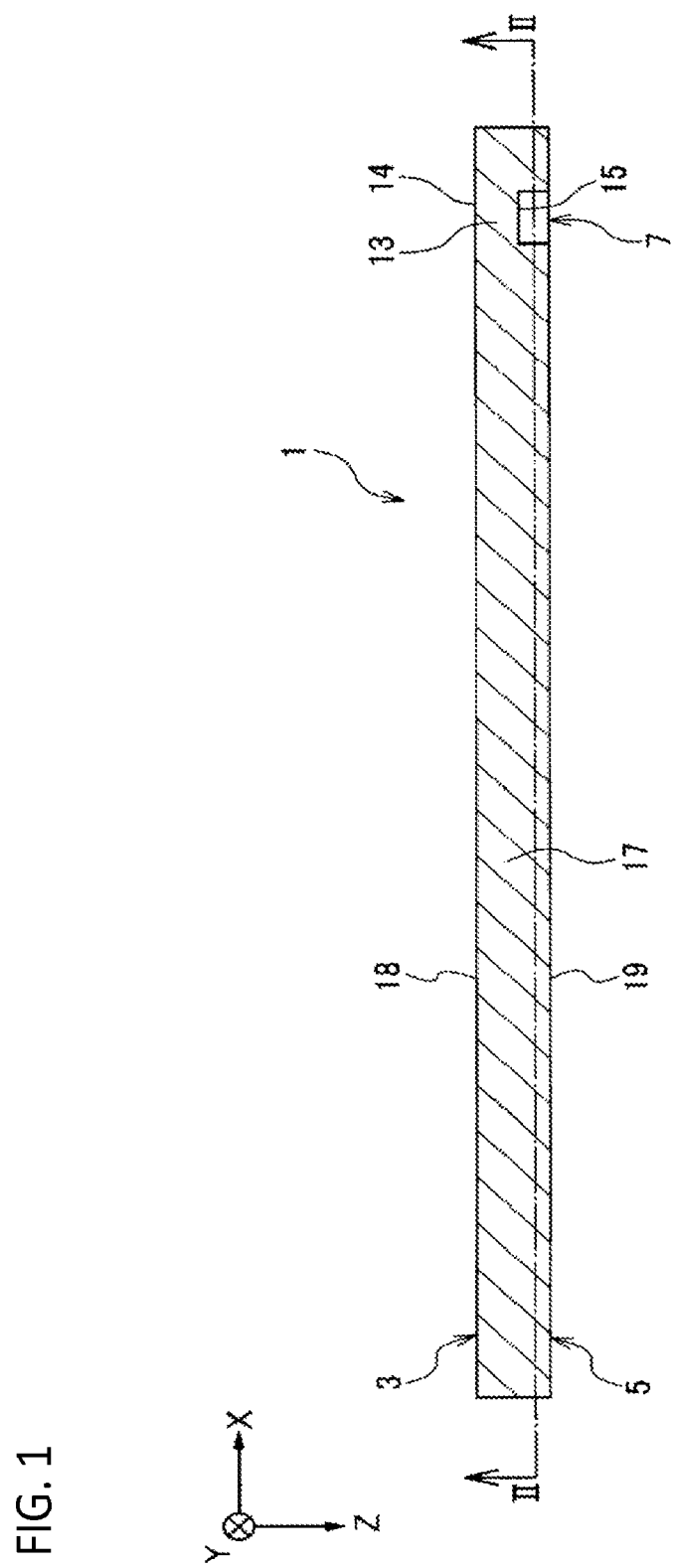
FIG. 1 is a cross-sectional view of a cover glass.
Figure 2:
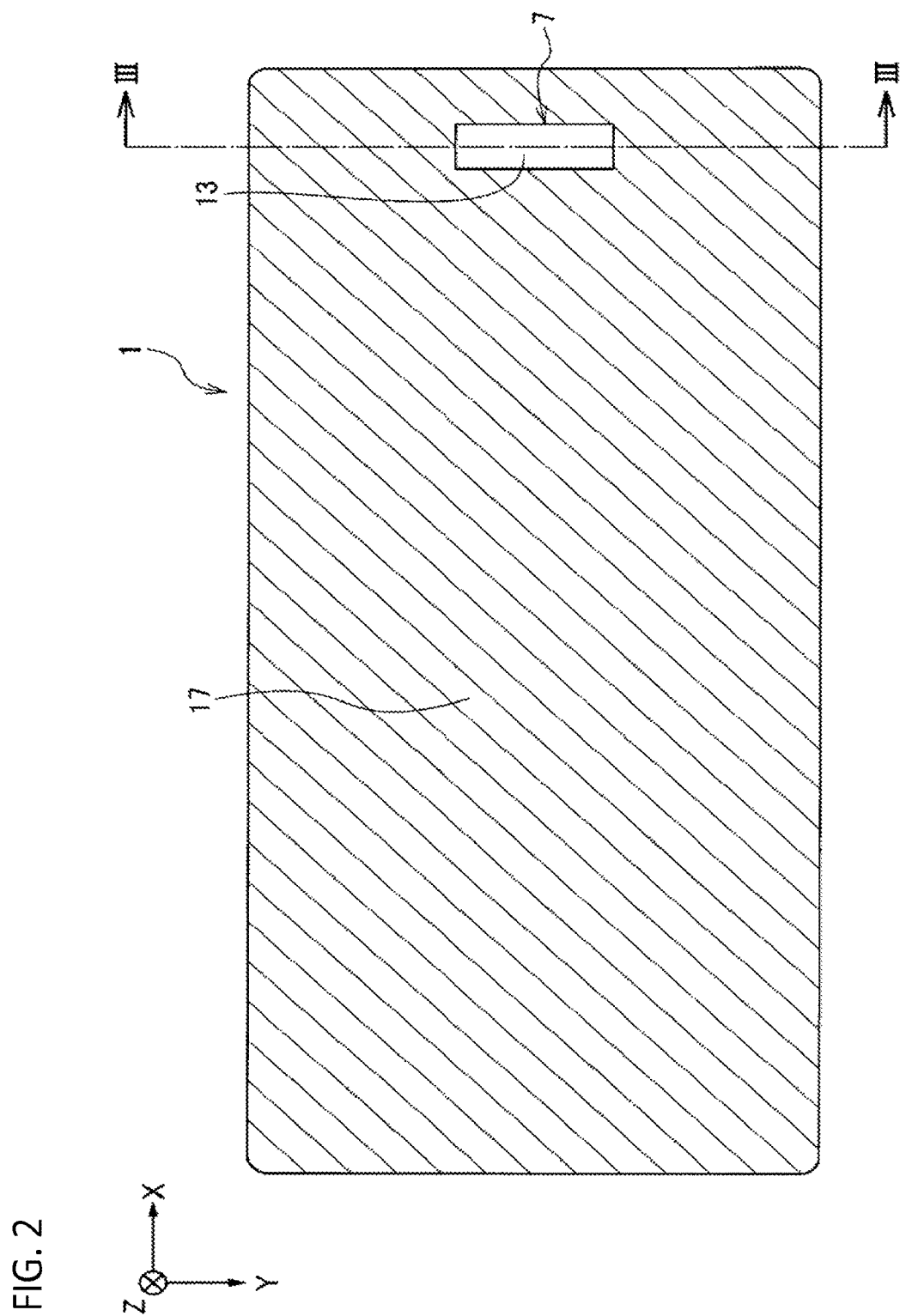
FIG. 2 is a cross-sectional view taken along the line II-II of FIG. 1.

As shown in FIG. 1 and FIG. 2, the cover glass 1 according to this embodiment has an approximately planar rectangular parallelepiped shape as a whole. The cover glass 1 has: a front surface 3 that is an upside surface in FIG. 1; and a back surface 5 that is a downside surface in FIG. 1 which faces the front surface 3. In this description, the front surface refers to an outside surface of an assembly including the cover glass 1, that is, a surface to be touched by a user in a normal use state. In addition, the back surface refers to an inside surface of an assembly, that is, a surface which is not touched by a user in a normal use state. In addition, in the following explanation, a longitudinal direction of the cover glass 1 will be referred to as "direction X", a transverse direction thereof will be referred to as "direction Y", and a thickness direction thereof will be referred to as "direction Z". The cover glass 1 may be a glass including at least one bent part. In addition, the concave portion 7 may be formed in the bent part.

On the front surface 3 or the back surface 5 of the cover glass 1, at least one concave portion 7 is formed. FIG. 1 and FIG. 2 show a case where one concave portion 7 is formed in the back surface 5 of the cover glass 1. The concave portion 7 is formed near an end portion of the cover glass 1 in the direction X and near the center thereof in the direction Y. The position at which the concave portion 7 is formed is any arbitrary position in the front surface 3 or the back surface 5 of the cover glass 1. Any number of the concave portions 7 may also be formed.

As the concave portion 7 is formed in the manner as above, a thin portion 13 is formed in the position that overlaps with the concave portion 7 in the direction X and the direction Y on the cover glass 1, and also a thick portion 17 whose thickness in the direction Z is larger than that of the thin portion 13 is formed, the thick portion 17 connecting to the peripheral part of the thin portion 13. The front surface 18 and the back surface 19 of the thick portion 17 are in a planar form. On the other hand, the front surface 14 of the thin portion 13 is planar, but as described below, a shape of the bottom 8 of the concave portion 7 is reflected on the back surface 15.

Figures 3A, 3B:
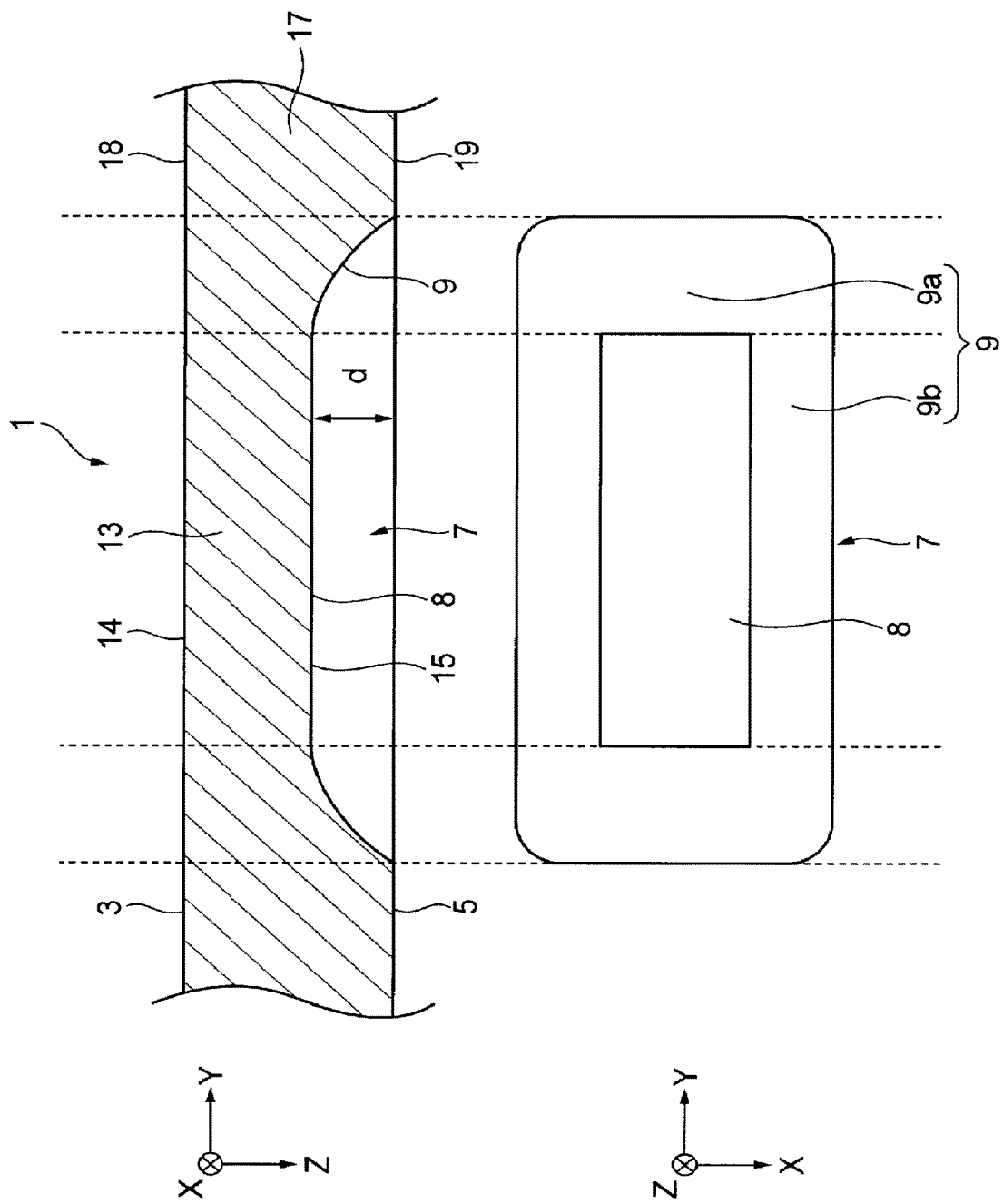
FIG. 3A is a cross-sectional view taken along the line III-III of FIG. 2.
FIG. 3B is a plan view of the concave portion seen from the direction Z.

FIG. 3A and FIG. 3B show in more detail the shape of the concave portion 7. As shown in FIG. 3B, the concave portion 7 is in an approximately rectangular shape having a short side extending in the direction X and a long side extending in the direction Y, as seen from the direction Z. In addition, the concave portion 7 has an approximately flat bottom 8 and a side surface 9 connecting to the peripheral part of the bottom 8. The side surface 9 is in a curved shape (R shape) smoothly connecting to the bottom 8. The side surface 9 is an annular region near the peripheral part of the bottom 8 between the thick portion 17 and the back surface 19 (which is the front surface 18 in the case of FIG. 5A described below). More specifically, the side surface 9 is a region from the boundary near the bottom 8 between the region where the radius of curvature exceeds 2 mm and the region where the radius of curvature is 2 mm or less to the peripheral part of the concave portion 7. In this case, the radius of curvature of the side surface 9 decreases toward the peripheral part of the concave portion 7 from the central part of the concave portion 7. Having the configuration, the stress concentration in the connecting part between the bottom 8 and the side surface 9 is relieved, and the strength is thereby enhanced. In particular, in the case where a fingerprint authentication sensor 40 is arranged in the concave portion 7 (see FIG. 4), a finger is pressed against the thin portion for every authentication, that is, force is given repeatedly to the connecting part, and in the case, the shape of this embodiment is effective for evading stress concentration in that part.

Figure 4:
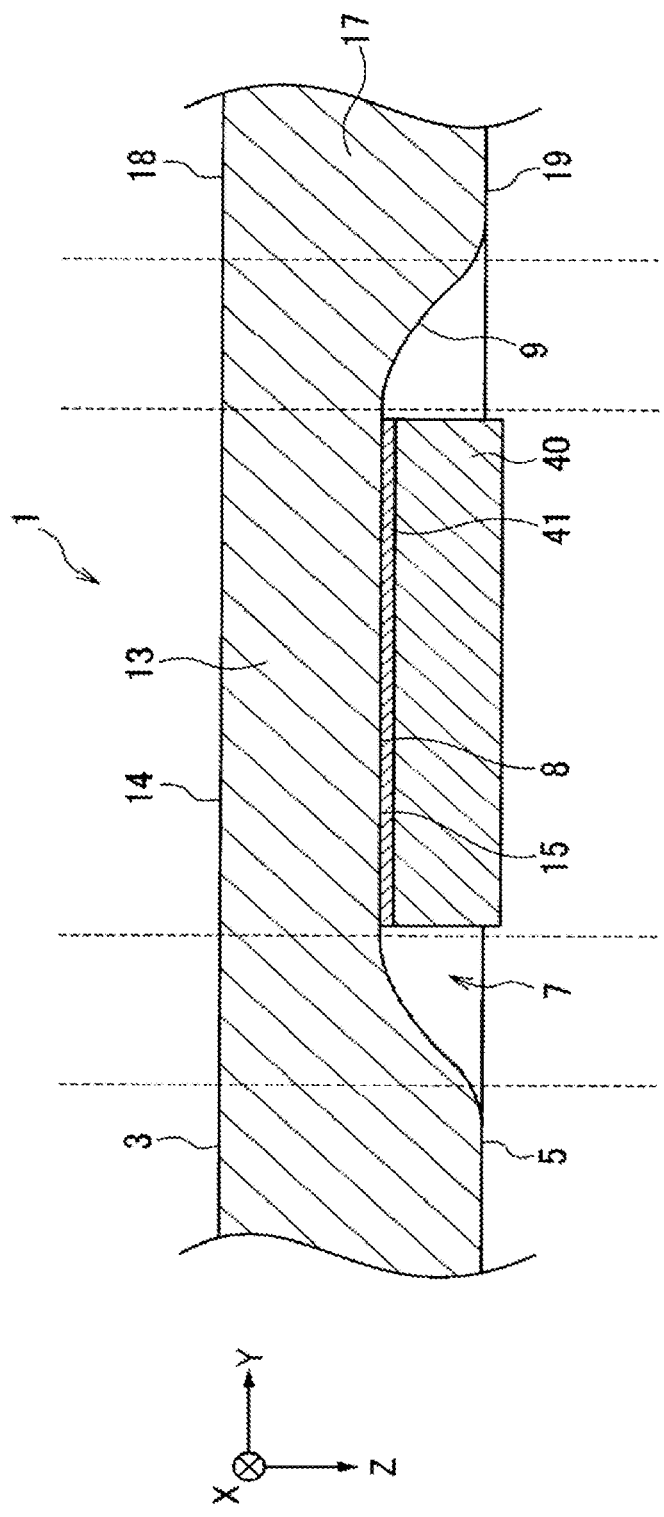
FIG. 4 is a cross-sectional view of a cover glass with a sensor arranged thereon.
Figure 5:
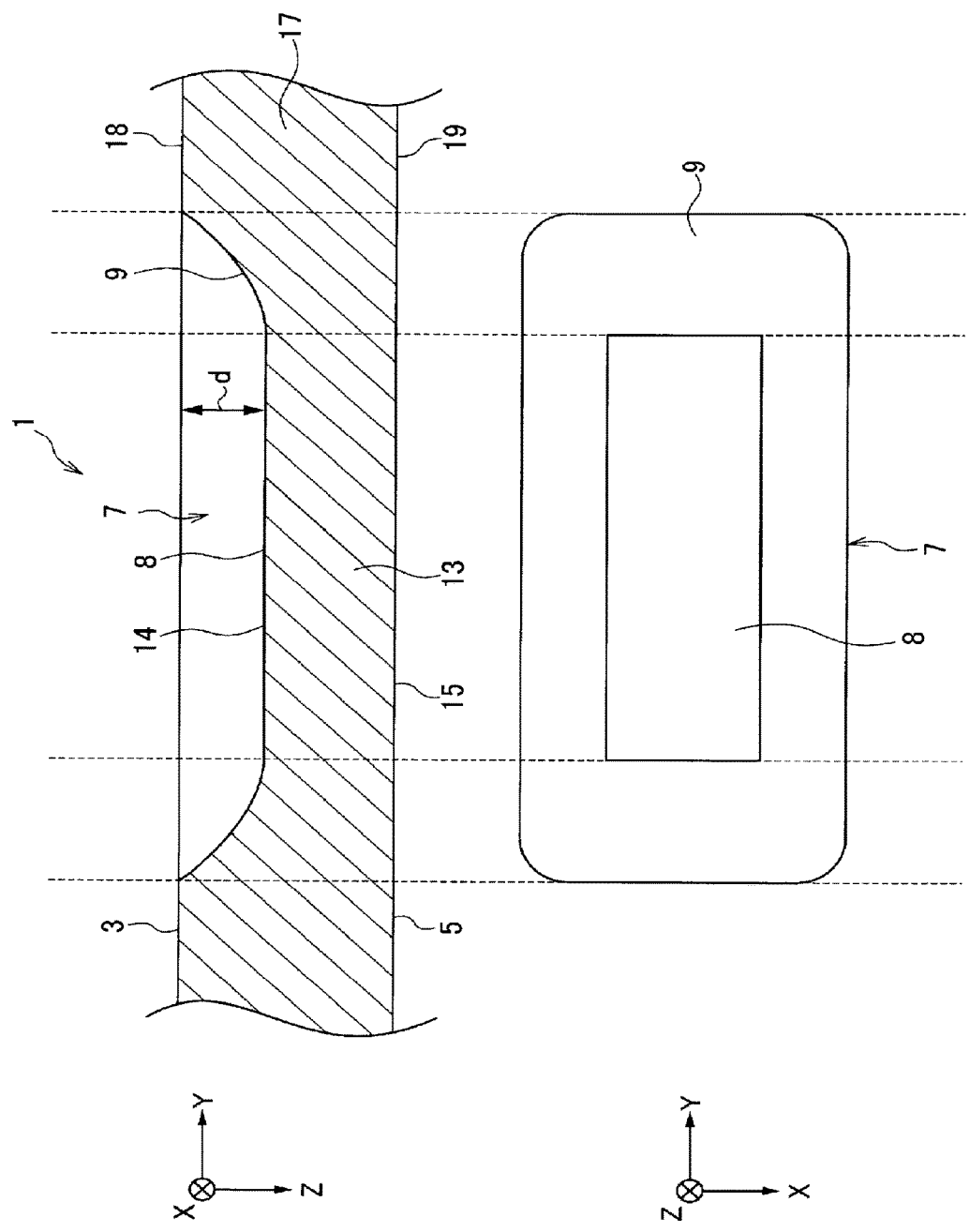
FIG. 5A is a cross-sectional view of a cover glass with a concave portion provided on the front surface thereof.
FIG. 5B is a view of the concave portion seen from the direction Z.

In addition, the radius of curvature of the side surface 9 as shown in FIG. 4 increases from the center part of the concave portion 7 toward the peripheral part thereof. Specifically, the side surface 9 is a surface that curves more gently toward the outside in the direction X and the outside in the direction Y. Having the configuration, even where the concave portion 7 is provided in the front surface 3 of the cover glass 1 and where a fingerprint authentication sensor is arranged on the side of the corresponding back surface 5 (see FIG. 6), the finger touch adaptability to the concave portion 7 is improved and the center part of the fingertip can be led naturally to the bottom 8 of the concave portion 7. Accordingly, though the radius of curvature of the side surface 9 may vary depending on the position thereof, the radius of curvature is set to be not less than the depth d of the bottom 8 at every position. Having the configuration, the finger touch adaptability to the concave portion 7 is enhanced, and the center part of the fingertip can be led naturally to the bottom 8 of the concave portion 7. More specifically, the radius of curvature of the side surface 9 is preferably 0.1 mm or more and 2 mm or less, and even more preferably 0.2 mm or more and 1 mm or less. If the radius of curvature of the side surface 9 is less than 0.1 mm, the above-mentioned effect of enhancing the strength would be low and, in particular, in the case where the concave portion 7 is provided in the front surface 3 of the cover glass 1 (see FIG. 5A, FIG. 5B and FIG. 6), dust and the like that may accumulate in the connecting part between the bottom 8 and the side surface 9 would be difficult to remove by the tip of a nail or by cloth or the like. On the other hand, when the radius of curvature of the side surface 9 is larger than 2 mm, working in the one-time etching step to be mentioned hereinafter would be difficult. In consideration of the one-time etching step to be mentioned below, it is desirable that the radius of curvature of the side surface 9 is not more than 3 times the depth d of the concave portion 7, more preferably not more than 2 times.

As shown in FIG. 4, it is also desirable that the connecting part between the side surface 9 and the back surface 5 is also in a smoothly continuing curved shape. When the connecting part has an edgeless curved shape, it will be effective for hardly causing cracking or breaking owing to the dropping thereof or owing to the contact thereof with any hard outer member. For making the connecting part between the side surface 9 and the back surface 5 have a smoothly continuing curved shape, the connecting part is finished by buffing or the like after the formation of the concave portion 7. However, in the case where the concave portion 7 is provided by wet etching, it may also be possible to make the connecting part have a smoothly continuing curved shape by taking out the glass substrate from the etchant after the etching step, and prolonging the time to be taken before mask peeling and washing than usual. An etchant may remain in the boundary part between the side surface 9 of the concave portion 7 formed by the etching and the mask, owing to the surface tension thereof, and etching may further go on slightly in the connecting part between the side surface 9 to be in contact with the remaining etchant and the back surface 5 and, as a result, the edge of the connecting part could have a continuous curved surface. Accordingly, the retention time is controlled to fall within a range of from a few seconds to a several tens of minutes, depending on the etchant to be used and the etching resistance of the glass substrate.

In the case where the concave portion 7 is provided in the back surface 5 of the cover glass 1 like in this embodiment, the arithmetic mean roughness Ra of the front surface 14 of the thin portion 13 is preferably 50 nm or less, more preferably 45 nm or less, even more preferably 30 nm or less. In the configuration where the concave portion 7 is provided in the back surface 5, the sensor 40 such as a capacitance sensor, ultrasonic sensor or the like is arranged in the concave portion 7 (the back surface 15 of the thin portion 13) via an adhesive layer 41, as shown in FIG. 4, and detects a detection object (for example, finger) that is brought into contact with the front surface 14 of the thin portion 13. Accordingly, when the arithmetic mean roughness Ra of the front surface 14 of the thin portion 13 is 50 nm or less, the roughness is sufficiently smaller than the degree of the irregularities of a fingerprint to favorably increase the sensor sensitivity. Having the configuration, the front surface 3 of the cover glass 1 can be flat in all over the surface, and therefore provides an extremely excellent surface appearance. The lower limit of the arithmetic mean roughness Ra of the front surface 14 of the thin portion 13 is not specifically limited, but the arithmetic mean roughness Ra is preferably 2 nm or more, more preferably 4 nm or more. The arithmetic mean roughness Ra of the front surface 14 of the thin portion 13 may be controlled by selecting the abrasive grains and the polishing method to be employed, etc.

As in the present embodiment, as shown in FIG. 4, when the sensor 40 is arranged in the concave portion 7 via the adhesive layer 41, it is preferred that the total of the thickness of the sensor 40 and thickness of the thin portion 13 is equal to or less than the thickness of the thick portion 17. In this case, the adhesive layer 41 and the sensor 40 are stored in the concave portion 7, and they are easily combined with a protection object. Since the thickness of the adhesive layer 41 is sufficiently small as compared with the thickness of the cover glass 1 or the thickness of the sensor 40, it is preferred that the back surface of the sensor 40 is arranged in the position that is accorded with the back surface 5 of the cover glass 1 in a thickness direction in a section view thereof.

The arithmetic mean roughness Ra of the back surface 15 of the thin portion 13 (the bottom 8 and the side surface 9 of the concave portion 7) is more preferably 50 nm or less, like that of the front surface 14 of the thin portion 13, more preferably 45 nm or less, even more preferably 30 nm or less. When the arithmetic mean roughness Ra of the back surface 15 of the thin portion 13 is 50 nm or less, the roughness is sufficiently smaller than the degree of the irregularities of a fingerprint to favorably increase the sensor sensitivity.

The arithmetic mean roughness Ra may be measured based on the Japanese Industrial Standards, JIS B0601.

Figure 6:
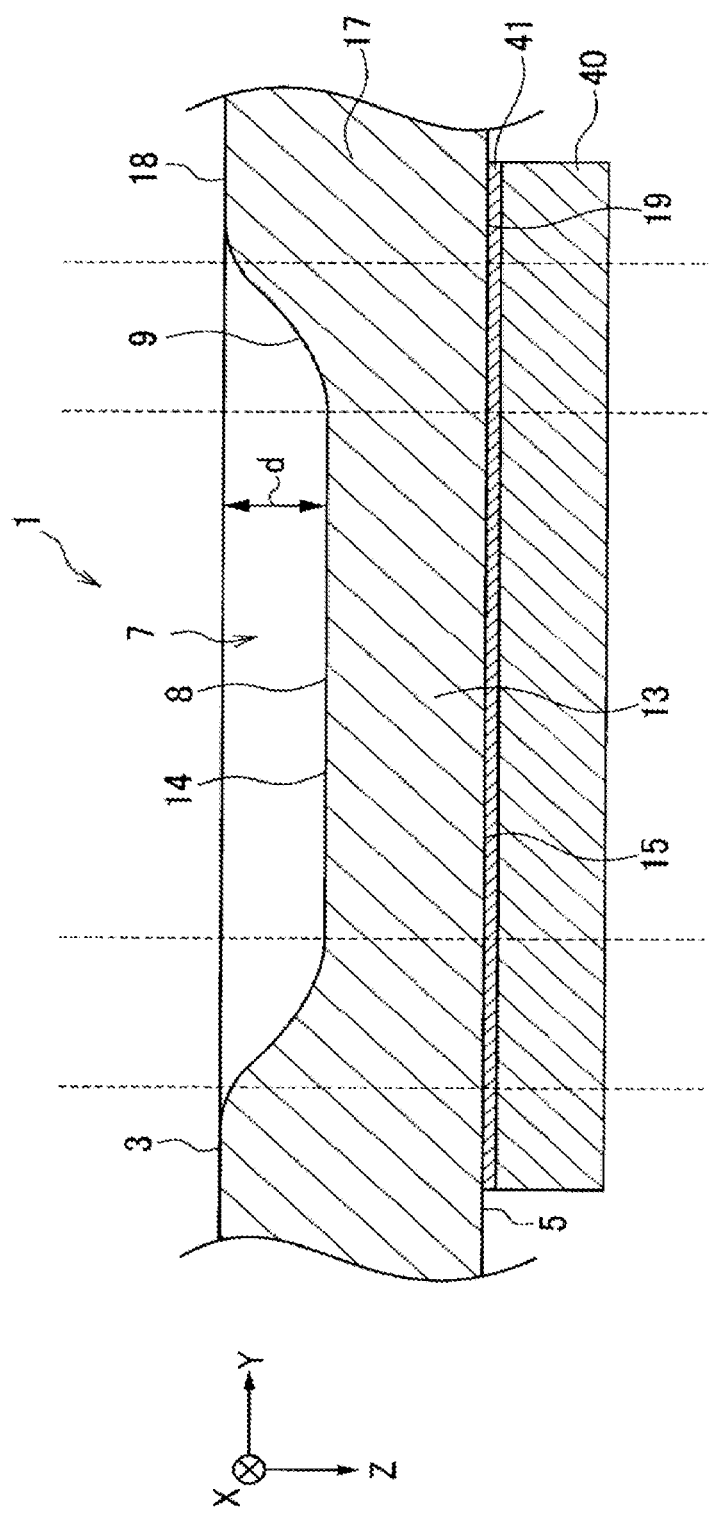
FIG. 6 is a cross-sectional view of a cover glass with a sensor arranged thereon.

The concave portion 7 may be provided in the front surface 3 of the cover glass 1, as shown in FIG. 5A and FIG. 5B. Also in this case, the arithmetic mean roughness Ra of the front surface 14 of the thin portion 13, especially the bottom 8 of the concave portion 7 is preferably 50 nm or less, more preferably 45 nm or less, even more preferably 30 nm or less. In the configuration where the concave portion 7 is provided in the front surface 3, the sensor 40 is arranged at the position that faces the concave portion 7 in the direction Z in the back surface 5 of the cover glass 1, that is, in the back surface 15 of the thin portion 13, as shown in FIG. 6. The sensor 40 is arranged in the back surface 5 of the cover glass 1 via the adhesive layer 41. In the case where the sensor 40 is fixed to a housing or the like, the adhesive layer 41 may be omitted. Different from the case of FIG. 4, the sensor 40 is not arranged in the concave portion 7 and therefore the dimension of the sensor 40 may be larger than the dimension of the concave portion 7 at least in one direction of the directions X, Y and Z. Accordingly, a sensor having a relatively large dimension may be arranged in the back surface 15 of the thin portion 13 to thereby reinforce the thin portion 13. With that, the sensor 40 detects the detection object that is brought into contact with the front surface 14 of the thin portion 13, especially the bottom 8 of the concave portion 7. Accordingly, when the arithmetic mean roughness Ra of the bottom 8 of the concave portion 7 is 50 nm or less, the roughness is sufficiently smaller than the degree of the irregularities of a fingerprint, and thus, when the sensor 50 is, for example, the capacitance sensor, the sensor sensitivity is increased, and such a case is preferred. Having the configuration, a personal digital assistant user can readily recognize the position of the thin portion 13 and the position of the sensor arranged in the back surface 15 of the thin portion 13, visually or tactilely via the concave portion 7. The lower of the arithmetic mean roughness Ra of the bottom 8 of the concave portion 7 is not specifically limited, but the arithmetic mean roughness Ra is preferably 2 nm or more, more preferably 4 nm or more. The arithmetic mean roughness Ra of the bottom 8 of the concave portion 7 may be controlled by the etching condition and others in providing the concave portion 7.

The arithmetic mean roughness Ra of the back surface 15 of the thin portion 13 is preferably 50 nm or less, more preferably 45 nm or less, even more preferably 30 nm or less, like that of the front surface 14 of the thin portion 13. When the arithmetic mean roughness Ra of the back surface 15 of the thin portion 13 is 50 nm or less, the roughness is sufficiently smaller than the degree of the irregularities of a fingerprint to favorably increase the sensor sensitivity.

In addition, as shown in FIG. 6, it is also desirable that the connecting part between the side surface 9 and the front surface 3 has a smoothly continuing curved shape. When the connecting part has an edgeless curved shape, the finger touch adaptability can be further improved without a trouble that a finger may be caught by the edge, and additionally the shape will be effective for hardly causing cracking or breaking owing to the dropping of the device or owing to the contact thereof with any hard outer member.

The haze value of the thin portion 13 is preferably 8% or less, more preferably 7% or less. When the haze value of the thin portion 13 is 8% or less, both the flatness of the thin portion 13 and the good surface appearance of the cover glass 1 can be satisfied. Specifically, the haze value of the thin portion 13 is 8% or less and the flatness of the thin portion 13 is good, and therefore, even when a fingerprint authentication sensor is arranged at the position corresponding to the concave portion 7, a desired sensor sensitivity can be realized.

In the case where the back surface 15 of the thin portion 13 is printed, the flatness of the thin portion 13 has an influence on the flatness of the printing layer. When the haze value of the thin portion 13 is 8% or less, a flatness not having any influence on sensor sensitivity can be secured and excellent appearance of the printing layer can be achieved. On the other hand, when the haze value of the thin portion 13 is more than 8%, the ink used in printing could not well penetrate into the irregularities formed in the outermost surface of the thin portion 13, and the outward appearance of the cover glass 1 mounted on a protection object would worsen.

When the haze value of the thin portion 13 is 8% or less and when the transmittance of the thin portion 13 is increased, unity is secured between the thin portion 13 and the thick portion 17, and a cover glass excellent in surface appearance as a whole can be therefore realized.

The haze value of the thick portion 17 is 1% or less, preferably 0.5% or less, more preferably 0.2% or less. In that manner, the thick portion 17 has high flatness and transmittance as compared with the thin portion 13 to be formed by etching treatment or the like. Accordingly, in the case where the haze value of the thin portion 13 is more than 8%, the thin portion 13 would be cloudy relative to the thick portion 17 having a high transmittance and, as a result, the designability of the cover glass 1 as a whole would worsen.

The haze value of the thin portion 13 may be controlled by the etching conditions and others in providing the concave portion 7. The haze value may be measured based on the Japanese Industrial Standards, JIS K7136.

Figure 7:
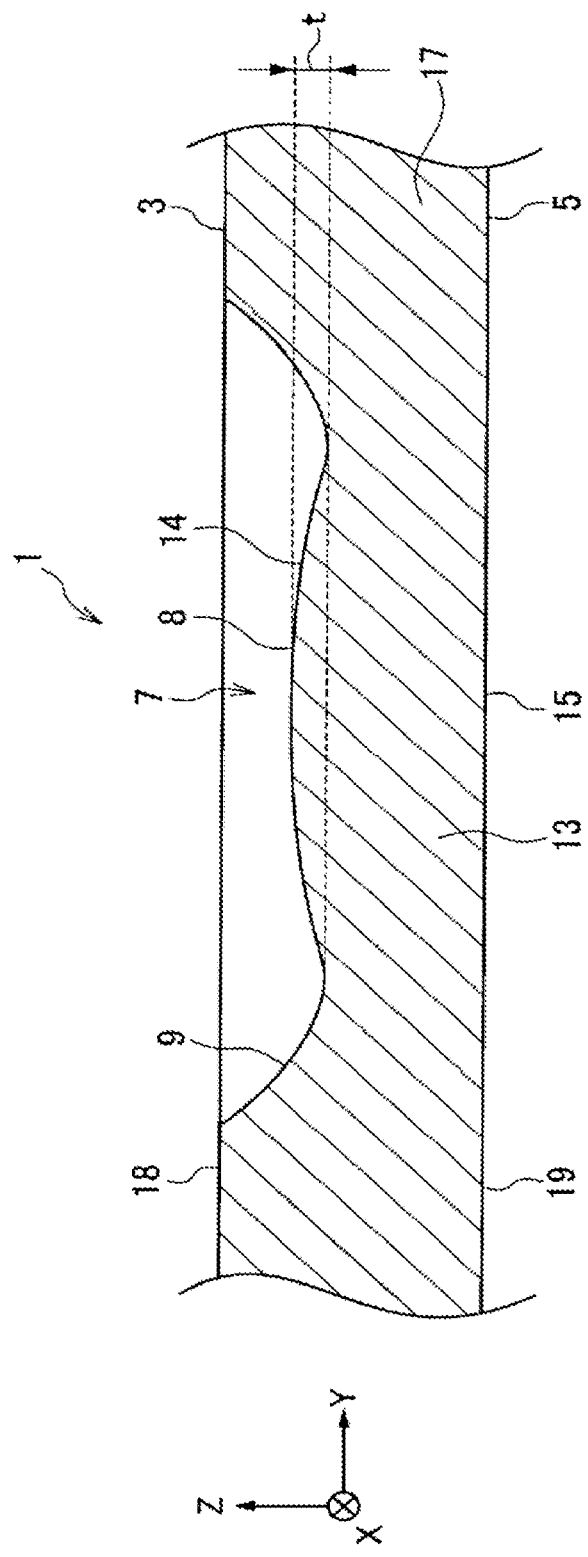
FIG. 7 is a cross-sectional view of a cover glass where the concave portion is provided with a protruding portion.

As shown in FIG. 7, the bottom 8 of the concave portion 7 may have a shape protruding toward the center part thereof in the direction Z (toward outside the concave portion 7). Accordingly, the finger touch at the protruding portion is better. The thickness t in the direction Z of the center part of the protruding portion (the most protruding portion) of the bottom 8 is preferably 5 μm or more and 20 μm or less. When the thickness t in the direction Z of the protruding portion of the bottom 8 is more than 20 μm, the possibility of false recognition by sensor would increase, and when it is less than 5 μm, the change could not be recognized by the sense of finger touch. The presence or absence of the protruding portion of the bottom 8, and the thickness in the direction Z of the protruding portion may be controlled by the etching conditions and others in providing the concave portion 7. The thickness t in the direction Z of the protruding portion of the bottom 8 may be measured, for example, using a laser displacement meter, LT-9000 manufactured by Keyence Corporation.

Preferably, the cover glass 1 is a chemically strengthened glass. The chemically strengthened glass has a compressive stress layer that is formed in the surface layer thereof by a chemical strengthening treatment. Therefore, high mechanical strength can be obtained.

Preferably, the front surface 3 and the back surface 5 of the cover glass 1 are polished for increasing the smoothness thereof. For example, using a suede pad and using an abrasive slurry containing cerium oxide or colloidal silica as an abrasive agent, cracks existing in the front surface 3 and the back surface 5 of the cover glass 1 and also warping or denting of the cover glass 1 can be removed, and the strength of the cover glass 1 can be enhanced. The polishing may be carried out before or after the chemical strengthening of the cover glass 1, but is preferably carried out after the chemical strengthening. This is because a strengthened glass sheet that has been chemically strengthened by ion exchange may have defects formed in the front surface and the back surface thereof. In addition, fine irregularities having a height of at most 1 μm or so may remain in the surfaces. In the case where force is given to a glass sheet, stress may concentrate in the portion where the above-mentioned defects or fine irregularities exist, and the glass sheet may be broken by a force smaller than a theoretical strength. Accordingly, the layer having cracks and fine irregularities (defective layer), which exists on the outermost surface of the glass sheet after chemical strengthening, is removed by polishing. The thickness of the defective layer having defects therein depends on the conditions of chemical strengthening, and is generally 0.01 to 0.5 μm.

Only the thick portion 17 may be subjected to polishing. In this case, the effects of improving the sensor sensitivity and visibility are obtained when the sensor or display pane is arranged in the back surface 19. In addition, since the thick portion 17 contributes to the strength of the whole of the cover glass 1, the strength of the cover glass 1 can be improved by removing defects thorough polishing treatments. When the thick portion 17 of the cover glass 1 after chemical strengthening is polished, the depth of compressive layer (Depth Of Layer: DOL) of the concave portion 7 is larger than that of the thick portion 17. That is, the cover glass 1 in which the strength of the thin portion 13 is maintained is obtained.

In addition, the bottom 8 or side surface 9 of the concave portion 7 may be subjected to polishing. In this case, the effects of improving the sensor sensitivity and visibility are obtained when the sensor or display pane is arranged in the concave portion 7. When the concave portion 7 of the cover glass 1 after chemical strengthening is polished, the depth of compressive layer (Depth Of Layer: DOL) of the thick portion 17 is larger than that of the concave portion 7. By removing foreign layers formed during the formation of the concave portion 7 through polishing treatments, an anti-fingerprint layer described later can be easily formed.

As described above, the cover glass 1 according to this embodiment is not limited to the case of being used for protecting a personal digital assistant and a display device such as a display panel. However, in particular, when the cover glass 1 is used for protecting a personal digital assistant, the thickness of the thick portion 17 in the direction Z is 2 mm or less, preferably 1.5 mm or less, and more preferably 0.8 mm or less. The reason for this is as follows. When the thickness of the thick portion 17 is more than 2 mm, the difference in the thickness between the thin portion 13 and the thick portion 17 would increase. As a result, there is a problem in processing, and the weight of the cover glass 1 is heavy for use in a personal digital assistant. In order to improve the stiffness, the thickness of the thick portion 17 in the direction Z is 0.1 mm or more, preferably 0.15 mm or more, and more preferably 0.2 mm or more. When the thickness is less than 0.1 mm, the stiffness is excessively low, and the cover glass 1 may not be used for protecting a personal digital assistant.

The thickness of the thin portion 13 in the direction Z is basically 1 mm or less, preferably 0.4 mm or less, more preferably 0.35 mm or less, more preferably 0.3 mm or less, still more preferably 0.25 mm or less, even still more preferably 0.2 mm or less, and most preferably 0.1 mm or less. In the case where a capacitance sensor is arranged on the back surface 15 of the thin portion 13 and where the thickness of the thin portion 13 is smaller, the capacitance detection range increases, which improves sensor sensitivity. For example, in the case of fingerprint authentication in which fine irregularities of a fingerprint of a fingertip are detected, a difference between capacitances corresponding to the fine irregularities of the fingerprint of the fingertip increases. Therefore, the detection can be performed with high sensitivity. On the other hand, the lower limit of the thickness of the thin portion 13 in the direction Z is not particularly limited. However, when the thickness of the thin portion 13 is excessively small, the strength decreases, and thus it tends to be difficult to appropriately function as a protective portion for a sensor or the like. Accordingly, the thickness of the thin portion 13 in the direction Z is, for example, 0.01 mm or more and more preferably 0.05 mm or more. The thickness of the thick portion 17 in the direction Z is preferably 10 times or less, and more preferably 8 times or less than the thickness of the thin portion 13 in the direction Z. When the thickness of the thick portion 17 in the direction Z is more than 10 times the thickness of the thin portion 13 in the direction Z, there may be a problem in processing. The lower limit of a ratio of the thickness of the thick portion 17 in the direction Z to the thickness of the thin portion 13 in the direction Z is not particularly limited and can be set according to an intended use. When the cover glass 1 is used for protecting a personal digital assistant, typically, the ratio is 1.5 times or more. An area ratio of the thin portion 13 to the thick portion 17 is 1/2 or lower, preferably 1/3 or lower, and more preferably 1/4 or lower. When the area ratio of the thin portion 13 to the thick portion 17 is higher than 1/2, the strength may significantly decrease.

The Young's modulus of the thin portion 13 is 60 GPa or higher, preferably 65 GPa or higher, and more preferably 70 GPa or higher. When the Young's modulus of the thin portion 13 is 60 GPa or higher, damage to the thin portion 13 caused by collision with a foreign collision object can be sufficiently prevented. In addition, when a fingerprint authentication sensor is arranged in the concave portion 7, damage to the thin portion 13 caused by dropping or collision of a smartphone or the like can be sufficiently prevented. Further, damage to a sensor to be protected by the thin portion 13 can be sufficiently prevented. The upper limit of the Young's modulus of the thin portion 13 is not particularly limited. From the viewpoint of productivity, the Young's modulus of the thin portion 13 is, for example, 200 GPa or lower and preferably 150 GPa or lower.

The Vickers hardness Hv of the thin portion 13 is preferably 400 or higher and more preferably 500 or higher. When the Vickers hardness of the thin portion 13 is 400 or higher, scratches on the thin portion 13 caused by collision with a foreign collision object can be sufficiently prevented. In addition, when a fingerprint authentication sensor is arranged in the concave portion 7, scratches on the thin portion 13 caused by dropping or collision of a smartphone or the like can be sufficiently prevented. Further, damage to a sensor to be protected by the thin portion 13 can be sufficiently prevented. The upper limit of the Vickers hardness of the thin portion 13 is not particularly limited. However, when the Vickers hardness is excessively high, there may be a problem in polishing or processing. Accordingly, the Vickers hardness of the chemically strengthened glass is, for example, 1200 or lower and preferably 1000 or lower. The Vickers hardness can be measured in a Vickers hardness test described in, for example, Japanese Industrial Standards, JIS Z 2244.

The relative dielectric constant of the thin portion 13 at a frequency of 1 MHz is preferably 7 or higher, more preferably 7.2 or higher, and still more preferably 7.5 or higher. When a capacitance sensor is arranged on the back surface 15 of the thin portion 13, by increasing the relative dielectric constant of the thin portion 13, the capacitance detection range can be increased, and superior sensor sensitivity can be realized. In particular, by adjusting the relative dielectric constant of the thin portion 13 at a frequency of 1 MHz to be 7 or higher, in the case of fingerprint authentication in which fine irregularities of a fingerprint of a fingertip are detected, a difference between capacitances corresponding to the fine irregularities of the fingerprint of the fingertip increases. Therefore, the detection can be performed with high sensitivity. The upper limit of the relative dielectric constant of the thin portion 13 is not particularly limited. However, when the relative dielectric constant is excessively high, dielectric loss may increase, power consumption may increase, and a reaction may become slow. Accordingly, the relative dielectric constant of the thin portion 13 at a frequency of 1 MHz is preferably 20 or lower and more preferably 15 or lower. The relative dielectric constant can be determined by measuring the capacitance of a capacitor in which electrodes have been formed on both surfaces of the cover glass 1.

Preferably, a printing layer is provided on the back surface 5 of the cover glass 1. In particular, in the case where the concave portion 7 is provided in the back surface of the cover glass 1 as shown in FIG. 3A and FIG. 3B, it is desirable that a printing layer is provided also on the concave portion 7 (on the back surface 15 of the thin portion 13). By providing the printing layer, a personal digital assistant which is a protection object of the cover glass 1, and a fingerprint authentication sensor arranged on the back surface 15 of the thin portion 13 can be effectively prevented from being recognized by sight through the cover glass 1. In addition, a desired color can be imparted thereto, and therefore a good appearance can be obtained. From the viewpoint of maintaining high capacitance of the cover glass 1 (thin portion 13), the thickness of the printing layer is preferably thinner. The thickness of the printing layer is preferably 30 μm or less, more preferably 25 μm or less, and still more preferably 10 or less. However, in white printing using an ink that contains a compound having a high relative dielectric constant (for example, an ink containing $TiO_2$), the thickness of the printing layer is preferably 100 μm or less, more preferably 50 μm or less, even more preferably 25 μm or less, since the relative dielectric constant of the printing layer is high.

In the case where a printing layer is provided on the back surface 5 of the cover glass 1, the sensor is provided at the position at which the back surface of the printing layer faces the concave portion 7 in the direction Z (on the back side of the thin portion 13). Accordingly, the arithmetic mean roughness Ra of the front surface of the printing layer is preferably 50 nm or less, more preferably 45 nm or less, even more preferably 30 nm or less. Also preferably, the arithmetic mean roughness Ra of the back surface is 50 nm or less, more preferably 45 nm or less, even more preferably 30 nm or less. When the arithmetic mean roughness Ra of the front surface and the back surface of the printing layer is 50 nm or less, the roughness is sufficiently smaller than the degree of the irregularities of a fingerprint of the finger to favorably increase the sensor sensitivity. The lower limit of the arithmetic mean roughness Ra of the front surface and the back surface of the printing layer is not specifically limited, and the arithmetic mean roughness Ra is preferably 2 nm or more, more preferably 4 nm or more.

When the cover glass 1 as above is incorporated in a housing or the like for protecting any desired surface (for example, front surface or back surface) of a personal digital assistant or display device, a fingerprint authentication sensor or a display panel such as a liquid-crystal panel or an organic EL panel can be arranged on the back surface 15 of the thin portion 13. Here, the sensor arranged on the back surface 15 of the thin portion 13 is protected by the thin portion 13 that faces it in the direction Z, and therefore without additionally using any other foreign material such as a sensor cover or the like, a cover glass 1 having a unified designability in point of the constituent materials and therefore having an excellent outward appearance can be realized. In addition, the number of the necessary materials may be reduced and the assembling process can be simplified, and therefore the cover glass is significantly effective for cost reduction. Furthermore, the opening space of the cover glass through which any other materials are to be incorporated may be reduced, and the device can be readily given water-proofness and drip-proofness.

Figure 8:
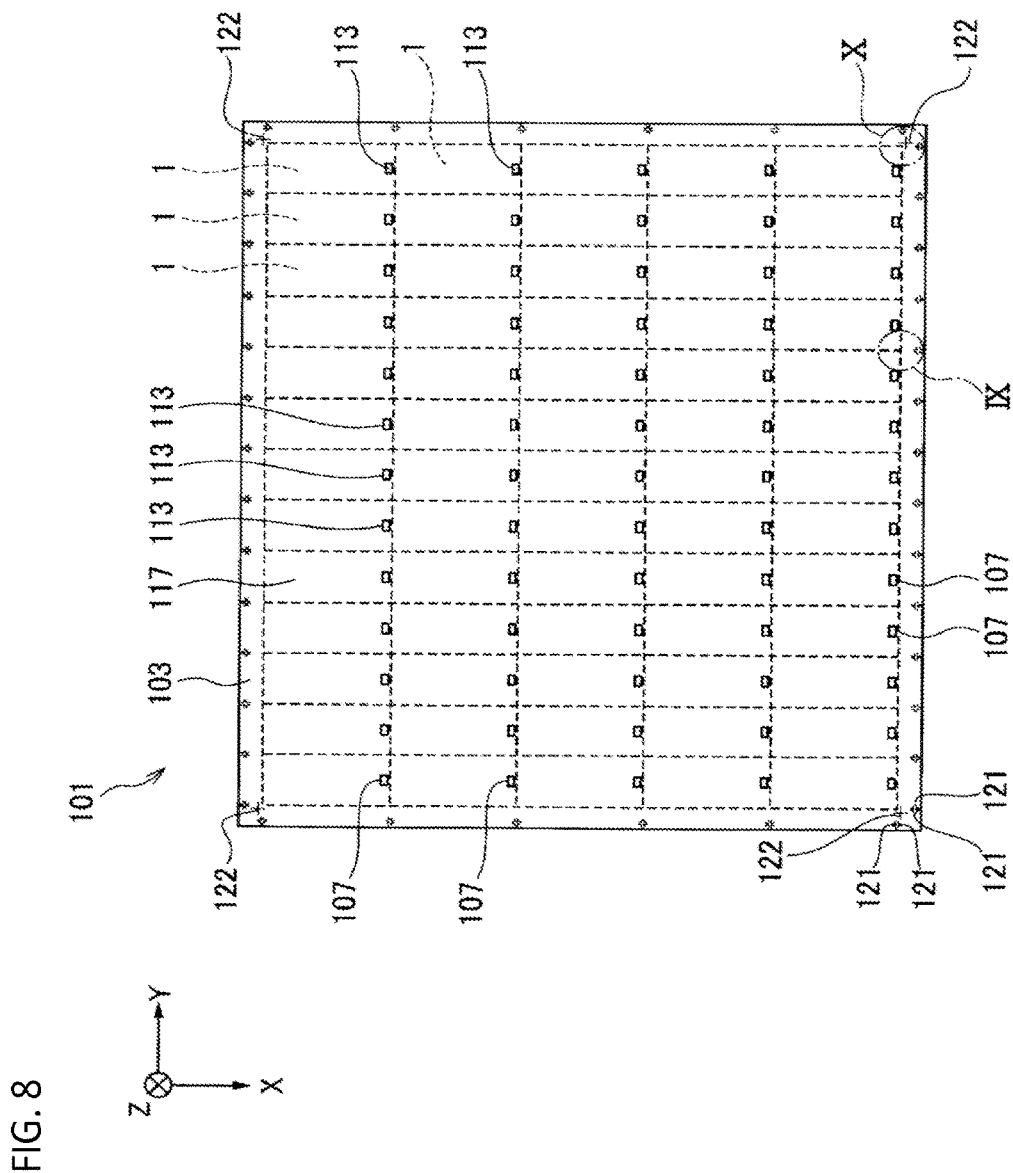
FIG. 8 is a plan view of a glass substrate.

The above-mentioned cover glass 1 can be obtained by extracting it from the glass substrate 101 with plural concave portions 107 arranged therein as in FIG. 8, in such a manner that the extracted cover glass could contain at least one concave portion 107. Accordingly, first, the configuration of the glass substrate 101 is described, then a method for manufacturing the glass substrate 101 is described, and thereafter a method for manufacturing the cover glass 1 is described each in detail.

(Glass Substrate)

FIG. 8 shows a glass substrate 101 from which plural cover glasses 1 for protecting a protection object are to be extracted. In FIG. 8, the outward form of the cover glasses 1 to be extracted is shown by a broken line, and by cutting the glass substrate 101 along the broken line, plural cover glasses 1 can be obtained. The cutting line is a straight line as in the broken line in the figure, but the cutting line may not be a straight line, and may be a curved line.

Plural concave portions 107 are provided in one surface of the front surface 103 (surface on the front side in FIG. 8) or the back surface of the glass substrate 101. FIG. 8 shows an example where plural concave portions 107 are provided in the front surface 103 of the glass substrate 101. As described below, the plural concave portions 107 are provided by etching, grinding, deforming by heating or the like.

The glass substrate 101 has plural thin portions 113 formed by providing plural concave portions 107, and thick portions 117 connecting to the plural thin portions 113. The plural concave portions 107 are provided at predetermined intervals in the direction X and in the direction Y, respectively. Accordingly, the thin portions 113 are also provided at predetermined intervals in the direction X and in the direction Y, respectively. The plural concave portions 107 are not always needed to be provided at predetermined intervals. The plural concave portions 107 may be provided at intervals of plural types, or may be provided at random intervals at least in a part thereof. However, for enhancing the space efficiency in extracting plural cover glasses 1, it is desirable that plural concave portions 107 are provided at predetermined intervals so that every cover glass 1 could be laid with no space therebetween, as shown in FIG. 8.

Here, the constitution (shape, dimension, etc.) of the concave portion 107 and the thin portion 113 of the glass substrate 101 is the same as the constitution of the concave portion 7 and the thin portion 13 of the above-mentioned cover glass 1. Specifically, the arithmetic mean roughness Ra of the surface of the thin portion 113 is preferably 50 nm or less, more preferably 45 nm or less, even more preferably 30 nm or less. The haze value of the thin portion 113 is preferably 8% or less, more preferably 7% or less. The bottom of the concave portion 107 of the glass substrate 101 may be configured so as to protrude toward the center part, like that of the concave portion 7 of the cover glass 1 (see FIG. 7).

Preferably, the side surface of the concave portion 107 of the glass substrate 101 is in a curved shape smoothly connecting to the bottom of the concave portion 107, like the side surface 9 of the concave portion 7 of the cover glass 1 (see FIGS. 3A and 3B to FIG. 7). Preferably, the radius of curvature of the side surface of the concave portion 107 increases toward the peripheral part from the center part of the concave portion 107. Preferably, the radius of curvature of the side surface of the concave portion 107 is set to be equal to or larger than the depth to the bottom of the concave portion 107. Preferably, the radius of curvature of the side surface of the concave portion 107 is 0.1 mm or more and 2 mm or less. Preferably, the connecting part between the side surface of the concave portion 107 and the front surface 103 or the back surface thereof is in a smoothly continuing curved shape, like the connecting part between the side surface 9 of the concave portion 7 of the cover glass 1 and the front surface 3 or the back surface 5 thereof (see FIG. 4 and FIG. 6).

Figure 9:
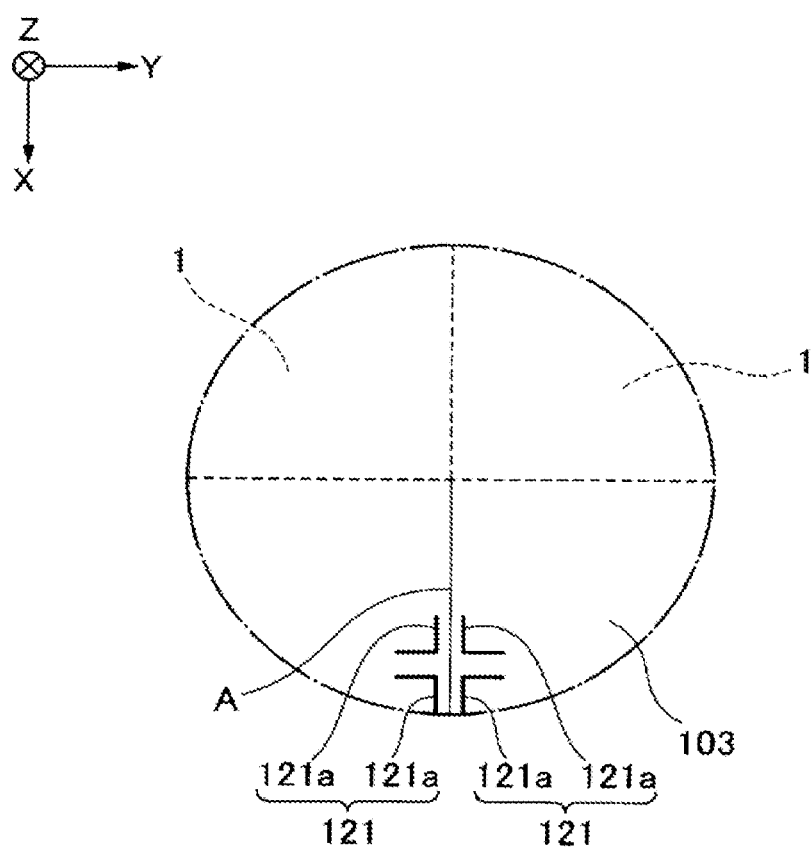
FIG. 9 is an enlarged view of the portion IX in FIG. 8.
Figure 10:
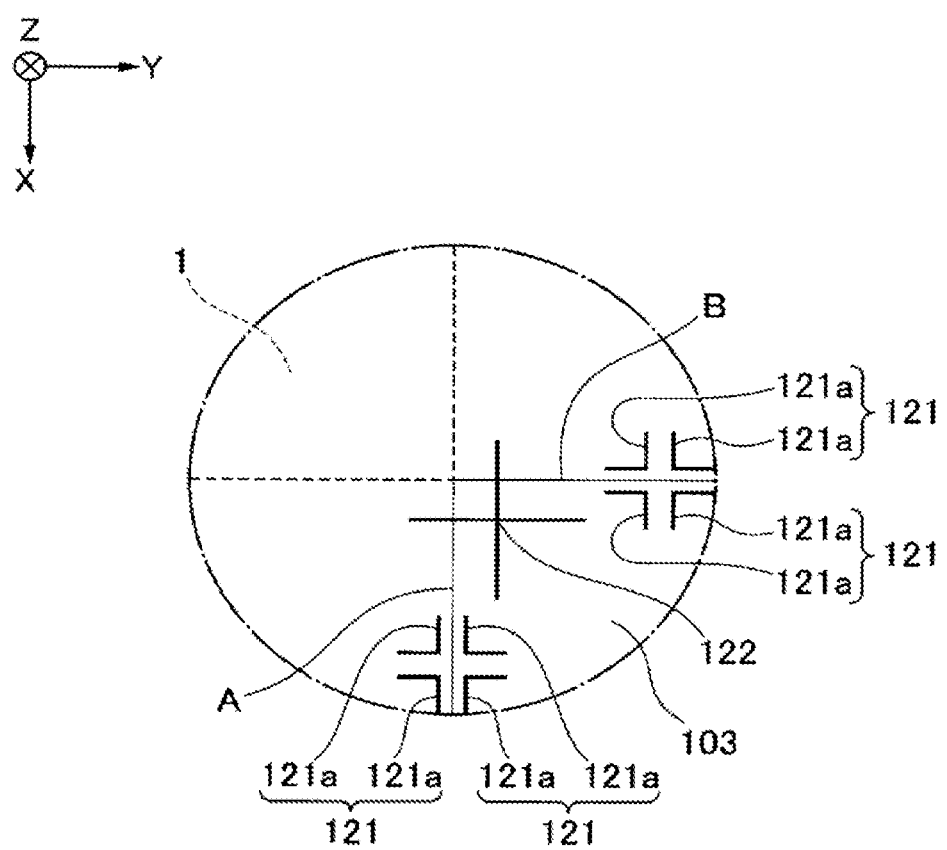
FIG. 10 is an enlarged view of the portion X in FIG. 8.

As shown in FIG. 9 and FIG. 10, plural first marks 121 and second marks 122 for positioning in extracting plural cover glasses 1 are provided in at least one of the front surface 103 or the back surface of the glass substrate 101. In FIG. 9 and FIG. 10, an extended line in the direction X of the outward form of each cover glass 1 (broken line in FIG. 8 to FIG. 10) is expressed by A, and an extended line in the direction Y is expressed by B. The first marks 121 are so arranged near the cover glass 1 that the extended line A in the direction X could be sandwiched between a pair of those marks and the extended line B in the direction Y could be between a pair of other those marks. Each first mark 121 is composed of a pair of first mark pieces 121a. The first mark piece 121a is in an approximately L-shaped form composed of vertical two sides. One side of the first mark pieces 121a neighboring each other faces each other via a slight space therebetween. The second marks 122 are arranged at the four corners of the glass substrate 101. The second mark 122 is in an approximately cross-like shape composed of vertical two sides. Of the two sides of the second mark 122, the side parallel to the extended line A in the direction X partly crosses the extended line B in the direction Y, and the side parallel to the extended line B in the direction Y partly crosses the extended line A in the direction X.

In extracting the cover glasses 1 from the glass substrate 101 by cutting, the position of the second marks 122 is read to select the cutting site, and it is confirmed that the cutting line is at the intermediate of the first mark 121 (on the extended line A in the direction X or on the extended line B in the direction Y) so that accurate cutting is thereby confirmed.

(Method for Manufacturing Glass Substrate)

Figure 11:
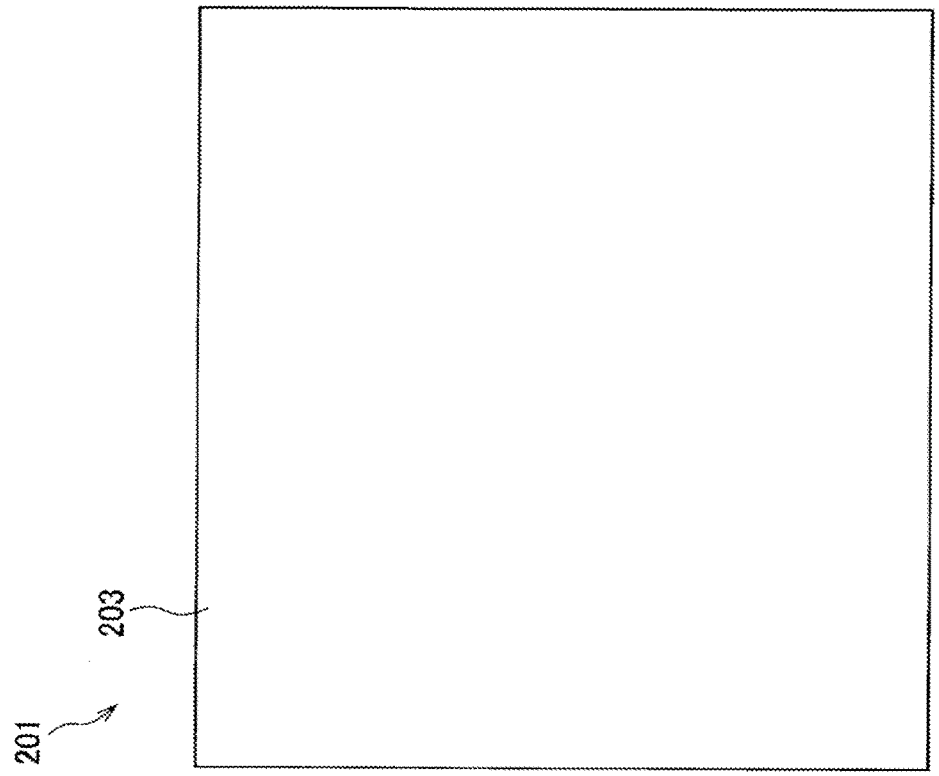
FIG. 11 is a plan view of a glass member.

Next, a method for manufacturing the glass substrate 101 is described. First, raw materials of the constituent components are prepared to have a composition to be mentioned below, and heated and melted in a glass melting furnace. The glass is homogenized by bubbling, stirring, adding a clarifying agent thereto or the like, then molded into a glass sheet having a predetermined thickness according to a conventional molding method, and the glass sheet is slowly cooled. Examples of the glass molding method include, for example, a floating method, a pressing method, a fusion method, a down drawing method, and a rolling out method. In particular, a floating method suitable for mass production is preferred. Other continuous molding methods than a floating method, that is, a fusion method and a down drawing method are also preferred. The glass member that has been formed in a tabular sheet according to a desired molding method is slowly cooled, and then cut into a desired size (the size of the glass member 201). In the case where a higher dimensional accuracy is needed, the glass member after cut may be polished. Accordingly, a glass member 201 that has a planar front surface 203 and a back surface and is tabular as a whole, as shown in FIG. 11, may be obtained.

Figure 12:
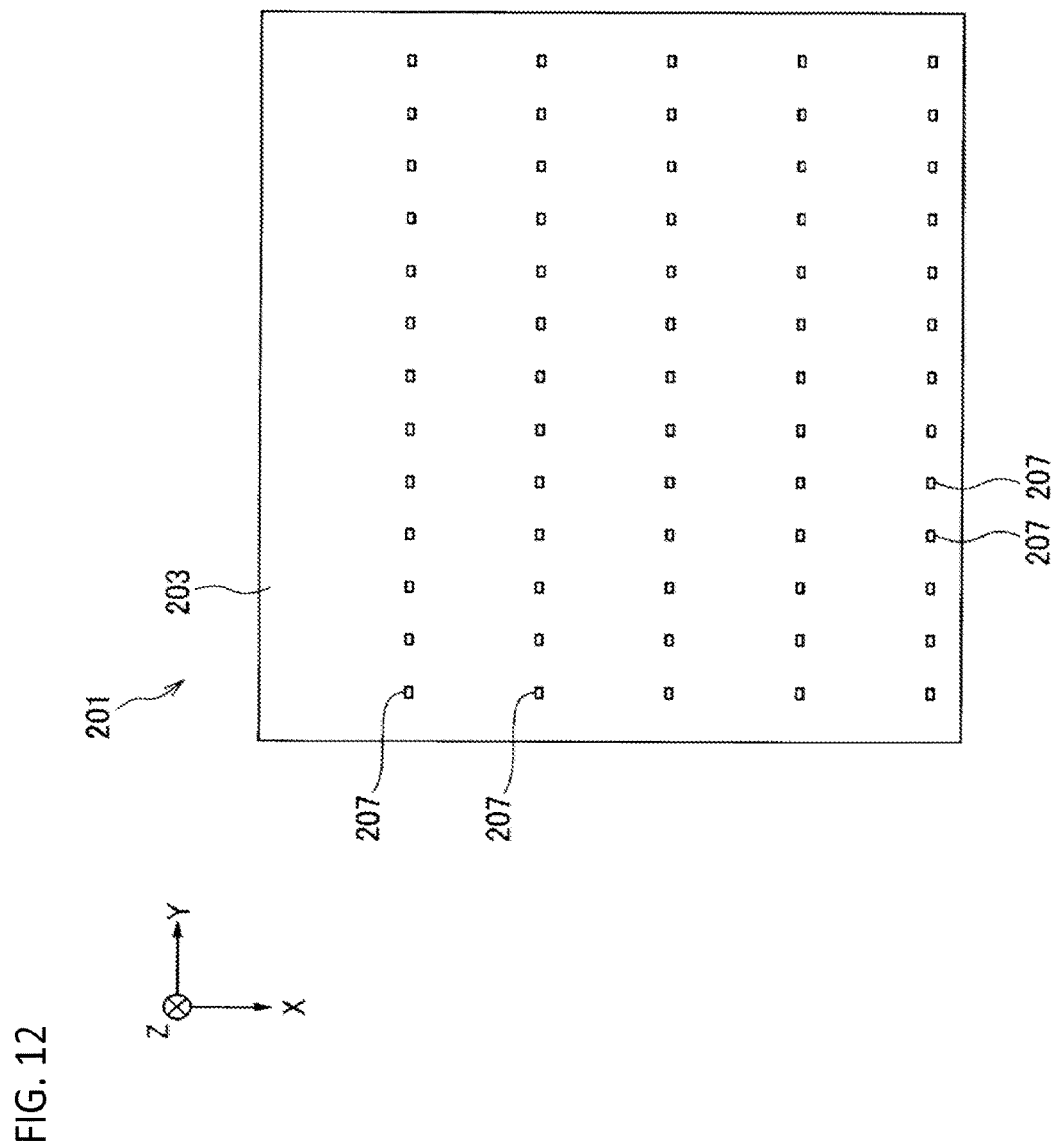
FIG. 12 is a plan view of a glass member having concave portions formed therein.
Figure 13:
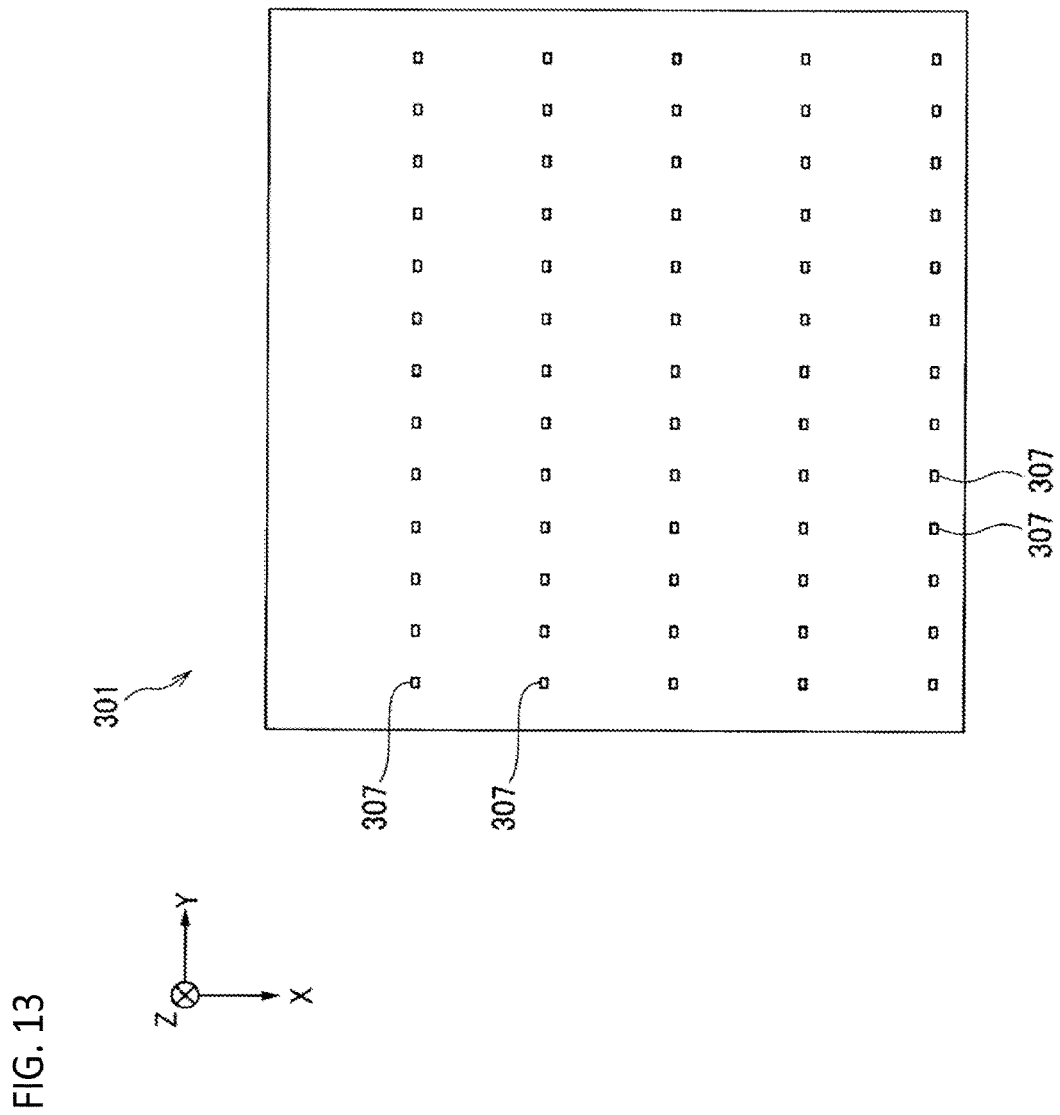
FIG. 13 is a plan view of a first mask member.
Figure 14:
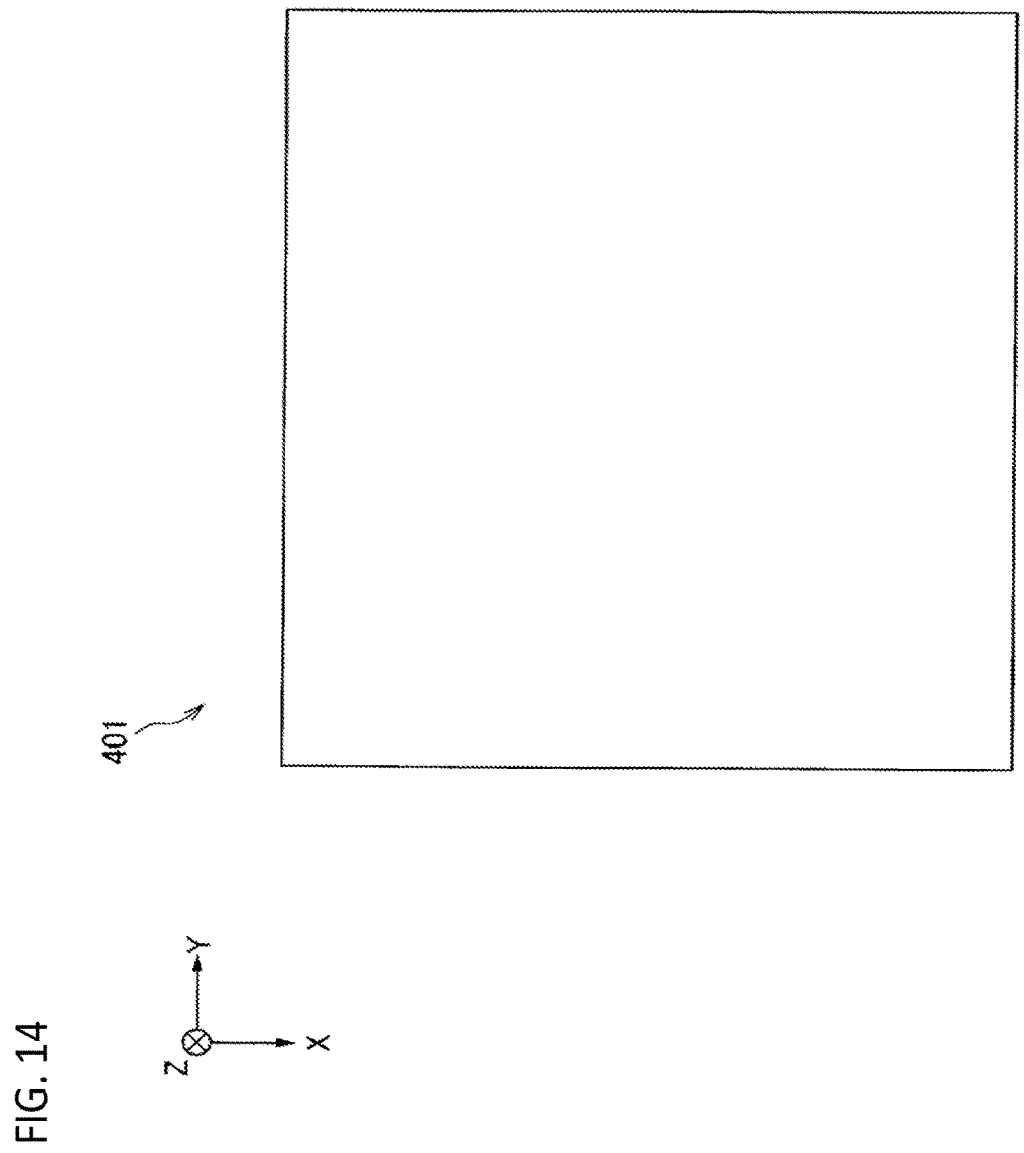
FIG. 14 is a plan view of a second mask member.

Subsequently, a concave portion forming step is carried out for providing concave portions in one surface of the front surface 203 or the back surface of the glass member 201. In the example to be described hereinunder, the concave portions 207 are provided in the front surface 203 of the glass member 201, as shown in FIG. 12. In the concave portion forming step, a first mask member 301 as shown in FIG. 13 is arranged on the front surface 203 of the glass member 201 and a second mask member 401 as shown in FIG. 14 is arranged on the back surface of the glass substrate 201, and the glass member 201 having the masks arranged is etched.

The dimension in the direction X and the dimension in the direction Y of the first mask member 301 are so planned that the mask member could entirely cover the front surface 203 of the glass member 201. In the example of FIG. 13, the dimension in the direction X and the dimension in the direction Y of the first mask member 301 are approximately the same as the dimension in the direction X and the dimension in the direction Y of the glass member 201. Further, in the first mask member 301, plural concave portion forming holes 307 for forming plural concave portions 207 in the glass member 201 are provided at predetermined intervals in the direction X and in the direction Y. Accordingly, an etchant can reach the front surface 203 of the glass member 201 through the plural concave forming holes 307 to thereby form plural concave portions 207.

The dimension in the direction X and the dimension in the direction Y of the second mask member 401 are so planned that the mask member could entirely cover the back surface of the glass member 201. In the example of FIG. 14, the dimension in the direction X and the dimension in the direction Y of the second mask member 401 are approximately the same as the dimension in the direction X and the dimension in the direction Y of the glass member 201. The second mask member 401 cover entirely the back surface of the glass substrate 201 to prevent the back surface from being etched.

The material of the first mask member 301 and the second mask member 401 may be an etchant-resistant material, for example, a photosensitive organic material, especially a resist or a resin of a photosensitive resin material, as well as a metal film, a ceramic or the like. The concave portion forming holes 307 are formed by predetermined photoexposure and development in the case of a resist.

The etching treatment may be any of wet etching or dry etching, but from the viewpoint of cost, wet etching is preferred. The etchant may be a solution containing hydrofluoric acid as the main component in the case of wet etching, and in the case of dry etching, the etchant may be a fluorine-based gas or the like. By performing the etching treatment, a glass substrate having plural concave portions can be easily obtained.

Preferably, the etching treatment is carried out by relatively moving the glass member 201 and an etchant in the directions parallel to the front surface 203 or the back surface of the glass member 201 (in the directions XY). The etching treatment may be carried out by swinging the glass member 201 in the directions XY, or by making flows of the etchant in the directions XY, or by combining the two. Basically, the etching treatment goes on isotropically relative to the glass member 201. Therefore, just below the openings of the concave portion forming holes 307 of the first mask member 301, the etching goes on also in the direction of the side surface to a radius that is the same as the etching depth whereby the side surface of the concave portion 207 of the glass member 201 can be made to have a curved shape smoothly connecting to the bottom of the concave portion 207, like that of the concave portion 7 of the cover glass 1 (see FIGS. 3A and 3B to FIG. 7). In addition, when the etching treatment is carried out in such a manner that the glass member 201 and the etchant could be relatively moved in the directions parallel to the front surface 203 or the back surface of the glass member 201 (in the directions XY), there may occur a flow to run into the side of the concave portions 207 of the glass member 201 from around the openings of the concave portion forming holes 307 of the first mask member 301 with the progress of the etching. Then, the flow rate toward the side surface from the peripheral part of the concave portion 207 is promoted more than that from the center part of the concave portion 207. As a result, the etching rate from the periphery of the concave portion 207 toward the side surface is relatively increased and the radius of curvature of the side surface of the concave portion 207 can be thereby increased toward to peripheral part from the center part of the concave portion 207. In addition, the radius of curvature of the side surface of the concave portion 207 can be equal to or higher than the depth of the bottom of the concave portion 207. When the etching treatment time and the relative moving rate between the glass member 201 and the etchant are controlled, the radius of curvature of the side surface of the concave portion 107 may be controlled to be 0.1 mm or more and 2 mm or less. Further, when the etching is carried out while relatively moving the glass member 201 and the etchant in the directions parallel to the front surface 203 or the back surface of the glass member 201 (in the directions XY), as mentioned above, the bottom of the concave portion 207 may be made to have a shape protruding toward the center part thereof.

In order that the arithmetic mean roughness Ra of the bottom of the concave portion 207, that is, the arithmetic mean roughness Ra of the outermost surface of the thin portion formed by providing the concave portion 207 could be 50 nm or less, the etching treatment may be carried out in such a manner that the flowability of the etchant on the surface of the glass substrate 201 can be increased. In addition, in order that the haze value of the thin portion could be 8% or less, the etching treatment may be carried out in such a manner that the flowability of the etchant on the surface of the glass substrate 201 can be increased. Further, in order that the bottom of the concave portion 207 could protrude toward the center part, the etching treatment may be carried out in such a manner that the etchant may form a flow to collide against the corners of the concave portion 207.

The method of providing a concave portion in one surface of the front surface 203 or the back surface of the glass member 201 is not limited to the above-mentioned method of etching treatment but may be a mechanical processing method. In the mechanical processing method, a machining center or any other numerical control machine tool is used, and while kept in contact with a grinding stone, the front surface 203 or the back surface of the glass member 201 is subjected to rotational displacement, and the concave portion 207 having a predetermined dimension is subjected to grinding, thereby obtaining a polishing face. For example, using a grinding stone prepared by fixing diamond abrasive grains, CBN abrasive grains or the like through electrodeposition or metal bonding, the surface is ground at a principal axis rotation number of 100 to 30,000 rpm and at a cutting rate of 1 to 10,000 mm/min.

According to this, the radius of curvature of the side surface of the concave portion 207 can be decreased from the center part of the concave portion 207 toward the peripheral part of the concave portion 207. In addition, the radius of curvature of the side surface of the concave portion 207 can be set to less than the depth of the bottom of the concave portion 207. According to these, extra spaces are not formed when a sensor or display panel is arranged in the concave portion 7 after the cover glass 1 is processed, and a device excellent in appearance can be obtained. It is preferred that the connecting portion between the side surface of the concave portion 207 and the front surface 203 or back surface has a smoothly continuing curved shape, as in the connecting portion between the side surface 9 of the concave portion 7 of the cover glass 1 and the front surface or back surface (see FIG. 4 and FIG. 6). The curved shape can be formed by polishing the connecting portion.

Subsequently, the bottom and the side surface of the concave portion 207 may be polished. In the polishing step, the polishing processing member of a rotational sander tool is kept in contact with the bottom and the side surface of the concave portion 207 each separately under an independent constant pressure, and is moved relatively at a constant speed. By polishing under the condition of a constant pressure and a constant speed, the surface to be processed could be uniformly polished at a constant polishing rate. The contact pressure of the polishing processing member of the rotational sander tool is preferably 1 to 1,000,000 Pa from the viewpoint of economical aspect and controllability. The speed is preferably 1 to 10,000 mm/min from the viewpoint of economical aspect and controllability. The moving amount may be suitably determined depending on the shape and the size of the glass substrate 201. The rotational sander tool is not specifically limited so far as the polishing processing member thereof is a polishing rotor, including, for example, a spindle having a tool chucking member, a Leutor system having a polishing tool mounted therein, etc. Regarding the materials constituting the rotational sander tool, the kind thereof is not specifically limited so far as at least the polishing processing member of the tool is formed of a material capable of processing a processing object and removing the processed fragment and preferably having a Young's modulus of 7 GPa or less, more preferably 5 GPa or less, such as a cerium pad, a rubber grinding stone, a felt buff, a polyurethane or the like. When a member having a Young's modulus of 7 GPa or less is used as a material constituting the rotational sander tool, the polishing processing member can be deformed by pressure so as to follow the shape of the concave portion 207 and the bottom and the side surface can be thereby processed to have the above-mentioned predetermined surface roughness. Examples of the shape of the polishing processing member of the rotational sander tool include a circular or doughnut-shaped plate member, a columnar member, a bombshell-shaped member, a disc member, a barrel-shaped member, etc.

In the case where the polishing processing member of a rotational sander tool is kept in contact with the bottom and the side surface of the concave portion 207 to polish the parts, preferably, a slurry of abrasive grains is made to be present between the member and the parts during polishing. In this case, examples of the abrasive grains include silica, ceria, ALUNDUM (trademark), WHITE ALUNDUM (WA, trademark), emery, zirconia, SiC, diamond, titania, germania, etc. Preferably, the grain size of the grains is 10 nm to 10 µm. The relative moving speed of the rotational sander tool may be selected within a range of 1 to 10,000 mm/min, as mentioned above. The rotation number of the polishing processing member of the rotational sander tool is 100 to 10,000 rpm. When the rotation number is small, the processing rate is low so that too much time will be taken for attaining the desired surface roughness, but when the rotation number is large, the processing rate is high or the tool abrasion may be severe so that the polishing would be difficult to be controlled.

In the case where the bottom and the side surface of the concave portion 207 are polished while kept in contact with a rotational sander tool each under an independent pressure, as described above, the pressure may be controlled using a pneumatic piston, a load cell or the like. For example, when a pneumatic piston for moving the rotational sander tool forward and backward in the direction toward the bottom of the concave portion 207, and another pneumatic piston for moving the rotational sander tool forward and backward in the direction toward the side surface of the concave portion 207 are provided, the pressure of the polishing processing member to the bottom and the side surface of the concave portion 207 can be controlled. In that manner, the pressure to the bottom and the side surface of the concave portion 207 is made independent of each other while a single rotational sander tool is kept in contact with those parts under an independent constant pressure thereto, and the tool is thereby moved relatively at a constant speed to realize uniform polishing of the individual surfaces simultaneously at an independent polishing rate.

The rotational sander tool and the glass member 201 may be moved relatively so as to follow the shape of the concave portion 207 for the polishing processing. The moving system may be any system capable of controlling constantly the moving amount, the direction and the speed. For example, there may be mentioned a system using a multiaxial robot, etc.

As described above, the glass member 201 having plural concave portions 207 formed therein (see FIG. 12) is given first marks 121 and second marks 122 according to a method of laser marking, printing or the like, and the glass substrate 101 as shown in FIG. 8 is thus obtained. With that, the position of the second mark 122 is read to specify the cutting position, and using a cutting tool such as a diamond cutter or the like, the glass substrate 101 is cut to extract plural cover glasses 1. Subsequently, the fact that the cover glasses 1 each having a desired shape are extracted is confirmed by the fact that the cutting line passes through the intermediate part between the pair of first marks 121 (the extended line A in the direction X or the extended line B in the direction Y).

Figure 15:
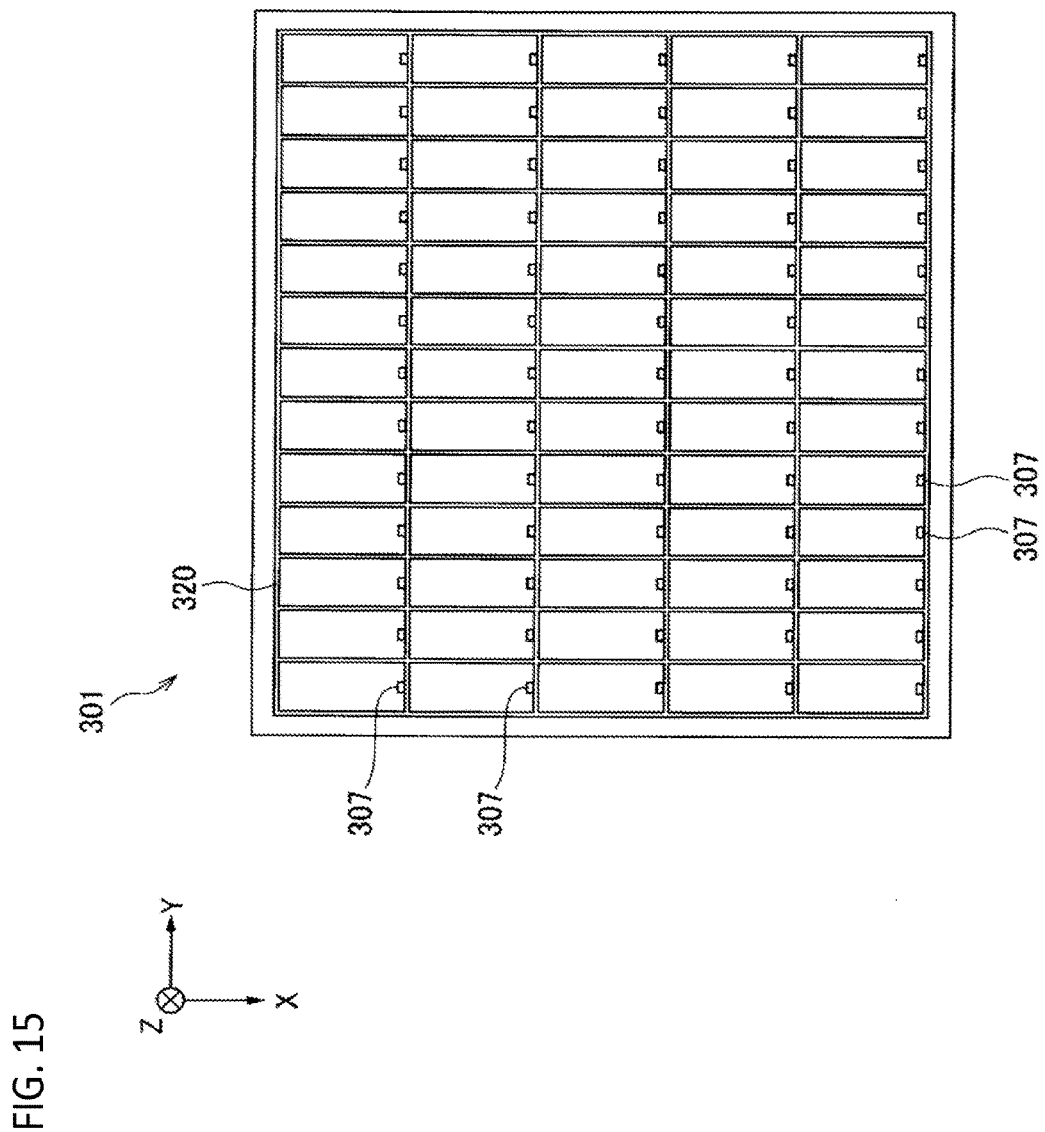
FIG. 15 is a plan view of a first mask in a modification example.
Figure 16:
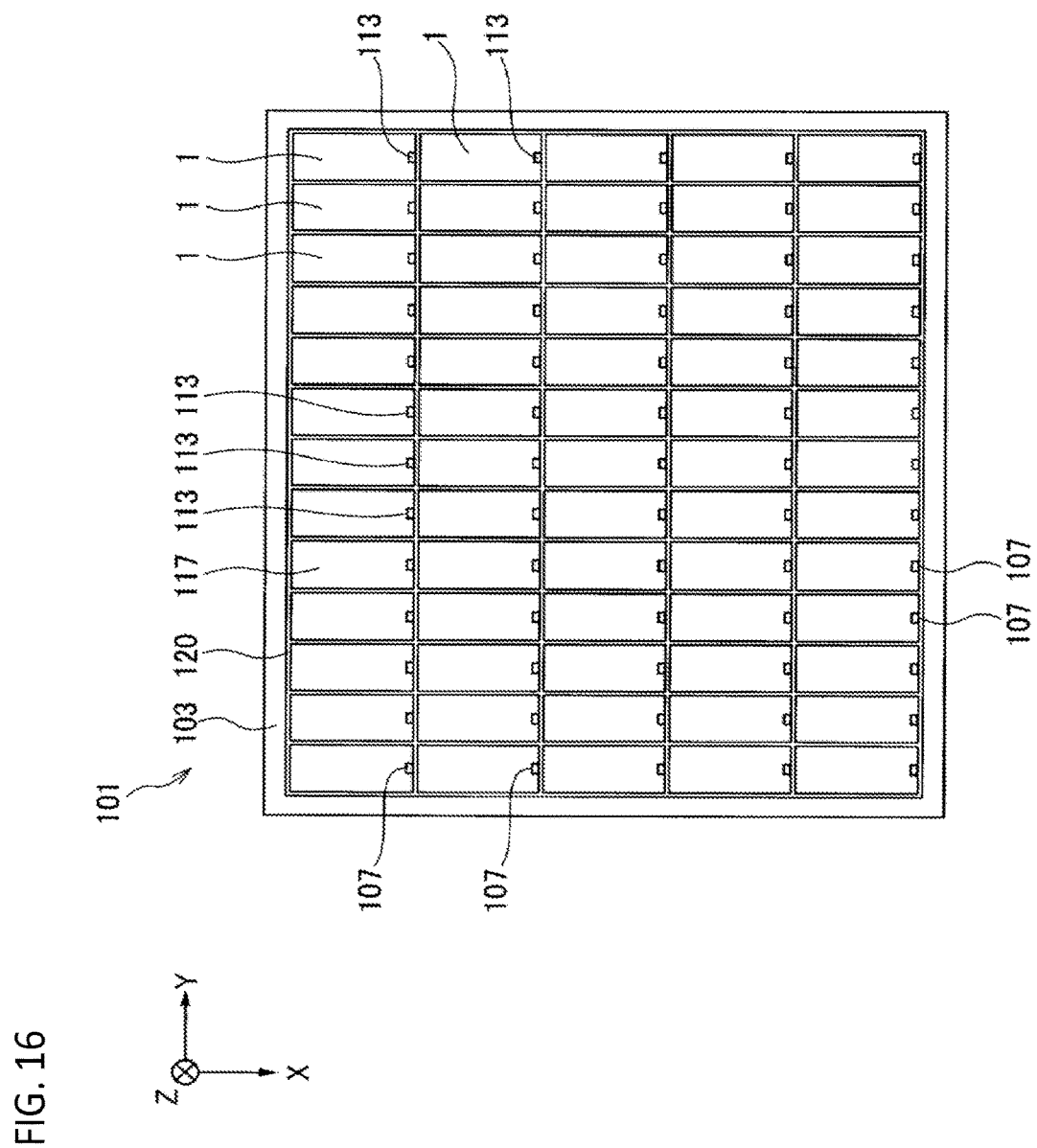
FIG. 16 is a plan view of a glass substrate in a modification example.

As shown in FIG. 15, the first mask member 301 may have groove forming holes 320 corresponding to the outward form of plural cover glasses 1. In the case where the etching is carried out using the first mask member 301 of the type, grooves 120 corresponding to the outward form of plural cover glasses 1 are provided in the front surface 103 of the glass substrate 101, as shown in FIG. 16. By cutting the glass substrate 101 along the grooves 120, plural cover glasses 1 can be thus extracted. In that manner, by previously providing grooves 120 corresponding to the outward form of the cover glasses 1 in the glass substrate 101, it is possible to more accurately extract the cover glasses 1. In addition, unlike conventional techniques, it is not necessary to prepare a mask having a shape of a cover glass.

Figure 17:
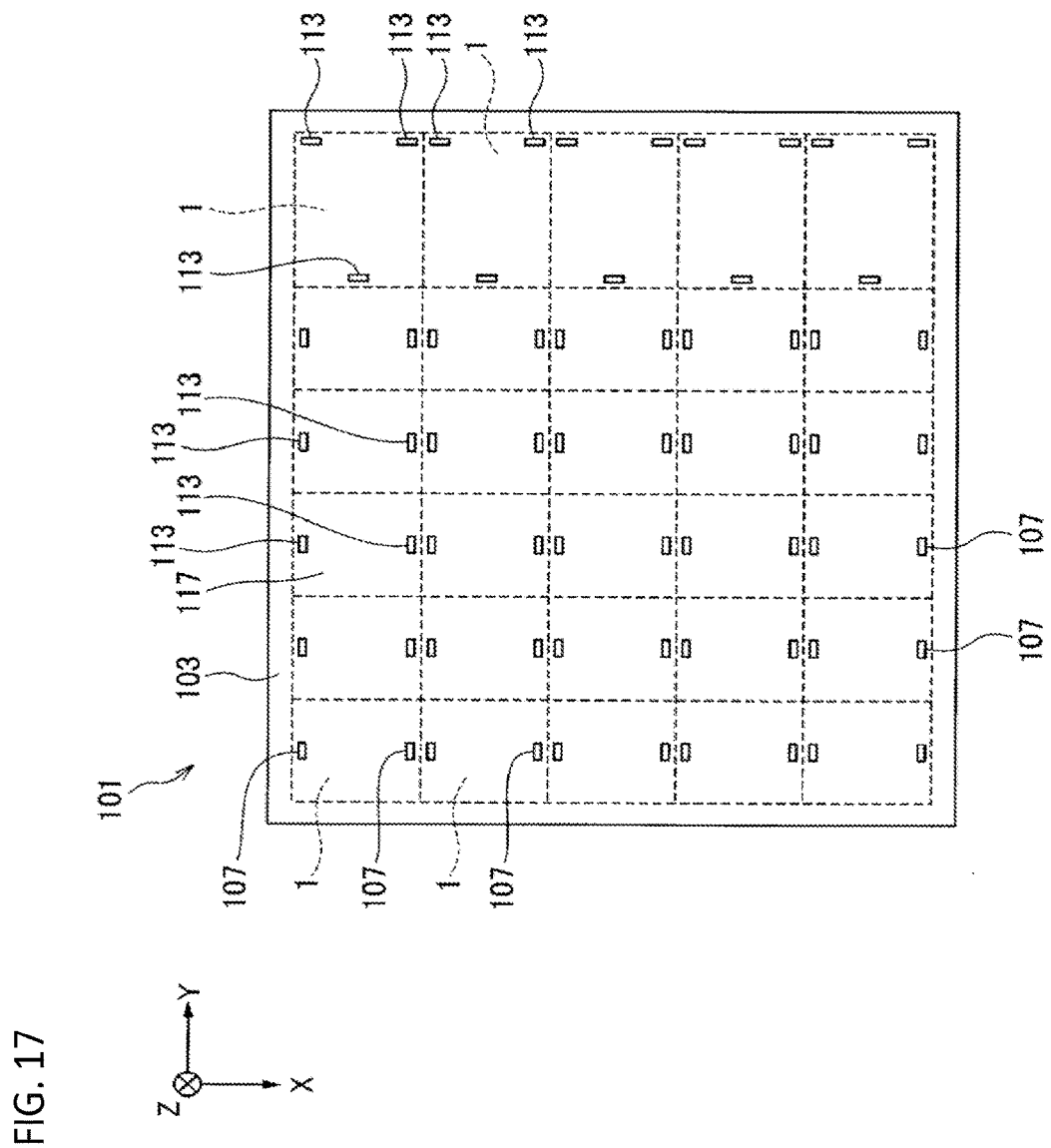
FIG. 17 is a plan view of a glass substrate in a modification example.

As shown in FIG. 17, plural cover glasses 1 may be extracted from the glass substrate 101 in such a manner that each cover glass may contain plural concave portions 107. For example, as shown in FIG. 18, in the case where a plural number of various devices including a sensor 40, a camera module 42 and the like are to be arranged on the back surface of the cover glass 1, the same number of concave portions 107 as that of the sensor 40, the camera module 42 and the like may be provided.

Figure 18:
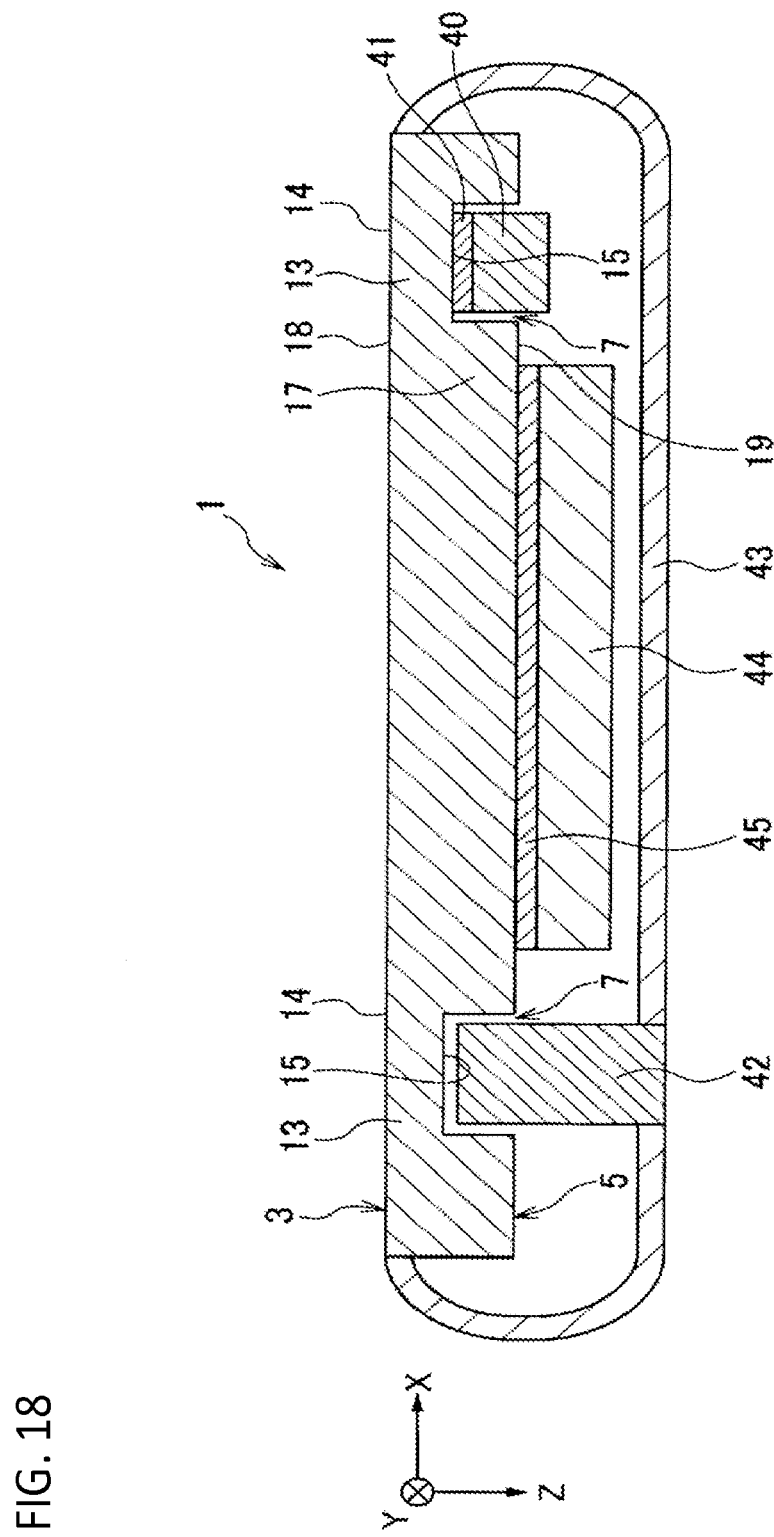
FIG. 18 is a cross-sectional view of a cover glass incorporated into a housing.

FIG. 18 shows a configuration where a sensor 40, a camera module 42 and a liquid-crystal layer 44 are housed in a housing 43 of a smartphone or the like. Here, the liquid-crystal layer 44 is fixed to the back surface 5 (the back surface 19 of the thick portion 17) of the cover glass 1 via an adhesive layer 45. Regarding the camera module 42, the tip thereof on the side of a lens is fixed to the housing 43. In this configuration, the tip of the camera module 42 may extend toward the outside from the housing 43. However, as in the illustrated example, the concave portion 7 may be provided in the back surface 5 of the cover glass 1 at the position that faces the camera module 42, whereby the basal portion of the camera module 42 may be housed in the concave portion 7 to thereby absorb the thickness of the camera module 42. Accordingly, the configuration of the type contributes toward constituting a flash-surface structure including a camera member in advanced thin-wall instruments. On the other hand, the tip and the basal portion of the camera module 42 may be reversed so as to fix the lens of the camera module 42 to the concave portion 7 of the cover glass 1. Accordingly, the concave portion 7 of the cover glass 1 may function like a "lens protector" that is often used for the lens of a single-lens reflex camera, and is effective for protecting a camera lens and for preventing dust invasion. In this case, the bottom of the concave portion 7 (the back surface 15 of the thin portion 13) needs optical polishing, and the side surface of the concave portion 7 must be protected from light. An anti-fingerprint layer capable of preventing contamination with fingerprints as well as an antireflection layer of $MgF_2$ or the like may be formed in the concave portion 7 or on the front surface 14 of the thin portion 13.

Figure 19:
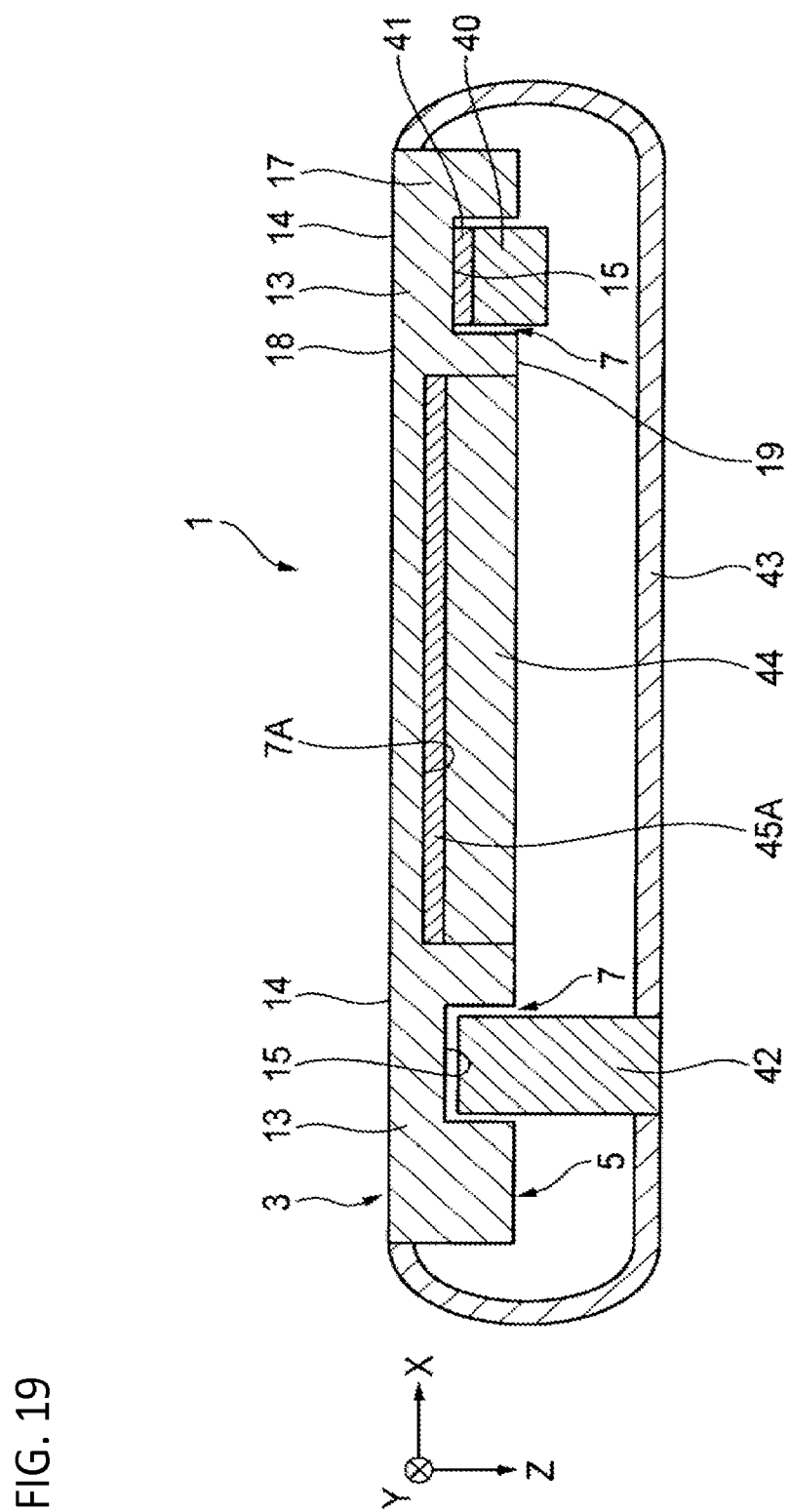
FIG. 19 is a cross-sectional view of a cover glass incorporated into a housing.

FIG. 19 shows the state where the concave portion 7A is provided in the cover glass 1 shown in FIG. 18 and a liquid-crystal layer 44 is arranged in the concave portion 7A via an adhesive layer 5A. According to this structure, since the liquid-crystal layer 44 is stored in the concave portion 7A of the cover glass 1, the effects of protecting the liquid-crystal layer 44 and preventing dust invasion are obtained.

The shape of the concave portion 107 is not specifically limited, and any shape is applicable thereto. For example, the cross-sectional shape seen from the direction Z of the concave portion 107 is not limited to a rectangular shape, and any of a circular shape, an elliptical shape, an oval shape, a triangular shape and the like is applicable thereto.

(Method for Manufacturing Cover Glass)

Next, a method for manufacturing the cover glass 1 is described. As described above, by extracting plural cover glasses 1 so as to each contain at least one concave portion 107 from the glass substrate 101, cover glasses 1 shown in FIG. 1 to FIG. 7 can be obtained. The cover glass 1 may be a glass having at least one bent portion. The concave portion 7 may be formed in the bent portion.

Here, after the glass substrate 101 has been chemically strengthened, plural cover glasses 1 may be extracted; or after plural cover glasses 1 have been extracted, each cover glass 1 may be chemically strengthened. In the former case, the step of polishing and chemically strengthening may be carried out in the state where the glass is in the form of a large sheet, and these steps may be thereby streamlined. In the latter case, the polishing device and the ion-exchange bath may be small-sized ones, and the cover glass 1 can be chemically strengthened so as to entirely cover the edge surfaces thereof, and therefore the strength of the edge surfaces is easily enhanced.

Chemical strengthening refers to a treatment of substituting (ion exchanging) alkali ions (for example, sodium ions) having a small ionic radius in the surface layer of the glass with alkali ions (for example, potassium ions) having a large ionic radius. The method of chemical strengthening is not particularly limited as long as alkali ions in the surface layer of the glass can be exchanged with alkali ions having a larger ionic radius. For example, the chemical strengthening treatment can be performed by treating glass containing sodium ions with a molten salt containing potassium ions. Due to the above-described ion exchange treatment, the composition of the center part of a substrate in the thickness direction is substantially the same as the composition thereof before the ion exchange treatment although the composition of a compressive stress layer in the glass surface layer is slightly different from the composition thereof before the ion exchange treatment.

When glass containing sodium ions is used as the glass to be chemically strengthened, it is preferable that a molten salt containing at least potassium ions is used as the molten salt for the chemical strengthening treatment. Preferable examples of the molten salt include potassium nitrate. It is preferable that the molten salt has high purity. The chemical strengthening treatment may be performed once, and may be performed two or more times at different condition(s).

In addition, the molten salt may be a mixed molten salt containing some other component(s). Examples of the other component(s) include: an alkali sulfate such as sodium sulfate or potassium sulfate; an alkali chloride such as sodium chloride or potassium chloride; a carbonate such as sodium carbonate or potassium carbonate; and a bicarbonate such as sodium bicarbonate or potassium bicarbonate.

The heating temperature of the molten salt is preferably 350° C. or higher, more preferably 380° C. or higher, and still more preferably 400° C. or higher. In addition, the heating temperature of the molten salt is preferably 500° C. or lower, more preferably 480° C. or lower, and still more preferably 450° C. or lower. By adjusting the heating temperature of the molten salt to be 350° C. or higher, a problem that chemical strengthening is less likely performed, caused by a decrease in an ion exchange rate, is prevented. In addition, by adjusting the heating temperature of the molten salt to be 500° C. or lower, the decomposition and deterioration of the molten salt can be suppressed.

In order to impart a sufficient compressive stress, the contact time between glass and a molten salt is preferably 1 hour or longer and more preferably 2 hours or longer. When the ion exchange treatment is performed for a long period of time, the productivity decreases, and the compressive stress value decreases due to relaxation. Therefore, the contact time is preferably 24 hours or shorter and more preferably 20 hours or shorter. Specifically, for example, typically, glass is dipped in a molten potassium nitrate at 400° C. to 450° C. for 2 hours to 24 hours.

In the chemically strengthened cover glass 1, a compressive stress layer is formed in the surface thereof. The surface compressive stress (CS) of the compressive stress layer is preferably 300 MPa or higher and more preferably 400 MPa or higher. CS may be measured, using a surface stress meter (for example, FSM-6000, manufactured by Orihara Manufacturing Co., Ltd.), etc.

When sodium ions in a glass surface layer are ion-exchanged with potassium ions in a molten salt by chemical strengthening, the depth of the surface compressive stress layer (DOL) formed by chemical strengthening can be measured using an arbitrary method. For example, using an electron probe micro-analyzer (EPMA), the alkali ion concentration (in this example, potassium ion concentration) in the thickness direction of glass is analyzed, and the ion diffusion depth obtained by the measurement can be set as DOL. That is, when the glass substrate 101 or cover glass 1 is chemically strengthened, a potassium ion concentration in the front surface or back surface of them is higher than that in the center part of the thick portion in the thickness direction in a section view thereof. In addition, DOL can be measured using a surface stress meter (for example, FSM-6000, manufactured by Orihara Manufacturing Co., Ltd.). When lithium ions in a glass surface layer are ion-exchanged with sodium ions in a molten salt, the sodium ion concentration in the thickness direction of glass is analyzed using an EPMA, and the ion diffusion depth obtained by the measurement is set as DOL.

The internal tensile stress (Central Tension; CT) of the cover glass 1 is preferably 200 MPa or lower, more preferably 150 MPa or lower, still more preferably 100 MPa or lower, and most preferably 80 MPa or lower. In general, CT can be approximately obtained from a relational expression "CT=(CS×DOL)/(t−2×DOL)" wherein t represents the thickness of the cover glass 1.

The strain point of the glass substrate 101 or the cover glass 1 before chemical strengthening is preferably 530° C. or higher. By adjusting the strain point of the glass substrate 101 or the cover glass 1 before chemical strengthening to be 530° C. or higher, the relaxation of the surface compressive stress is not likely to occur.

A film may be formed on at least one of the front surface 14 and the back surface 15 of the thin portion 13 for reducing warpage that may occur during strengthening the thin portion 13. Though not shown, examples of the film may include a surface film to be formed on the front surface 14 of the thin portion 13, a back film to be formed on the back surface 15 thereof, a side surface film to be formed on the side surface 9a in the direction X and the side surface 9b in the direction Y of the concave portion 7, etc (see FIG. 3A and FIG. 3B).

These films inhibit chemical strengthening in the parts where the films are formed (the front surface 14, the back surface 15, the side surface 9a in the direction X and the side surface 9b in the direction Y). For exhibiting the effect of inhibiting chemical strengthening, it is desirable that the films contain an oxide, a nitride, a carbide, a boride, a silicide, a metal, etc. This is because, in the film containing the substance, the diffusion coefficient of sodium ions and potassium ions could be smaller than that in glass.

Examples of the oxide include alkali-free oxides, and composite oxides containing an alkali metal or an alkaline earth metal. $SiO_2$ is especially preferred. When the film contains $SiO_2$ as a main component, diffusion of sodium ions and potassium ions could be suitably inhibited in the film. Further, the transmittance of the film is high and the refractive index thereof is close to that of glass, and therefore the appearance change to be caused by the coating could be minimized. In addition, the film containing $SiO_2$ as a main component has high physical durability and chemical durability.

The thickness of the film is 10 nm or more, preferably 12 nm or more, more preferably 15 nm or more, even more preferably 20 nm or more, and still more preferably 25 nm or more. When the thickness is 10 nm or more, the film can prevent the part coated with it from being chemically strengthened owing to the ion-exchange inhibiting effect thereof. When the film thickness is larger, the chemical strengthening inhibiting effect could be higher.

The thickness of the film is 1000 nm or less, preferably 500 nm or less, more preferably 200 nm or less, even more preferably 100 nm or less, still more preferably 50 nm or less. When the film thickness is more than 1000 nm, the warpage of the thin portion 13 would increase. In addition, the difference in the appearance between the coated part and the uncoated part would increase.

The cover glass 1 may also be glass that is not chemically strengthened.

An anti-glare treated layer formed by an anti-glare treatment may be formed on the front surface 3 or back surface 5 of the cover glass 1. A functional layer is preferably formed on the front surface 3 of the cover glass 1. Examples of the anti-glare treatment include etching treatment with hydrofluoric acid or the like, coating treatment, etc. The etching treatment may be carried out before chemical strengthening and may be carried out after chemical strengthening, and the etching treatment is preferably carried out before chemical strengthening. The coating treatment may be carried out after chemical strengthening or before chemical strengthening. In the case of forming the anti-glare treated layer by the coating treatment, the composition in the center part of the thick portion in a thickness direction of the cover glass 1 in a section view thereof can be different from a composition of the anti-glare treated layer. Accordingly, the composition can be changed so that reflective index of the anti-glare treated layer could be smaller than that of the cover glass 1, and antireflection effects can also be obtained. In the case where the components of the anti-glare treated layer are inorganic materials, any of etching treatment or coating treatment may be employed, but in the case where the components of the anti-glare treated layer are organic materials, the film may be formed by coating treatment. In addition, inorganic fluorides or inorganic chlorides may be formed so that a layer including fluorine or chlorine could be arranged in the outermost surface of the cover glass or anti-glare treated layer. Since the hydrophilicity can be improved, dusts can be easily washed with water.

Figure 20:
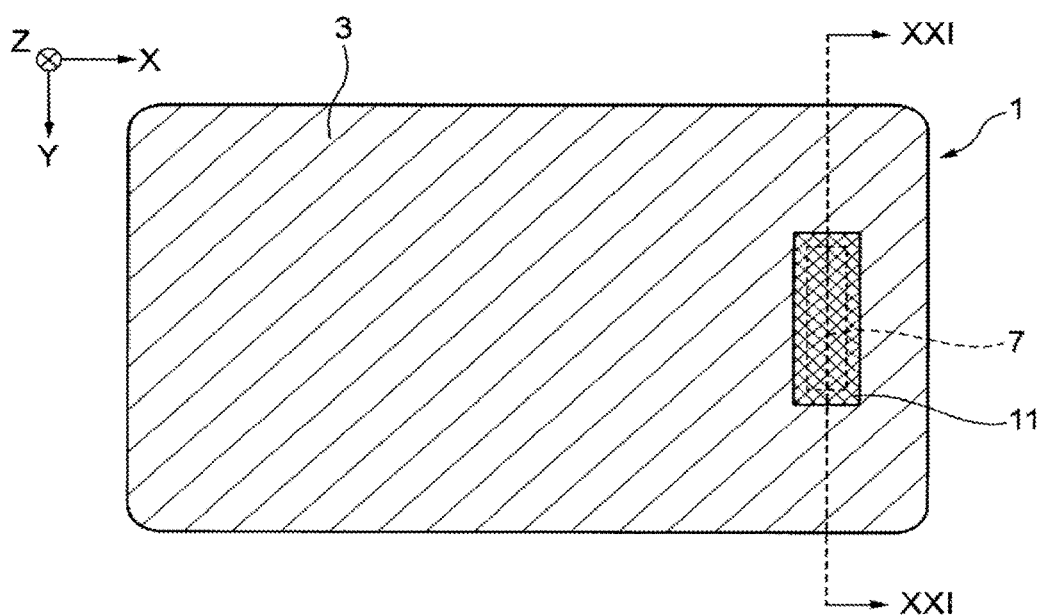
FIG. 20 is a plan view of a cover glass on which an anti-glare treated layer has been formed.
Figure 21A:
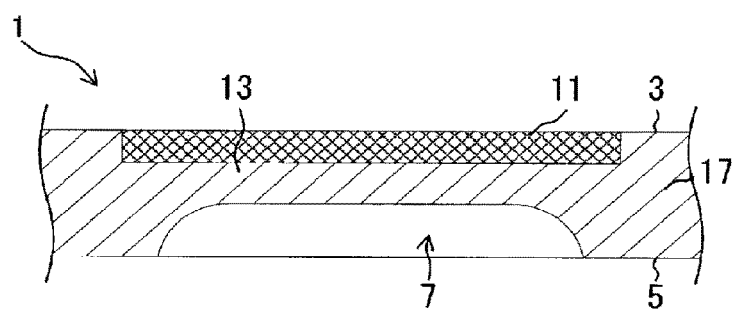
FIG. 21A and FIG. 21B are cross-sectional views taken along the line XXI-XXI of FIG. 20.
Figure 21B:
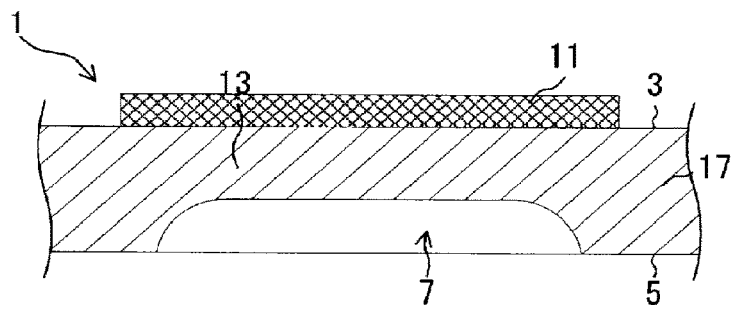
Figure 22:
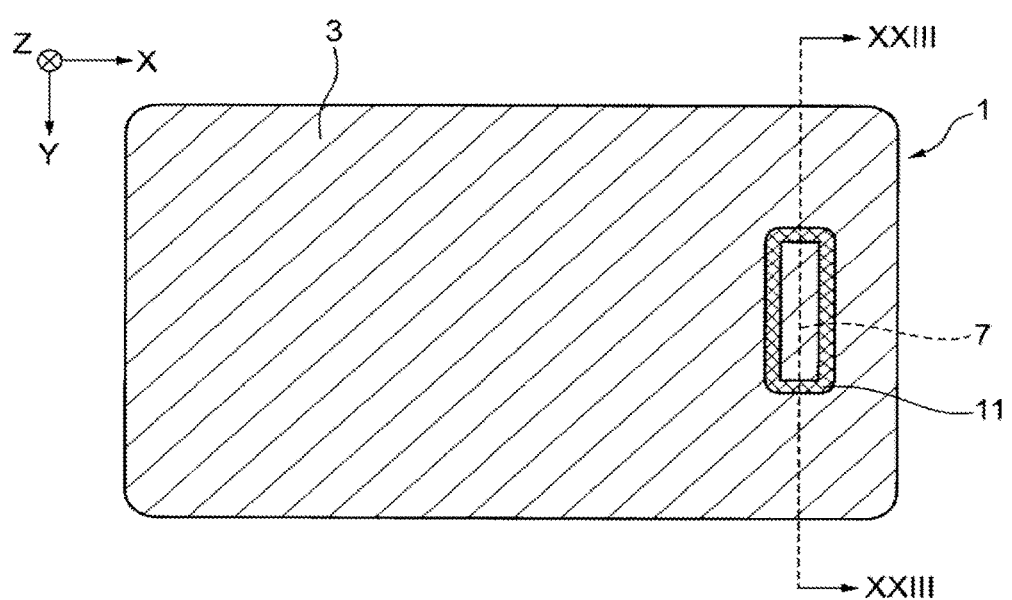
FIG. 22 is a plan view of a cover glass on which an anti-glare treated layer has been formed in a modification example.
Figure 23A:
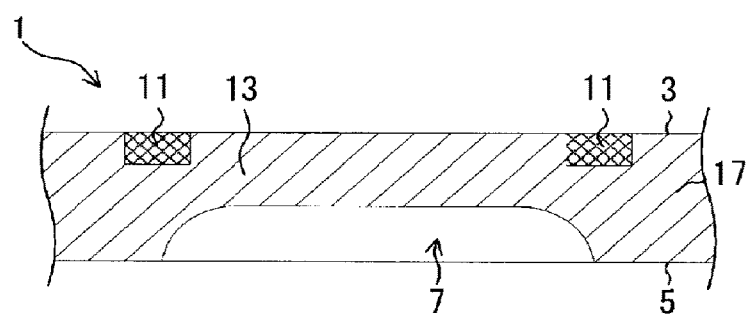
FIG. 23A and FIG. 23B are cross-sectional views taken along the line XXIII-XXIII of FIG. 22.
Figure 23B:
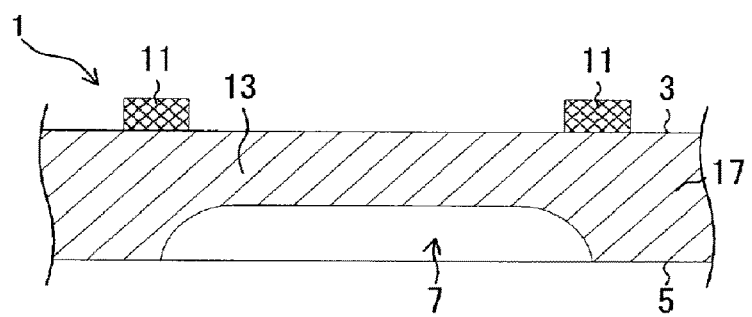
Figure 24A:
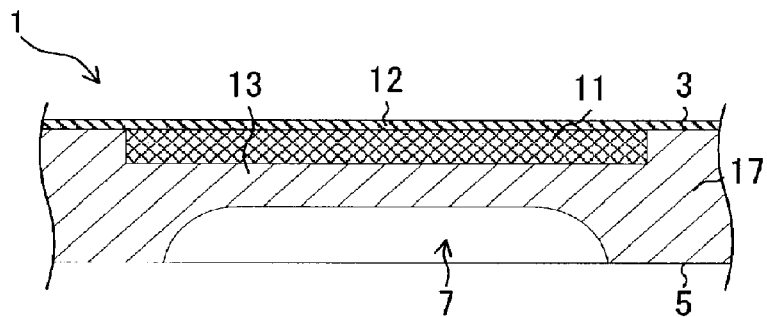
FIG. 24A to FIG. 24D are cross-sectional views of a cover glass on which an anti-fingerprint layer has been formed.
Figure 24B:
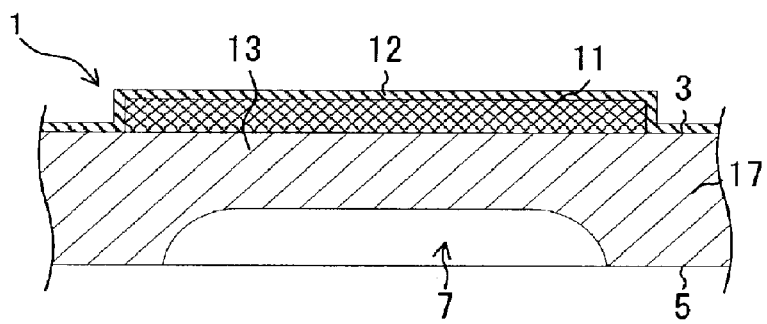
Figure 24C:
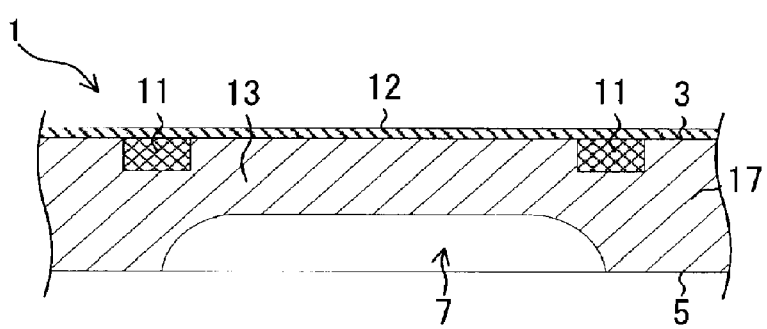
Figure 24D:
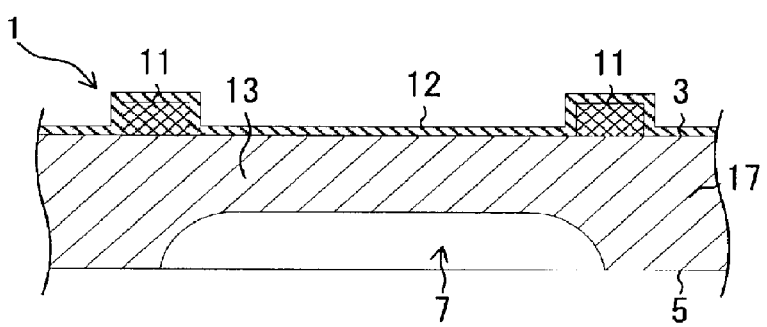
Figure 25A:
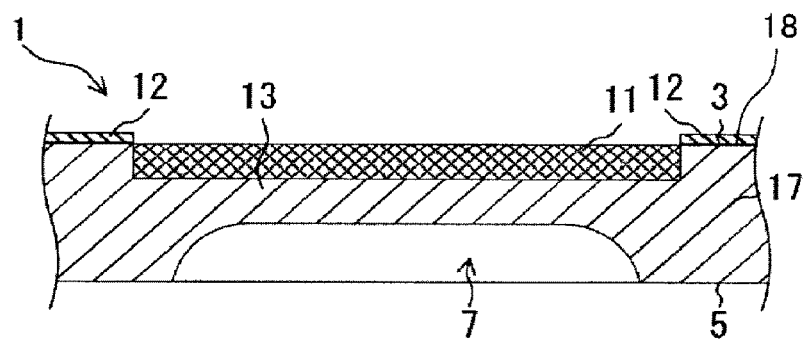
FIG. 25A to FIG. 25D are cross-sectional views of a cover glass on which an anti-fingerprint layer has been formed in a modification example.
Figure 25B:
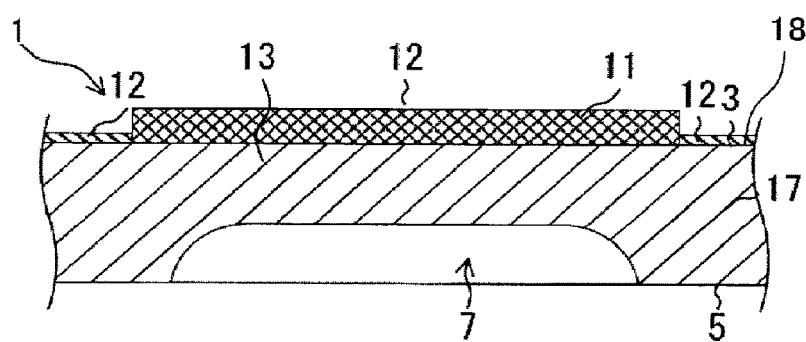
Figure 25C:
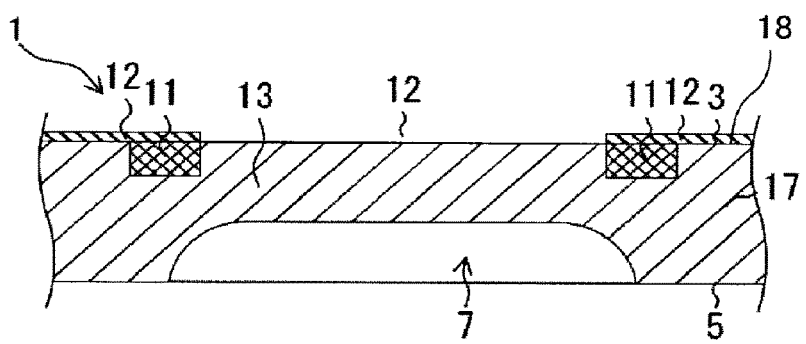
Figure 25D:
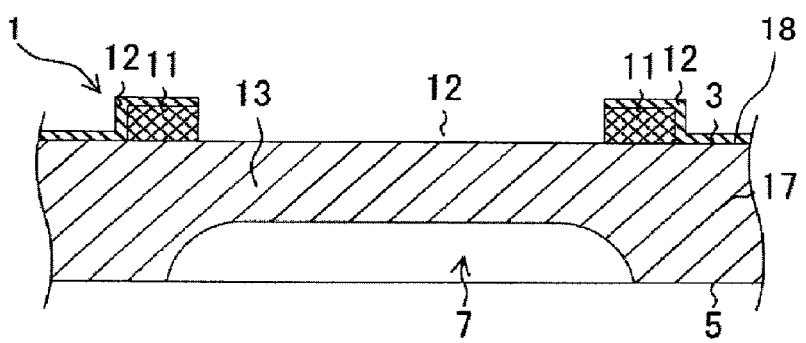

When the concave portion 7 is provided in the back surface of the cover glass 1, it is considered that an anti-glare treated region 11 is provided on the front surface 3 that faces the concave portion 7, as shown in FIG. 20, FIG. 21A and FIG. 21B. Since the front surface 3 of the cover glass 1 has no concave portion and is flat, when a user uses an assembly thereof, the position of a sensor could not be immediately recognized by sight. Then, when the front surface 3 that faces the concave portion 7 is subjected to the anti-glare treatment, a user could recognize the assembly by sight and the sensor position could be immediately recognized. In addition, depending on anti-glare treatment conditions, even if a user does not recognize by sight, the effect of allowing the user to immediately recognize the sensor position by touch can be obtained. In addition, it is preferred that an anti-glare treatment region 11 is provided in at least a part of peripheral parts of a position that faces the concave portion 7 on the front surface 3 of the cover glass 1, as shown in FIG. 22, FIG. 23A and FIG. 23B. The sensor is arranged in the concave portion 7, and fingerprint of a finger or the like to contact with a position that faces the concave portion 7 is detected. By providing the anti-glare treatment region 11 on the peripheral parts of the position that faces the concave portion 7, detection sensitivity can be maintained.

Figure 26A:
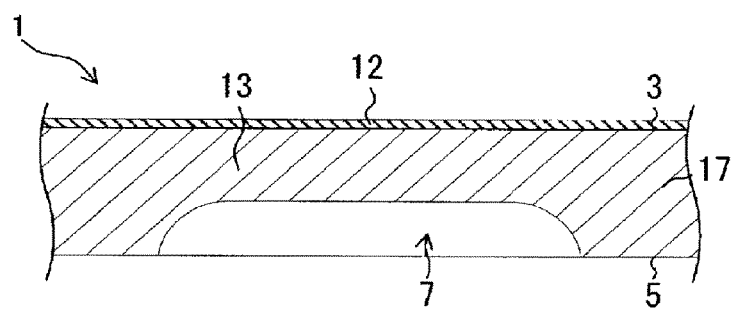
FIG. 26A and FIG. 26B are cross-sectional views of a cover glass on which an anti-fingerprint layer has been formed in a modification example.
Figure 26B:
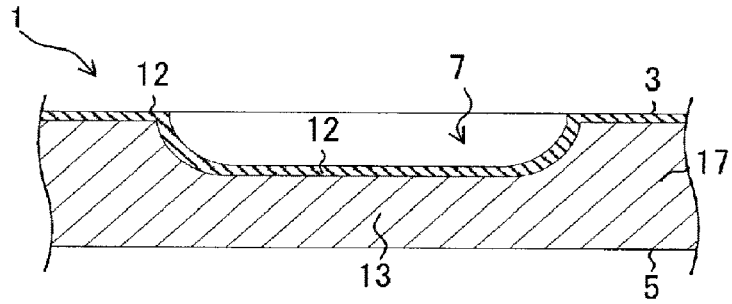

An anti-fingerprint layer 12 may be formed on the anti-glare treated layer, as shown in, e.g. FIG. 24A to FIG. 24D and FIG. 25A to FIG. 25D. The anti-fingerprint layer 12 may be formed on a whole surface of the front surface of the cover glass 1. According to this, even when a finger is contact with a cover glass, fingerprint is hardly attached thereto, and even if the cover glass gets dirty, the dirty can be easily cleaned off. In addition, the anti-fingerprint layer 12 may be formed only on the front surface of the thin portion 13 which is often contact with a finger, e.g. in the case of carrying out fingerprint authentication. In the case where a material of the anti-fingerprint layer 12 readily generates static electricity, there is a concern that the detection sensitivity may be lowered by the static electricity, depending on the kind of a sensor. In this case, the anti-fingerprint layer may be provided only on the front surface 18 of the thick portion 17 other than the position that faces the concave portion 7 on the front surface 3 of the cover glass 1, as shown in FIG. 25A to FIG. 25D. The anti-fingerprint layer 12 may be formed on the front surface 3 of the cover glass 1 which has not been anti-glare treated, as shown in FIG. 26A and FIG. 26B. The functional layer described above may be formed on the glass substrate 101 beforehand.

Preferably, the front surface 3 and the back surface 5 of the cover glass 1 are polished. A strengthened glass sheet that has been chemically strengthened by ion exchange treatment may have defects in the outermost surface thereof. In addition, fine irregularities of at most 1 µm or so may remain in the surface of the sheet. When the cover glass 1 is given an action of force, stress may concentrate in the part where the above-mentioned defects and fine irregularities exist, and the sheet may be cracked by a force smaller than a theoretical strength. Therefore, the layer (defective layer of a part of a chemically strengthened layer) having defects and fine irregularities still existing in the front surface 3 and the back surface 5 of the cover glass 1 after the chemical strengthening is removed by polishing. The thickness of the defect layer having the defects is, though depending on the chemical strengthening conditions, generally 0.01 to 0.5 The polishing may be carried out, for example, using a double side polisher. The double side polisher has a carrier applied part having a ring gear and a sun gear that are rotationally driven at a predetermined rotation ratio, and an upper surface plate made of a metal and a lower surface plate made of a metal that are rotationally driven in a counter direction while sandwiching the carrier applied part therebetween. In the carrier applied part, plural carriers are mounted each engaging with the ring gear and the sun gear. The carrier moves as a planetary gear motion in such a manner that it rotates around the center of itself as a rotation axis and orbits around the sun gear as a revolving axis, and owing to the planetary gear motion, both surfaces (the front surface 3 and the back surface 5) of the plural cover glasses 1 attached to the carrier are polished by the friction against the upper surface plate and the lower surface plate.

A printing layer is provided on the back surface 5 of the cover glass 1. The printing layer can be formed of an ink composition containing a predetermined color material. In addition to the color material, the ink composition may contain a binder, a dispersant, a solvent and the like according to need. The color material may be a color material (colorant) such as a pigment or a dye. Among these, one kind or a combination of two or more kinds can be used. The color material can be appropriately selected according to a desired color. For example, when light shielding properties are required, for example, a black color material is preferably used. The binder is not particularly limited, and examples thereof include conventional resins (for example, a thermoplastic resin, a thermosetting resin, or a photo curable resin) such as a polyurethane resin, a phenol resin, an epoxy resin, an urea melamine resin, a silicone resin, a phenoxy resin, a methacrylic resin, an acrylic resin, a polyarylate resin, a polyester resin, a polyolefin resin, a polystyrene resin, a polyvinyl chloride, a vinyl chloride-vinyl acetate copolymer, a polyvinyl acetate, a polyvinylidene chloride, a polycarbonate, a cellulose, a polyacetal, etc. Among these, one kind or a combination of two or more kinds can be used as the binder.

A printing method for forming the printing layer is not particularly limited, and an appropriate printing method such as a gravure printing method, a flexographic printing method, an offset printing method, a relief printing method, a screen printing method, a pad printing method, a spray printing method, a film transfer method or the like can be used.

Figure 27:
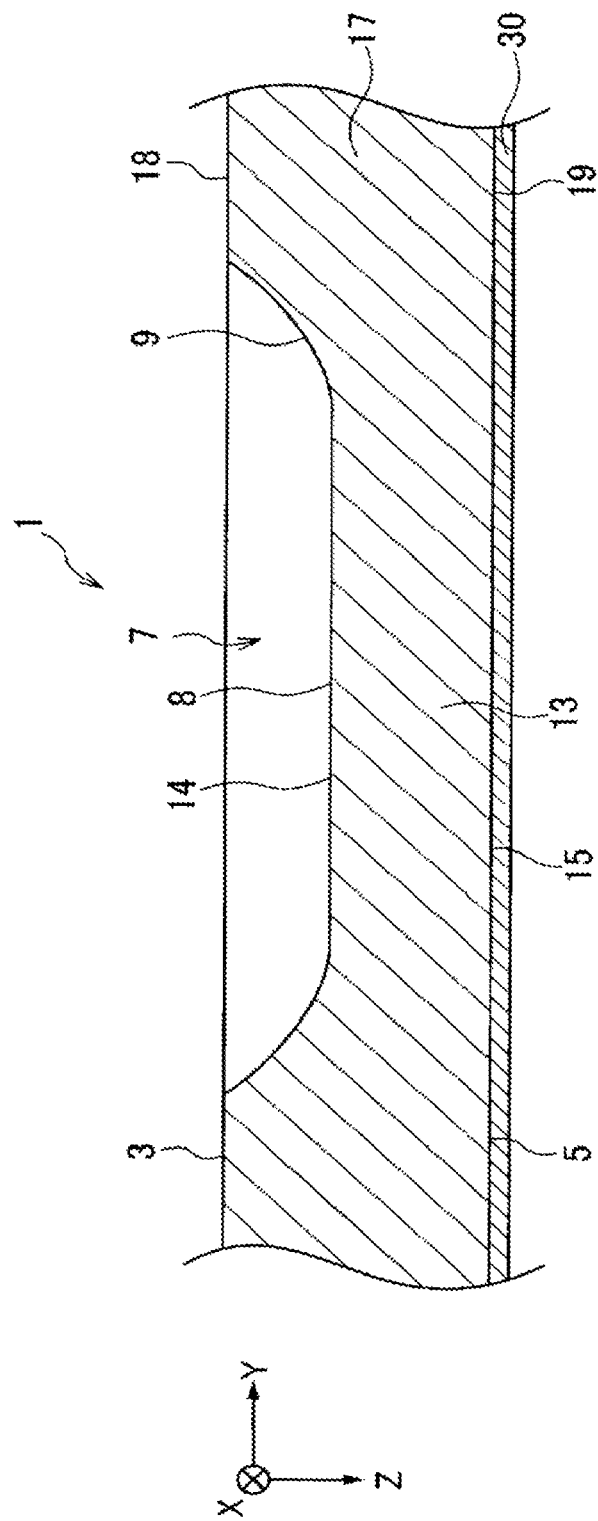
FIG. 27 is a cross-sectional view of a cover glass provided with a printing layer.

Here, when the concave portion 7 is provided in the front surface 3 of the cover glass 1 (see FIG. 5A, FIG. 5B and FIG. 6), it is easy to form a printing layer 30 on the back surface that is in a planar shape as shown in FIG. 27. By coloring the bottom 8 or the side surface 9 of the concave portion 7, the position could be readily recognized by sight. When the position corresponding to the side surface 9 is printed to be in mirror reflection (for example, in a mode of silver printing), the shape having a curvature of the side surface 9 may exhibit a lens effect so that the reflection corresponding to the side surface 9 can reflect in a wide angle even when the angle of the cover glass 1 is changed, therefore glaring to produce a premium appearance.

On the other hand, when the concave portion 7 is provided in the back surface 5 of the cover glass 1 (see FIG. 1 to FIG. 4), preferably, the printing is carried out individually in the concave portion 7 and in the flat part not having the concave portion 7 of the back surface 5 of the cover glass 1. This is because, in a printing method such as a screen printing method or the like, the shape followability is not so high, and therefore it is difficult to print the concave portion 7 and the flat part not having the concave portion 7 all at once. Accordingly, by individually printing these parts, a higher accurate printing can be realized. In addition, by varying the printing color and the printing texture between the concave portion 7 and the flat part not having the concave portion 7, the position of the sensor 40 can be more readily recognized by sight, therefore providing important design originality.

Figure 28:
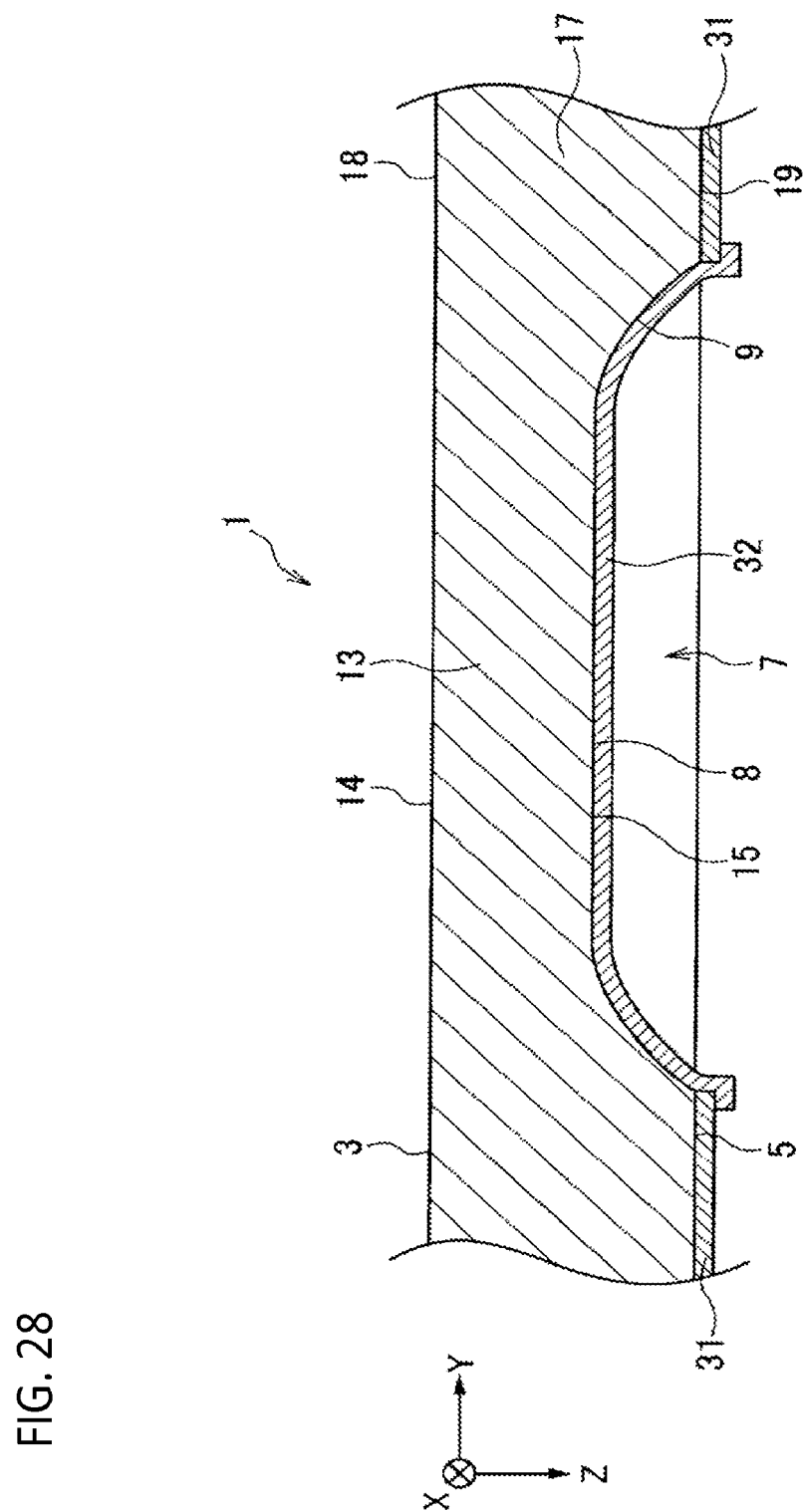
FIG. 28 is a cross-sectional view of a cover glass provided with a printing layer.

More specifically, as shown in FIG. 28, in the flat part not having the concave portion 7 in the back surface 5, a first printing layer 31 is provided according to a screen printing method or the like. Screen printing refers to a printing method where a printing material is put on a screen having openings, a squeegee is slid on the screen under pressure so that the printing material is extruded out through the openings of the screen to print a pattern of the openings. Since the concave portion 7 has the side surface 9 that is in a curved form, a pad printing is preferred for the concave portion 7. Accordingly, a second printing layer 32 is formed on the bottom 8 and the side surface 9 of the concave portion 7. Here, the pad printing refers to a printing method where a soft pad (for example, a silicone pad) having an ink pattern provided on the surface thereof is pressed against an intended substrate to thereby transfer the ink pattern onto the surface of the substrate. Pad printing may be also called intaglio printing or tampographic printing. In the pad printing method, as described here, pads that are relatively soft and have good shape followability are used, and therefore the printing on the side surface 9 of the concave portion 7 is preferably carried out according to the pad printing method. On the other hand, in the other printing method such as the screen printing method or the like, the shape followability is not so good and ink could not be applied to the side surface 9, and therefore the method is unsuitable. The order of printing for the first printing layer 31 and second printing layer 32 is not specifically limited.

As shown in FIG. 29, the flat part not having the concave portion 7 in the back surface 5, the flat bottom 8 of the concave portion 7 and the curved side surface 9 may be individually printed. In this case, on the flat part not having the concave portion 7 in the back surface 5, a first printing layer 31 is provided according to a screen printing method or the like. Next, on the bottom 8 of the concave portion 7, a second printing layer 32 is provided according to a screen printing method or the like. Subsequently, on the side surface 9 of the concave portion 7, a third printing layer 33 is provided according to a pad printing method. In order that the bottom 8 is not printed by pad printing, the pad is shaped to be in the form of a cylinder not having a part corresponding to the bottom 8. In that manner, by separately printing the bottom 8 of the concave portion 7 and the side surface 9 thereof, the thickness and the flatness of the second printing layer 32 to be formed on the bottom 8 can be controlled accurately. Accordingly, the sensor sensitivity in the case where a fingerprint authentication sensor is arranged on the bottom 8 of the concave portion 7 can be enhanced. The order of printing for the first to third printing layers 31 to 33 is not specifically limited. By changing the color and the texture in printing for the first printing layer 31, the second printing layer 32 and the third printing layer 33, the position of the sensor 40 may be made to be easily recognized by sight, therefore providing important design originality. For example, when the first printing layer 31 and the second printing layer 32 are of the same color and the third printing layer 33 is of a different color, the resultant design enables recognition of the third printing layer 33 as a ring pattern.

The printing method for the flat part, such as the part not having the concave portion 7 in the back surface 5 and the bottom 8 of the concave portion 7, is not limited to a screen printing method, and any other printing method capable of accurately controlling the thickness of the printing layer is applicable. Examples of the other printing method include a rotary screen printing method, a relief printing method, an offset printing method, a spray printing method, a film transfer method etc. In addition, other printing methods are also employable, and examples of the other printing methods include an electrostatic copying method, a thermal transfer method, an inkjet method, etc.

As shown in FIG. 7 where the bottom 8 of the concave portion 7 protrudes in the Z direction toward the center part thereof and where the bottom 8 of the concave portion 7 has a curved shape, it is desirable that also the printing on the bottom 8 is carried out according to a pad printing method.

The printing method for a curved shape, such as the side surface 9 of the concave portion 7, cover glass 1 having a bent portion or the bottom 8 having a protruding shape, is not limited to a pad printing method so far as its followability to the curved shape is good, and for example, a spray printing method is also employable.

When the concave portion 7 is in the back surface of the cover glass, and a display panel is arranged in the concave portion 7, a printing layer may not be formed in the concave portion and a printing may be carried out only in the back surface 10 of the thick portion 17. According to this, an interconnection or the like of the display panel cannot be recognized by sight from the front surface 18 of the cover glass 1, and excellent appearance can be obtained.

(Glass Composition)

As the cover glass 1, the glass substrate 101 and the glass member 201, for example, any one of the following glasses (i) to (vii) may be used. The following glass compositions (i) to (v) are represented by mol % in terms of oxides, and the following glass compositions (vi) to (vii) are represented by mass % in terms of oxides.

(i) A glass containing 50 to 80% of $SiO_2$, 2 to 25% of $Al_2O_3$, 0 to 10% of $Li_2O$, 0 to 18% of $Na_2O$, 0 to 10% of $K_2O$, 0 to 15% of MgO, 0 to 5% of CaO, and 0 to 5% of $ZrO_2$.

(ii) A glass containing 50 to 74% of $SiO_2$, 1 to 10% of $Al_2O_3$, 6 to 14% of $Na_2O$, 3 to 11% of $K_2O$, 2 to 15% of MgO, 0 to 6% of CaO and 0 to 5% of $ZrO_2$, in which the total content of $SiO_2$ and $Al_2O_3$ is 75% or lower, the total content of $Na_2O$ and $K_2O$ is 12 to 25%, and the total content of MgO and CaO is 7 to 15%.

(iii) A glass containing 68 to 80% of $SiO_2$, 4 to 10% of $Al_2O_3$, 5 to 15% of $Na_2O$, 0 to 1% of $K_2O$, 4 to 15% of MgO, and 0 to 1% of $ZrO_2$, in which the total content of $SiO_2$ and $Al_2O_3$ is 80% or lower.

(iv) A glass containing 67 to 75% of $SiO_2$, 0 to 4% of $Al_2O_3$, 7 to 15% of $Na_2O$, 1 to 9% of $K_2O$, 6 to 14% of MgO, 0% to 1% of CaO, and 0 to 1.5% of $ZrO_2$, in which the total content of $SiO_2$ and $Al_2O_3$ is 71 to 75%, and the total content of $Na_2O$ and $K_2O$ is 12 to 20%.

(v) A glass containing 60 to 75% of $SiO_2$, 0.5 to 8% of $Al_2O_3$, 10 to 18% of $Na_2O$, 0 to 5% of $K_2O$, 6 to 15% of MgO, and 0 to 8% of CaO.

(vi) A glass containing 63 to 75% of $SiO_2$, 3 to 12% of $Al_2O_3$, 3 to 10% of MgO, 0.5% to 10% of CaO, 0 to 3% of SrO, 0 to 3% of BaO, 10 to 18% of $Na_2O$, 0 to 8% of $K_2O$, 0 to 3% of $ZrO_2$, and 0.005 to 0.25% of $Fe_2O_3$, in which $R_2O/Al_2O_3$ (wherein $R_2O$ represents $Na_2O+K_2O$) is 2 or more and 4.6 or less.

(vii) A glass containing 66 to 75% of $SiO_2$, 0 to 3% of $Al_2O_3$, 1 to 9% of MgO, 1 to 12% of CaO, 10 to 16% of $Na_2O$, and 0 to 5% of $K_2O$.

(Example 1)

An example of the glass substrate 101 shown in FIG. 8 and its manufacturing method is described. A glass member 201 (see FIG. 11) having a length in the direction X of 730 mm, a length in the direction Y of 920 mm and a thickness in the direction Z of 0.5 mm was used. In the glass member 201, 65 concave portions 207 in total, concretely 5 lines in the direction X at a pitch of 130 mm and 13 rows in the direction Y at a pitch of 65 mm were formed (see FIG. 12). The size of the concave portion 207 was 5 mm in length in the direction X, 13 mm in length in the direction Y and 0.27 mm in depth in the direction Z. Specifically, the thickness in the direction Z of the thin part formed by providing the concave portions 207 was 0.23 mm.

The method for forming the concave portions 207 in the front surface 203 or the back surface of the glass member 201 is as follows. First, a resist material was applied to the front surface 203 or the back surface of the glass member 201, holes having the same size as the bottom of the concave portion 207 (concave portion forming holes 307) were formed in the resist material through photoexposure, and a first mask material 301 shown in FIG. 13 was formed. In the back surface of the glass member 201, holes were not formed while applying the resist material to the back surface, and a second mask member 401 shown in FIG. 14 was formed.

Next, while the first mask member 301 and second mask member 401 were kept in a state of being arranged on the front surface 203 and the back surface, the glass member 201 was immersed in a hydrofluoric acid (HF) solution. While this was swung in the directions XYZ, the HF solution was infiltrated through the concave portion forming holes 307 of the first mask member 301 to etch the glass member 201. After the glass member 201 was etched to have a depth of the concave portion 207 of 0.27 mm, the glass member 201 was pulled up from the HF solution, then the resist material (first mask member 301 and second mask member 401) were peeled off, and the member was washed and dried. According to the operation, the glass substrate 101 having the concave portions 107 shown in FIG. 8 was produced.

On the peripheral parts of the glass substrate 101, plural first masks 121 and second marks 122 for positioning in extruding plural cover glasses 1 were formed. The side surface of the concave portion 107 has a curved shape smoothly connecting to the bottom of the concave portion 107, and the radius of curvature from the bottom to the side surface of the concave portion 107 was at most about 0.4 mm. The connection part between the side surface of the concave portion 107 and the flat part of the front surface 103 of the glass substrate 101 was approximately perpendicular to each other.

As the glass member 201, an aluminosilicate glass manufactured by Asahi Glass Co., Ltd., Dragontrail (registered trade name by Asahi Glass Co., Ltd.) was used.

(Example 2)

An example of the glass substrate 101 and its manufacturing method is described. This differs from Example 1 in that an aluminosilicate glass manufactured by Asahi Glass Co., Ltd., Dragontrail-X, was used as the glass member 201, and that the shape of the concave portion 207 was a circular shape having a diameter of 10 mm. In addition, after the glass member 201 was taken out from the hydrofluoric acid (HF) solution after etching, this was kept as such for 30 seconds and thereafter the resist materials (the first mask member 301 and second mask member 401) were peeled away, and then this was washed. In the same manner as in Example 1 except these points, a glass substrate 101 was produced.

The side surface of the concave portion 107 had a curved shape smoothly connecting to the bottom of the concave portion 107, and the radius of curvature from the bottom of the concave portion toward the side surface thereof was at most 0.4 mm. The connecting part between the side surface of the concave portion 107 and the flat part of the front surface 103 of the glass substrate 101 was in a smoothly connecting curved shape, and the radius of curvature of the connecting part was about 0.4 mm (for example, see FIG. 4 and FIG. 6). The radius of curvature from the bottom of the concave portion 107 to the side surface thereof was the radius of curvature that concavely curved toward the side of the glass substrate 101. The shape of the flat part from the side surface of the concave portion 107 to the front surface 103 of the glass substrate 101 was a shape that was outwardly convex from the glass substrate 101 side and had an inflection point in the course of the side surface of the concave portion 107.

(Example 3)

An example of the cover glass 1 and its manufacturing method is described. The glass substrate 101 of Example 1 or 2 was cut into rectangular pieces in a size of 130 mm×65 mm each having one concave portion 107, using a wheel cutting device for glass cutting. Accordingly, plural rectangular cover glasses 1 each having one concave portion 107 in the back surface thereof were obtained. In cutting, the second mark 122 was read and the cutting position was determined. For securing correct cutting, it was confirmed whether the cutting line could run through the center of the first mark 121, from which correct cutting in the predetermined shape was confirmed. The second mark 122 and the concave portion 107 have a correlation with each other in point of the position thereof, and therefore the concave portion 107 was arranged at the desired position of 130 mm×65 mm.

Figure 30A:
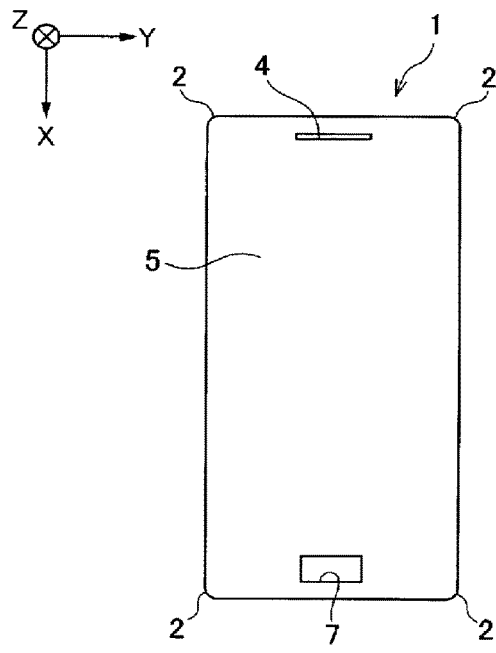
FIG. 30A to FIG. 30D are plan views for explaining a process of forming a printing layer on the cover glass of Example 3, in which the cover glass is seen from the back surface side thereof.

As shown in FIG. 30A, the four corners 2 of the rectangular cover glass 1, in a plan view thereof, were cut with CNC (abrasive stone cutting) to make the cover glass have a shape with a curvature R. Simultaneously, this was chamfered by CNC. Examples of chamfering may include R-chamfering (for cutting glass edges to have a semicircular form) and C-chamfering (for cutting obliquely), etc. In this example, C-chamfering was employed. In the CNC step, a speaker hole 4 was provided at a predetermined position. After the speaker hole 4 is previously provided, the concave portion 7 may be formed. Also the speaker hole 4 may be provided in a separate etching step. The speaker hole may be provided by cutting the edge face of the cover glass 1.

Next, the cover glass 1 was chemically strengthened using a molten salt of $KNO_3$. The cover glass 1 (Dragontrail) obtained from the glass substrate 101 of Example 1 was chemically strengthened at 410° C. for 2.5 hours and, as a result, DOL was 25 μm and CS was 750 MPa. The cover glass 1 (Dragontrail-X) obtained from the glass substrate 101 of Example 2 was chemically strengthened at 410° C. for 5 hours and, as a result, DOL was 25 μm and CS was 900 MPa. For measurement of DOL and CS, a glass surface stress meter, FSM-6000 manufactured by Orihara Manufacturing Co., Ltd. was used.

Next, the back surface 5 of the cover glass 1 was printed. The printing is for forming three black layers 31 to 33, the method thereof is the approximately same as the method for forming the first to third printing layers 31 to 33 shown in FIG. 29.

Figure 30B:
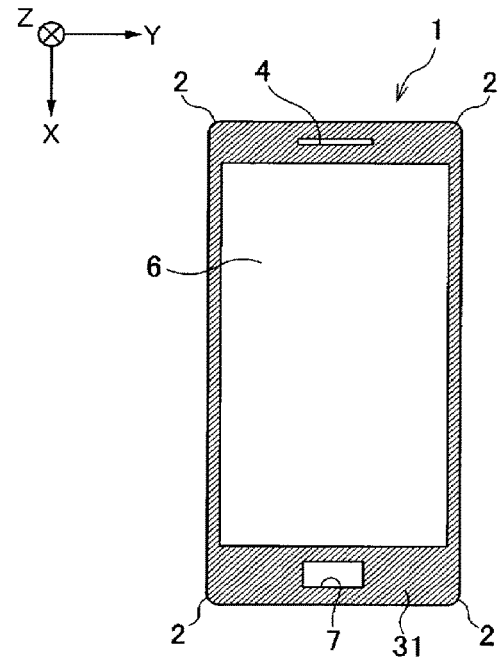
Figure 30C:
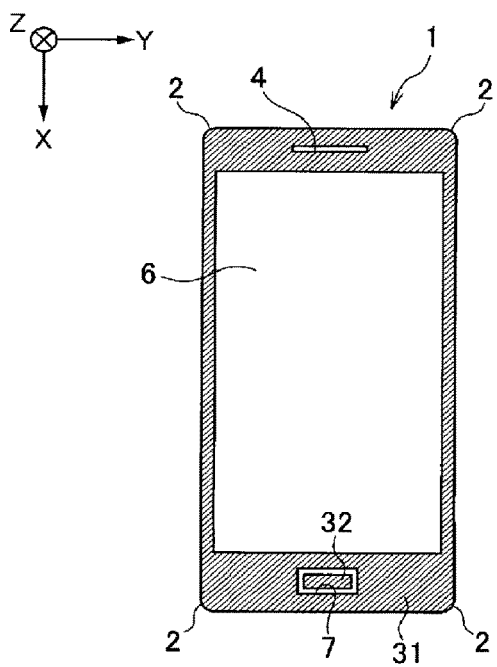
Figure 30D:
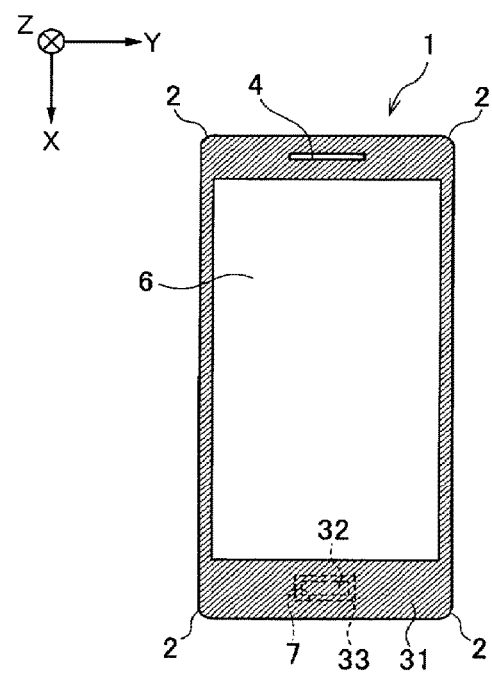

First, as shown in FIG. 30B, the back surface 5 of the cover glass 1 was printed in black in the region except the speaker hole 4, the concave portion 7 and the part corresponding to the display area of a personal digital assistant (display area 6), thereby forming the first printing layer 31. Next, as shown in FIG. 30C, the bottom of the concave portion 7 was printed in black to form the second printing layer 32. Subsequently, as shown in FIG. 30D, the side surface of the concave portion 7 was printed in black to form the third printing layer 33.

The first printing layer 31 was formed by screen printing, and one screen printing formed a print having a thickness of about 4 μm in the direction Z. The printing was carried out twice, and the thickness of the first printing layer 31 in the direction Z was about 8 μm. The second printing layer 32 was formed by pad printing. One pad printing formed a print having a thickness of about 3 μm in the direction Z. The printing was carried out three times, and the thickness of the second printing layer 32 in the direction Z was about 9 μm. The third printing layer 33 was formed by pad printing. The pad printing was repeated three times, and the thickness of the third printing layer 33 in the direction Z was about 9 μm. The third printing layer 33 was made to overlap with the first printing layer 31 and second printing layer 32 in the directions XY (so as to face each other in the direction Z). Accordingly, the concave portion 7 was printed in black with no light leakage. When seen from the front surface 3 of the cover glass 1 (the surface opposite to the back surface 5, on which the concave portion 7 is to be formed—see FIG. 1, etc.), the following could not be almost recognized: where the boundary of the concave portion 7 would be, depending on color.

For the black printing method, there may be employed a method where one black printing is carried out for the first printing layer 31 and, after the third printing layer 33 has been formed, another one black printing for the first printing layer is carried out. So far as the process condition is optimized, the bottom and the side surface of the concave portion 7 could be printed in black simultaneously to form the second and third printing layers 32 and 33 at the same time.

Finally, an anti-fingerprint layer was formed on the front surface 3 of the cover glass 1. For the formation of the anti-fingerprint layer, in general, a solution coating method, a spray coating method or a vapor deposition method is employable. In this example, a vapor deposition method was employed for the layer formation. According to the process as above, a desired cover glass 1 was produced.

(Example 4)

With reference to FIG. 31A to FIG. 31E and FIG. 32, an example of the cover glass 1 and its manufacturing method is described. This example differs from Example 3 in point of the printing method, but is the same as Example 3 in the other points.

Figure 31A:
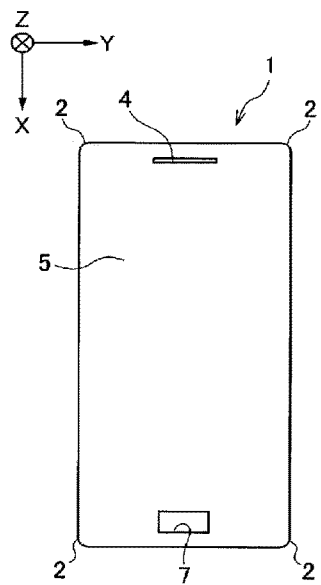
FIG. 31A to FIG. 31E are plan views for explaining a process of forming a printing layer on the cover glass of Example 4, in which the cover glass is seen from the back surface side thereof.
Figure 31B:
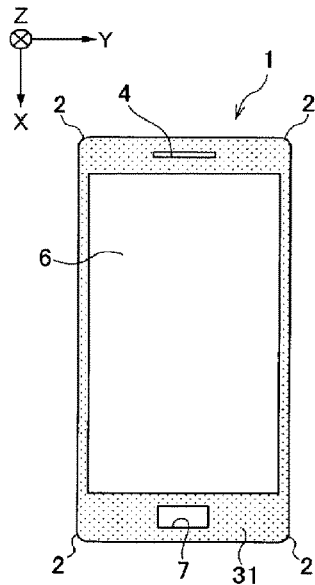

First, the back surface 5 of the cover glass 1 shown in FIG. 31A was printed in white in the region except the speaker hole 4, the concave portion 7 and the display area 6 to form the first printing layer 31 (see FIG. 31B). In the drawings, white printing is expressed by dot hatching and the black printing was by slant line hatching.

Figure 31C:
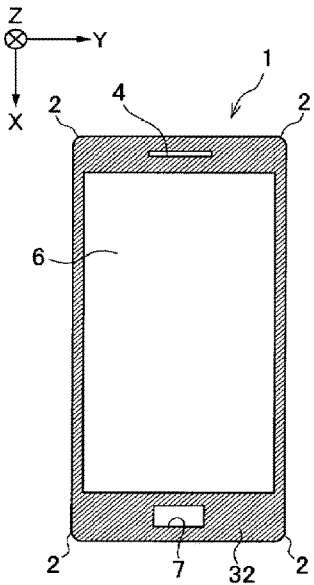
Figure 31D:
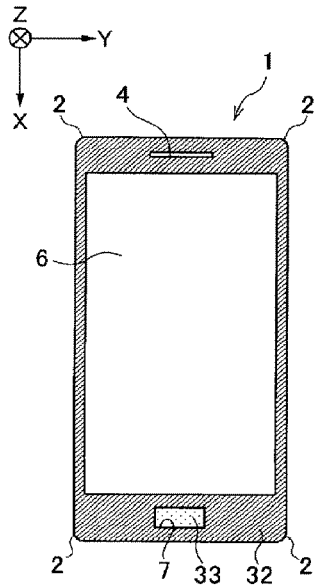
Figure 31E:
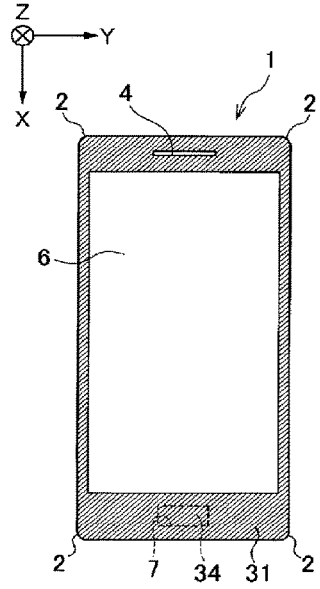
Figure 32:
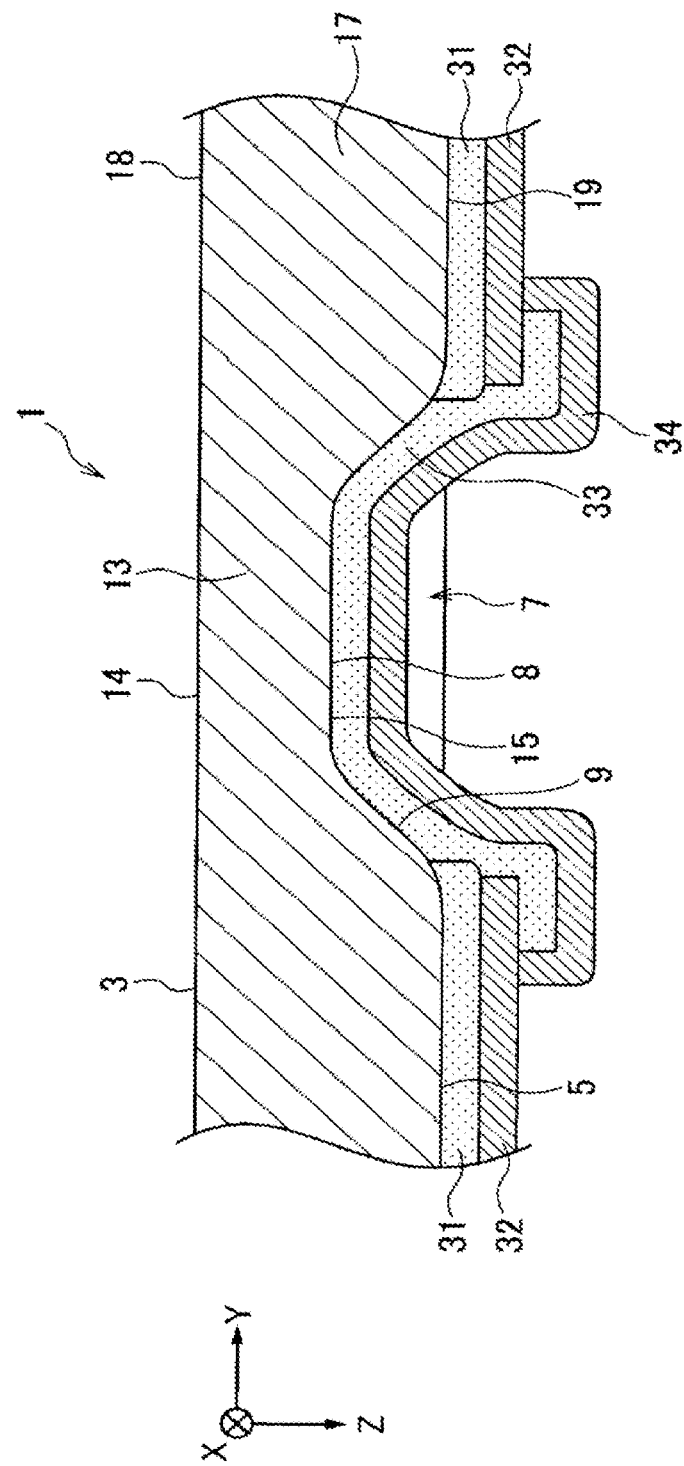
FIG. 32 is a cross-sectional view of the cover glass of Example 4, provided with a printing layer.

Next, on the first printing layer 31 (back surface), black printing was made to form the second printing layer 32 (see FIG. 31C). Subsequently, white printing was made on the bottom 8 of the concave portion 7 and the side surface 9 thereof (see FIG. 3) to form the third printing layer 33 (see FIG. 31D). Further, on the third printing layer 33 (back surface), black printing was made to form the fourth printing layer 34 (see FIG. 31E).

The first printing layer 31 was formed in white by screen printing, and one printing formed a print having a thickness of about 6 μm in the direction Z. This was repeated three times to form the first printing layer 31 having a thickness of about 18 μm in the direction Z. The second printing layer 32 was formed in black by screen printing, to be a layer having a thickness of about 4 μm in the direction Z of the first printing layer 31. Black printing for the second printing layer 32 was made on the white printing for the first printing layer 31 (back surface), but when the black printing oversteps the white printing, it would be seen, and therefore the black printing was made in an area smaller than that for the white printing.

The third printing layer 33 was formed in white by pad printing, and one printing formed a print having a thickness of about 3 μm in the direction Z. This was repeated six times to form the third printing layer 33 having a thickness of about 18 μm in the direction Z. The fourth printing layer 34 was formed in black by pad printing. This was carried out once to form the fourth printing layer having a thickness of about 3 μm in the direction Z.

When the black printing for the second printing layer 32 is not carried out, the white printing for the first printing layer 31 overlaps with the white printing for the third printing layer 33 whereby a region having a high white reflectance would be formed. For evading it, it is important to form the second printing layer. When the cover glass 1 of this example was seen from the front surface 3 side, white printing formed uniformly on the entire surface was confirmed. Here, the black printing made on the back surface of the white printing is for realizing a constant reflectance in the white print part. Accordingly, when a light member exists on the back surface of the white printing, it is possible to evade a trouble that the area of the light member would be seen brightly. In addition, it is also possible to evade light leakage in the presence of a light-emitting member.

Different from Example 3, the concave portion 7 was seen three-dimensionally in this example. This is because, when seen from the front surface 3 side of the cover glass 1, there exists a white-printed convex shape, and owing to shadow formation by external light, the convex shape is visualized to give a three-dimensional appearance. Accordingly, this realizes an effect of creating a sense of depth.

(Example 5)

Figure 33:
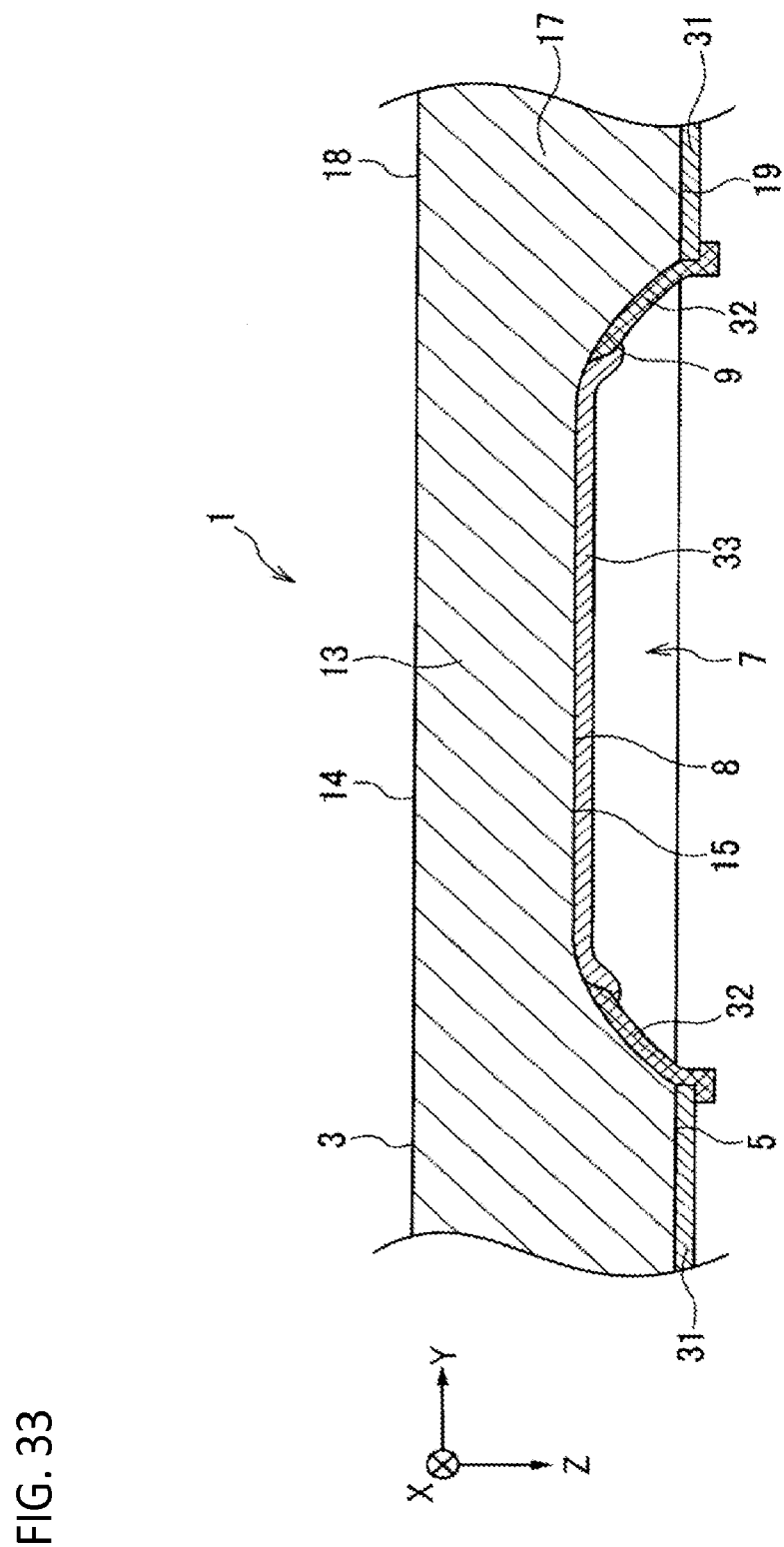
FIG. 33 is a cross-sectional view of the cover glass of Example 5, provided with a printing layer.

With reference to FIG. 33, an example of the cover glass 1 and its manufacturing method is described. This example differs from Example 3 (see FIG. 30A to FIG. 30D) in point of the printing method for the second and third printing layers 32 and 33, but is approximately the same as Example 3 in the other points.

First, the back surface 5 of the cover glass 1 was printed in black in the region except the speaker hole 4, the concave portion 7 and the display area 6 to form the first printing layer 31. Next, silver printing was made on the side surface 9 of the concave portion 7 to form the second printing layer 32. Here, in the drawings, silver printing is expressed by mesh hatching. Subsequently, the bottom 8 of the concave portion 7 was printed in black to form the third printing layer 33. The first printing layer 31 was formed by screen printing, and the second and third printing layers 32 and 33 were formed by pad printing.

Figure 34:
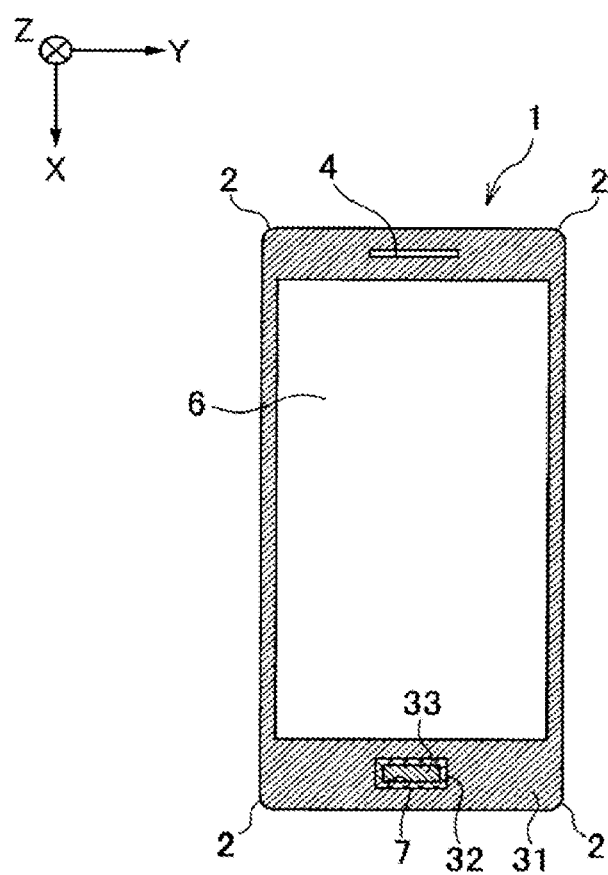
FIG. 34 is a plan view of the cover glass of Example 5, provided with a printing layer and seen from the front surface side thereof.

When the cover glass 1 is seen from the front surface 3 side as shown in FIG. 34, the second printing layer 32 is recognized as a ring-like design, and the position of the sensor arranged in the concave portion 7 can be displayed to be easily recognized by sight. The second printing layer 32 may be formed also by white printing or by any other color printing mode of gold printing or the like, in addition to silver printing.

In the case where the second printing layer 32 is formed on a slant surface, the printing width is difficult to control and therefore, when printing width control is required in the case, the second printing layer 32 may be formed on the flat part of the first printing layer 31. In this case, there is no need of printing on a slant surface, and therefore screen printing is employable.

Figure 35:
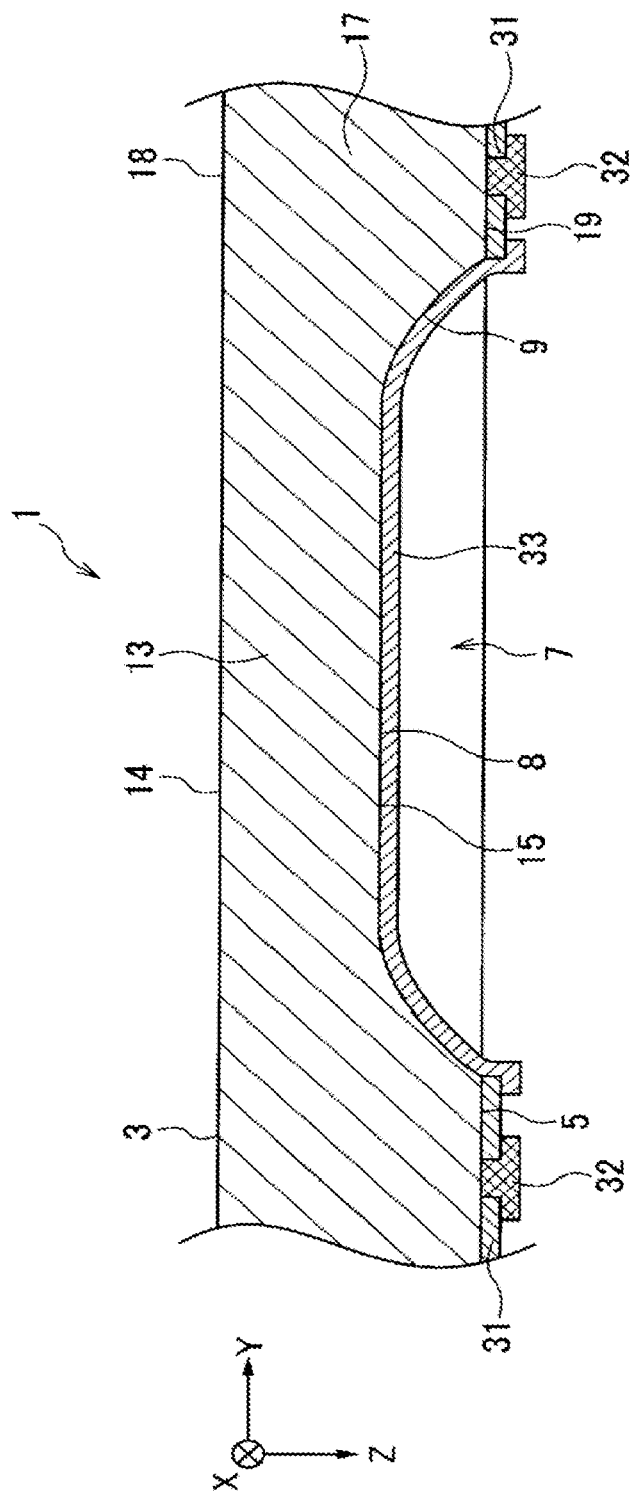
FIG. 35 is a cross-sectional view of the cover glass of Example 5 in a modification example.

As shown in FIG. 35, a ring-like hole may be formed in a part of the first printing layer 31, and the second printing layer 32 may be printed in the hole. Also in this case, the second printing layer 32 may be recognized as a ring-like design.

Figure 36:
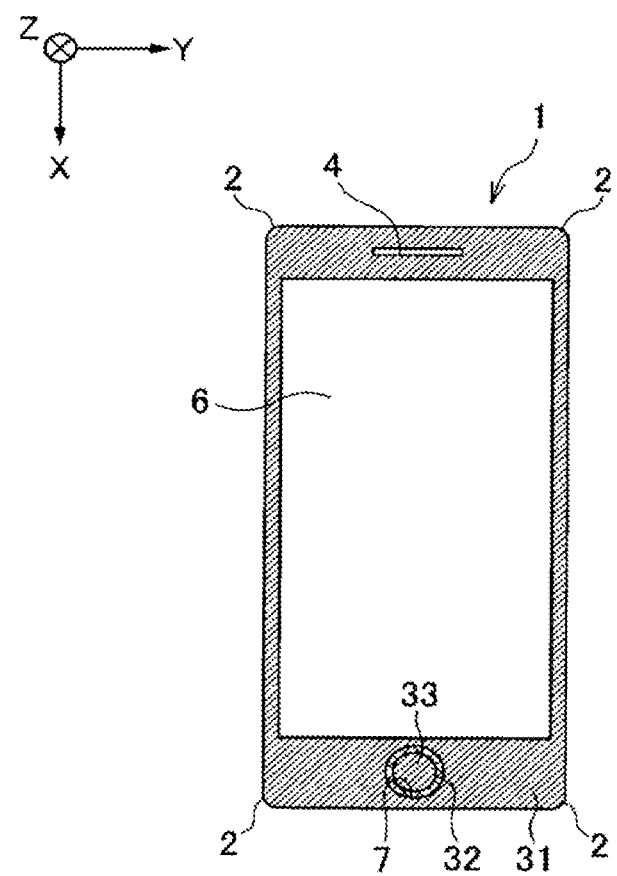
FIG. 36 is a plan view of the cover glass of Example 5 in a modification example, seen from the front surface side thereof.
Figure 37:
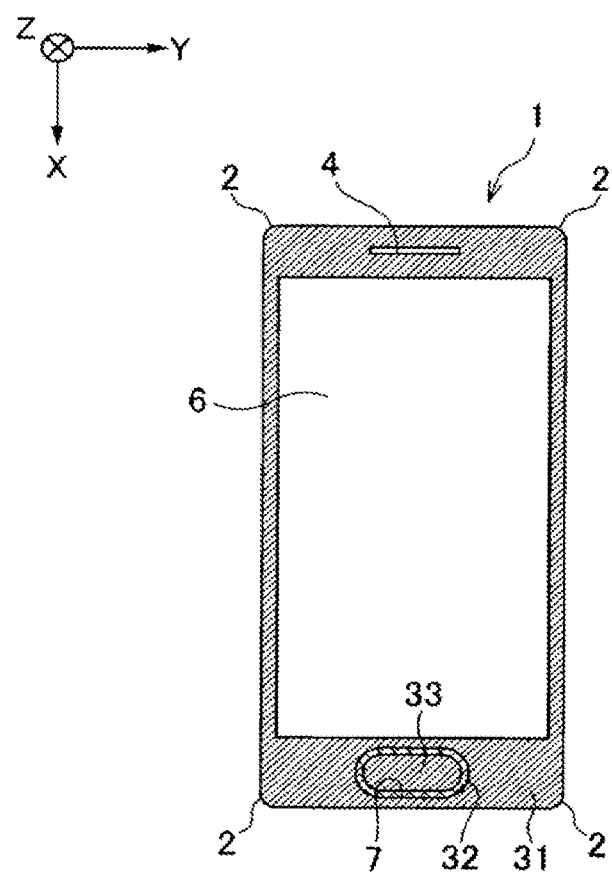
FIG. 37 is a plan view of the cover glass of Example 5 in a modification example, seen from the front surface side thereof.
Figure 39:
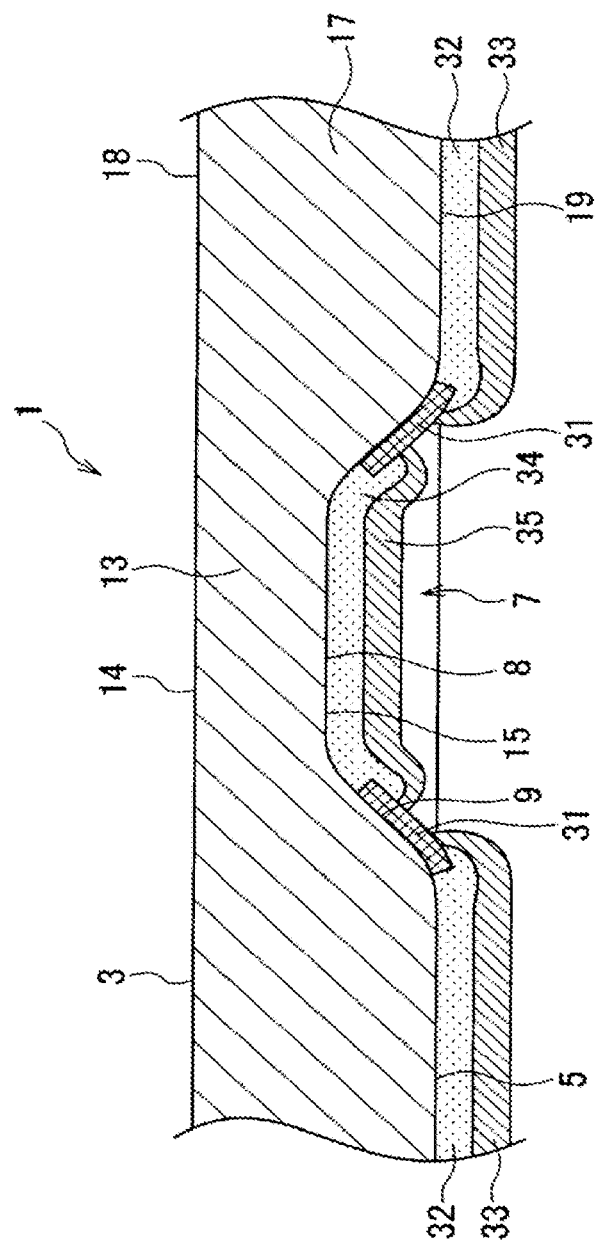
FIG. 39 is a cross-sectional view of the cover glass of Example 6, provided with a printing layer.

FIG. 36 and FIG. 37 each show the cover glass 1 seen from the front surface 3 side, where the shape of the concave portion 7 is circular or elliptical and the second printing layer 32 is formed by silver printing.

(Example 6)

With reference to FIG. 38A to FIG. 38F and FIG. 39, an example of the cover glass 1 and its manufacturing method is described. This example differs from Example 4 (see FIG. 31A to FIG. 31E and FIG. 32) in that five printing layers 31 to 35 are formed herein, but is approximately the same as Example 4 in the other points.

First, the side surface 9 of the concave portion 7 was printed by silver printing to form the first printing layer 31 (see FIG. 38B). Subsequently, the back surface 5 of the cover glass 1 was printed in white in the region except the speaker hole 4, the concave portion 7 and the display area 6 to form the second printing layer 32 (see FIG. 38C). Next, black printing was made on the second printing layer 32 (on the back surface) to form the third printing layer 33 (see FIG. 38D). Subsequently, white printing was made on the bottom 8 of the concave portion 7 to form the fourth printing layer 34 (see FIG. 38E). Further, on the fourth printing layer 34 (on the back surface), black printing was made to form the fifth printing layer 35 (see FIG. 38F).

The first printing layer 31 was formed by pad printing, the second and third printing layers 32 and 33 were formed by screen printing, and the fourth and fifth layers 34 and 35 were formed by pad printing.

In the case where the cover glass 1 of this example is seen from the front surface 3 side, the first printing layer 31 is recognizable as a ring-like design, thereby facilitating visible recognition of the position of the sensor arranged in the concave portion 7. The first printing layer 31 may be formed also by white printing or by any other color printing mode of gold printing or the like, in addition to silver printing.

(Example 7)

In Example 3 or Example 4, printing may also be made on the surface not having the concave portion 7, using the unprinted cover glass 1. In this case, a single color alone is used as in Example 3 or Example 4, the printing is made on the flat surface with no irregularities, and therefore all the predetermined printing region including the back surface part of the concave portion 7 can be printed by screen printing.

Also in the case where the bottom 8 of the concave portion 7 and the side surface 9 thereof are printed in different colors like in Example 5 or Example 6, a desired pattern can be made by printing the back surface part of the concave portion with a different pattern of a different color from those of the other parts.

(Example 8)

In Example 3, the cover glass 1 after chemical strengthening but before printing was polished on the front surface 3 and the back surface 5 to a depth of about 3 pin, using a double side polisher. Accordingly, the surface strength could be increased. Though the bottom 8 of the concave portion 7 and the side surface 9 thereof were not polished, the concave portion 7 was etched to remove faults and scratches, and therefore the surface strength thereof was high and the concave portion 7 was not required to be polished.

(Example 9)

An example of a personal digital assistant is described. To the bottom 8 of the concave portion 7 of the cover glass 1 of Example 3, a fingerprint authentication sensor 40 (see FIG. 4) was fixed via the sensor surface thereof. The thickness in the direction Z of the adhesive layer 41 was about 10 μm. On the non-printed part of the back surface 5 of the cover glass 1, a liquid-crystal layer 44 (liquid-crystal panel) was layered via an adhesive layer 45 (see FIG. 18). The thickness in the direction Z of the adhesive layer 45 was about 100 μm. With the surface (front surface 3) not having the concave portion 7 of the cover glass 1 kept facing outward, this was incorporated in a housing 43 along with the other members to construct a smartphone.

Despite that the fingerprint authentication sensor 40 was arranged on the display side of the smartphone, the front surface 3 of the cover glass 1 could still be designed so as to be flat. In the case where printing of a color different from that of the other sites is made on the side surface 9 of the concave portion 7, like in Example 5 or Example 6, the position of the fingerprint authentication sensor 40 could be readily recognized by the printing pattern.

(Example 10)

When a personal digital assistant was produced using the cover glass 1 of Example 7, the sensor face of the fingerprint authentication sensor 40 was fixed to the back surface 15 of the thin portion 13 of the cover glass 1. In the case where the concave portion 7 is arranged in the front surface 3 of the cover glass 1 and where the fingerprint authentication sensor 40 is arranged on the back surface 15 of the thin portion 13, the size of the fingerprint authentication sensor 40 may be larger than that of the concave portion 7 so far as the configuration would not have any negative influence on the function of the fingerprint authentication sensor 40. When the size of the fingerprint authentication sensor 40 is larger than that of the concave portion 7, the strength of the cover glass 1 where the thin portion 13 is thin can be increased.

On the non-printed part of the back surface 5 of the cover glass 1, the liquid-crystal layer 44 (liquid-crystal panel) was layered via the adhesive layer 45. With the surface (front surface 3) having the concave portion 7 of the cover glass 1 kept facing outward, this was incorporated in the housing 43 along with the other members to construct a personal digital assistant such as a smartphone. In this case, since the concave portion 7 exists in the outer front surface of the personal digital assistant, the sensor position is easily recognized even though any marking is not formed by printing.

(Modification Example)

The present invention is not limited to only the above embodiments, but various modifications and design change may be made within the range not departing from the gist of the present invention. In addition, specific procedures and structures for actually carrying out the present invention may be changed within the range where an object of the present invention can be achieved.

(Cover Glass Having a Bent Part)

The cover glass having a bent part includes at least one bent part. Examples of the shape thereof include a combined shape of a bent part and a flat part, a shape having a bent part as a whole, and the like. The shape is not particularly limited as long as the cover glass has a bent part. Recently, in a case where a cover glass having a bent part is used in a display device, a product having a curved surface in a display surface of a display panel appears on the market in various devices (television, personal computer, smartphone, car navigation and the like). The bent part can be prepared so as to suit to the shape of a display panel or shape of a housing of a display panel. The "flat part" means a part where the average radius of curvature is more than 1,000 mm, and the "bent part" means a part where the average radius of curvature is 1,000 mm or less.

(Surface Roughness and the Like)

The roughness of the front surface 14 or back surface 15 of a thin portion of a cover glass and the front surface or back surface of a printing layer is not limited to the arithmetic mean roughness Ra described above. For example, in the case of evaluating by root mean square surface roughness Rq, Rq is preferably 0.3 nm or more and 100 nm or less. When Rq is 100 nm or less, roughness is hardly recognized, and when Rq is 0.3 nm or more, suitable friction coefficient of a surface of glass can be obtained and slip properties of a finger or the like can be improved. In the case of evaluating by maximum height of the roughness profile Rz, Rz is preferably 0.5 nm or more and 300 nm or less. When Rz is 300 nm or less, roughness is hardly recognized, and when Rz is 0.5 nm or more, suitable friction coefficient of a surface of glass can be obtained and slip properties of a finger or the like can be improved.

In the case of evaluating by total height of the roughness profile Rt, Rt is preferably 1 nm or more and 500 nm or less. When Rt is 500 nm or less, roughness is hardly recognized, and when Rt is 1 nm or more, suitable friction coefficient of a surface of glass can be obtained and slip properties of a finger or the like can be improved. In the case of evaluating by maximum peak height of the roughness profile Rp, Rp is preferably 0.3 nm or more and 500 nm or less. When Rp is 500 nm or less, roughness is hardly recognized, and when Rp is 0.3 nm or more, suitable friction coefficient of a surface of glass can be obtained and slip properties of a finger or the like can be improved. In the case of evaluating by valley depth of the roughness profile Rv, Rv is preferably 0.3 nm or more and 500 nm or less. When Rv is 500 nm or less, roughness is hardly recognized, and when Rv is 0.3 nm or more, suitable friction coefficient of a surface of glass can be obtained and slip properties of a finger or the like can be improved.

In the case of evaluating by mean width of the roughness profile elements Rsm, Rsm is preferably 0.3 nm or more and 1,000 nm or less. When Rsm is 1,000 nm or less, roughness is hardly recognized, and when Rsm is 0.3 nm or more, suitable friction coefficient of a surface of glass can be obtained and slip properties of a finger or the like can be improved. In the case of evaluating by kurtosis roughness Rku, Rku is preferably 1 or more and 3 or less. When Rku is 3 or less, roughness is hardly recognized, and when Rku is 1 or more, suitable friction coefficient of a surface of glass can be obtained and slip properties of a finger or the like can be improved. In the case of evaluating by skewness roughness Rsk, Rsk is preferably −1 or more and 1 or less from the standpoint of evenness of visibility and touch feeling. The other examples thereof include waviness such as Wa, and parameters representing the roughness are not particularly limited.

(Use Applications)

Use applications of the cover glass in the present invention are not particularly limited. Specific examples thereof include a vehicle transparent member (headlight cover, side mirror, front transparent substrate, side transparent substrate, rear transparent substrate, instrument panel surface and the like), a meter, a building window, a show window, a building interior member, display (for notebook computer, monitor, LCD, PDP, ELD, CRT, PDA and the like), a LCD color filter, a substrate for a touch panel, pick-up lens, optical lens, lens for eyewear, a camera member, video member, a cover substrate for CCD, an optical fiber end face, a projector member, a copy machine member, a transparent substrate for a solar cell (cover glass and the like), a mobile phone window, a backlight unit member (light guide plate, cold cathode tube and the like), a backlight unit member liquid-crystal brightness-enhanced film (prism, semi-transparent film and the like), a liquid-crystal brightness-enhanced film, an organic EL element member, an inorganic EL element member, a fluorescent light-emitting element member, an optical filter, an end face of an optical member, an illumination lamp, a cover of an illumination device, an amplified laser light source, an anti-reflection film, a polarizing film, a film for agriculture, and the like.

(Product)

A product in the present invention includes the cover glass.

The product in the present invention may consist of the cover glass, or may further include other member than the cover glass.

Examples of the product in the present invention include products exemplified in the above use applications for the cover glass, devices including at least one kind of them, and the like.

Examples of the devices include a personal digital assistance, a display device, a solar cell module and the like.

With regard to the products in the present invention, a flat concave portion can be obtained, and sensor sensitivity and visibility are excellent, and the products are suitable for the personal digital assistance or display device. The cover glass to be used for in-car products is required to have plural and large-sized concave portions, and when a sensor is arranged therein, the high sensor sensitivity is required. In addition, a cover glass having a bent shape is required to have a concave portion in some cases. In the present invention, the cover glass capable of satisfying these requirements can be provided. Thus, the cover glass in the present invention is suitable for a cover glass for in-car products.

In the case where the product in the present invention is a display device, the product in the present invention includes a display panel that displays an image, the cover glass in the present invention that is arranged on the visual side of a main body the display device.

Examples of the display panel include a liquid-crystal panel, an organic EL (electroluminescence) panel, a plasma display panel and the like. The cover glass may be arranged integrally with a display panel as a protection plate of the display device, and a sensor such as a touch panel sensor may be arranged in the back surface of a display panel, i.e. the structure that the display panel exists between the cover glass and the sensor may be provided. In addition, the cover glass may be arranged on the visual side of a display panel via a sensor.

According to the present invention, a cover glass capable of exhibiting a desired sensing capability when a sensor is incorporated thereinto, a personal digital assistant and display device having the cover glass, a glass substrate for extracting plural cover glasses therefrom, and a simple method for manufacturing the cover glass and the glass substrate, can be provided.

REFERENCE SIGNS LIST

1 Cover Glass
2 Corner
3 Front Surface

4 Speaker Hole
5 Back Surface
6 Display Area
7 Concave Portion
8 Bottom
9 Side Surface
11 Anti-glare treated region
12 Anti-fingerprint layer
13 Thin Portion
14 Front Surface
15 Back Surface
17 Thick Portion
18 Front Surface
19 Back Surface
30 to 35 Printing Layers
40 Sensor
41 Adhesive Layer
42 Camera Module
43 Housing
44 Liquid-Crystal Layer
45 Adhesive Layer
101 Glass Substrate
103 Front Surface
107 Concave Portion
113 Thin Portion
117 Thick Portion
120 Groove
121 First Mark
122 Second Mark
201 Glass Member
203 Front Surface
207 Concave Portion
301 First Mask Member
307 Concave Portion Forming Hole
320 Groove Forming Hole
401 Second Mask Member

What is claimed is:

1. A glass substrate for extracting therefrom a plurality of cover glasses to protect a protection object, wherein:
    plural concave portions are provided in a front surface of the glass substrate or a back surface of the glass substrate,
    the glass substrate includes plural thin portions formed by providing the plural concave portions and a thick portion connecting to the thin portion,
    a haze value of the thin portion is 8% or less, and
    at least one of an anti-glare treated layer, an anti-reflection layer, an anti-fingerprint layer and an anti-fogging layer is provided on the thick portion of the front surface or back surface of the glass substrate.

2. The glass substrate according to claim 1, wherein an arithmetic mean roughness of a front surface of the thin portion is 50 nm or less.

3. The glass substrate according to claim 1, wherein the plural concave portions are provided by etching.

4. The glass substrate according to claim 1, wherein a layer containing fluorine or chlorine is included in the outermost surface of the plural concave portions.

5. The glass substrate according to claim 1, wherein the plural concave portions are provided at predetermined intervals.

6. The glass substrate according to claim 1, wherein the plural concave portions are provided on only either one of the front surface of the glass substrate or the back surface of the glass substrate.

7. The glass substrate according to claim 1, wherein a bottom of the concave portion is in a shape protruding toward the front surface or the back surface.

8. The glass substrate according to claim 1, wherein a side surface of the concave portion is in a curved shape smoothly connecting to a bottom of the concave portion.

9. The glass substrate according to claim 8, wherein a radius of curvature of the side surface is not less than a depth of the bottom.

10. The glass substrate according to claim 8, wherein a radius of curvature of the side surface is less than a depth of the bottom.

11. The glass substrate according to claim 8, wherein a radius of curvature of the side surface increases from a center part of the concave portion toward a peripheral part of the concave portion.

12. The glass substrate according to claim 8, wherein a radius of curvature of the side surface decreases from a center part of the concave portion toward a peripheral part of the concave portion.

13. The glass substrate according to claim 8, wherein a radius of curvature of the side surface is 0.1 mm or more and 2 mm or less.

14. The glass substrate according to claim 1, wherein a connecting part between a side surface of the concave portion and the front surface of the glass substrate or the back surface of the glass substrate is in a smoothly continuing curved shape.

15. The glass substrate according to claim 1, wherein a mark for positioning in extracting the plural cover glasses exists in a peripheral part of the front surface or back surface of the glass substrate.

16. The glass substrate according to claim 1, wherein plural marks for positioning in extracting the plural cover glasses exist in a peripheral part of the front surface or back surface of the glass substrate.

17. The glass substrate according to claim 1, wherein the front surface or back surface of the glass substrate has a concentration of a potassium ion higher than a concentration of a potassium ion in a center part of the thick portion in a thickness direction in a section view thereof.

18. The glass substrate according to claim 1, wherein a depth of a compressive stress layer in the concave portion is higher than a depth of a compressive stress layer in the thick portion.

19. The glass substrate according to claim 1, wherein a depth of a compressive stress layer in the thick portion is higher than a depth of a compressive stress layer in the concave portion.

20. The glass substrate according to claim 1, wherein the anti-glare treated layer is included in at least a part of a position that faces the concave portion.

21. The glass substrate according to claim 1, wherein the anti-glare treated layer is included in at least a part of a peripheral part of a position that faces the concave portion.

22. The glass substrate according to claim 1, wherein a layer containing fluorine or chlorine is included in the outermost surface of the anti-glare treated layer.

23. The glass substrate according to claim 1, wherein the anti-glare treated layer has a composition different from a composition in a center part of the thick portion in a thickness direction of the glass substrate in a section view thereof.

24. A cover glass to protect a protection object, wherein:
    at least one concave portion is provided in a front surface or back surface of the cover glass, the cover glass comprises a thin portion formed by providing the concave portion and a thick portion connecting to the thin portion, depth of a compressive stress layer in the concave portion is higher than a depth of a compressive stress layer in the thick portion, or a depth of a compressive stress layer in the thick portion is higher than a depth of a compressive stress layer in the concave portion, and a haze value of the thin portion is 8% or less.

25. The cover glass according to claim 24, wherein an arithmetic mean roughness of a front surface of the thin portion is 50 nm or less.

26. The cover glass according to claim 24, wherein the concave portion is provided by etching.

27. The cover glass according to claim 24, wherein a layer containing fluorine or chlorine is included in the outermost surface of the concave portion.

28. The cover glass according to claim 24, wherein a bottom of the concave portion is in a shape protruding outside the concave portion toward the front or back surface.

29. The cover glass according to claim 24, wherein the outermost surface of the front surface or back surface has a concentration of a potassium ion higher than a concentration of a potassium ion in a center part of the thick portion in a thickness direction in a section view thereof.

30. The cover glass according to claim 24, wherein the front surface or back surface is a polished surface.

31. The cover glass according to claim 30, wherein the polished surface is formed in a chemically strengthened layer.

32. The cover glass according to claim 24, wherein a depth of a compressive stress layer in the thick portion is higher than a depth of a compressive stress layer in the concave portion.

33. The cover glass according to claim 24, wherein an anti-glare treated layer is included in at least a part of a surface of the cover glass.

34. The cover glass according to claim 33, wherein the anti-glare treated layer is included in at least a part of a position that faces the concave portion.

35. The cover glass according to claim 33, wherein the anti-glare treated layer is included in at least a part of a peripheral part of a position that faces the concave portion.

36. The cover glass according to claim 33, wherein a layer containing fluorine or chlorine is included in the outermost surface of the anti-glare treated layer.

37. The cover glass according to claim 33, wherein the anti-glare treated layer has a composition different from a composition in a center part of the thick portion in a thickness direction of the glass substrate in a section view thereof.

38. The cover glass according to claim 24, wherein an anti-fingerprint layer is included in at least a part of the front surface of the cover glass.

39. The cover glass according to claim 38, wherein the anti-fingerprint layer is included only in the thick portion.

40. The cover glass according to claim 38, wherein the anti-fingerprint layer is included only in the thin portion.

41. The cover glass according to claim 38, wherein the anti-fingerprint layer covers a whole surface of the front surface of the cover glass.

42. The cover glass according to claim 24, wherein a side surface of the concave portion is in a curved shape smoothly connecting to a bottom of the concave portion.

43. The cover glass according to claim 42, wherein a radius of curvature of the side surface is not less than a depth of the bottom.

44. The cover glass according to claim 42, wherein a radius of curvature of the side surface is less than a depth of the bottom.

45. The cover glass according to claim 42, wherein a radius of curvature of the side surface increases from a center part of the concave portion toward a peripheral part of the concave portion.

46. The cover glass according to claim 42, wherein a radius of curvature of the side surface decreases from a center part of the concave portion toward a peripheral part of the concave portion.

47. The cover glass according to claim 42, wherein a radius of curvature of the side surface is 0.1 mm or more and 2 mm or less.

48. The cover glass according to claim 24, wherein a connecting part between a side surface of the concave portion and the front surface or back surface of the cover glass is in a smoothly continuing curved shape.

49. The cover glass according to claim 24, wherein a printing layer is included on the back surface of the cover glass.

50. The cover glass according to claim 24, wherein:
the concave portion exists in the back surface of the cover glass, and
a printing layer is included in the concave portion.

51. The cover glass according to claim 24, wherein the protection object is a personal digital assistant.

52. The cover glass according to claim 24, wherein the protection object is a display panel.

53. The cover glass according to claim 52, wherein the protection object includes a sensor.

54. A cover glass to protect a protection object, wherein:
at least one concave portion is provided in a front surface or back surface of the cover glass,
the cover glass comprises: a thin portion formed by providing the concave portion;
and a thick portion connecting to the thin portion,
an anti-glare treated layer is included in at least a part of a surface of the cover glass,
a haze value of the thin portion is 8% or less, and
a bottom of the concave portion is in a shape protruding outside the concave portion toward the front surface or back surface.

55. A cover glass to protect a protection object, wherein:
at least one concave portion is provided in a front surface or back surface of the cover glass,
the cover glass comprises: a thin portion formed by providing the concave portion;
and a thick portion connecting to the thin portion,
an anti-glare treated layer is included in at least a part of a surface of the cover glass,
a haze value of the thin portion is 8% or less, and
the anti-glare treated layer is included in at least a part of a position that faces the concave portion.

56. The cover glass according to claim 55, wherein the anti-glare treated layer is included in at least a part of a peripheral part of a position that faces the concave portion.

57. The cover glass according to claim 55, wherein the anti-glare treated layer has a composition different from a composition in a center part of the thick portion in a thickness direction of the glass substrate in a section view thereof.

58. A cover glass to protect a protection object, wherein:
at least one concave portion is provided in a back surface of the cover glass,
the cover glass comprises: a thin portion formed by providing the concave portion;
and a thick portion connecting to the thin portion,
an anti-glare treated layer is included in at least a part of a surface of the cover glass,
a haze value of the thin portion is 8% or less, and
a printing layer is included in the concave portion.

* * * * *